United States Patent
Jung et al.

(10) Patent No.: US 11,375,442 B2
(45) Date of Patent: Jun. 28, 2022

(54) METHOD AND APPARATUS FOR PROVIDING FREQUENCY BAND LIST IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/151,604

(22) Filed: Jan. 18, 2021

(65) Prior Publication Data
US 2021/0235368 A1 Jul. 29, 2021

(30) Foreign Application Priority Data
Jan. 17, 2020 (KR) .................. 10-2020-0006774

(51) Int. Cl.
*H04W 48/18* (2009.01)
*H04W 48/16* (2009.01)
*H04W 84/04* (2009.01)

(52) U.S. Cl.
CPC .......... *H04W 48/16* (2013.01); *H04W 48/18* (2013.01); *H04W 84/042* (2013.01)

(58) Field of Classification Search
CPC .. H04W 48/16; H04W 52/0238; H04W 48/20
See application file for complete search history.

(56) References Cited

U.S. PATENT DOCUMENTS

2009/0209254 A1* 8/2009 Oguchi ............. H04W 36/0085
455/437
2014/0128077 A1* 5/2014 Magadi Rangaiah .......................
H04W 48/20
455/436

(Continued)

OTHER PUBLICATIONS

International Search Report and Written Opinion of the International Searching Authority in connection with International Application No. PCT/KR2021/000666 dated Apr. 15, 2021, 8 pages.

(Continued)

*Primary Examiner* — Qutbuddin Ghulamali

(57) ABSTRACT

A terminal for cell reselection in a wireless communication system includes: a transceiver; and at least one processor configured to select a Public Land Mobile Network (PLMN) in an idle mode or an inactive mode, receive, from a base station, a PLMN identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s), receive, from the base station, a PLMN information list including one or more pieces of PLMN information via a third type system information block, wherein each of the one or more pieces of PLMN information includes a New Radio (NR) frequency band list for a corresponding PLMN in a same order as the first order for PLMN(s) in which the one or more pieces of PLMN identity information are listed in the PLMN identity list received via the first type system information block, determine whether at least one NR frequency for the selected PLMN is included in the NR frequency band list and whether the terminal supports to operate in E-UTRA-NR Dual Connectivity (EN-DC) by using the at least one NR frequency for the selected PLMN, (Continued)

when the at least one NR frequency for the selected PLMN is included in the NR frequency band list and the terminal supports to operate in the EN-DC by using the at least one NR frequency for the selected PLMN, transmit, to a upper layer, a upper layer indication, and when the at least one NR frequency for the selected PLMN is not included in the NR frequency band list or the terminal does not support to operate in the EN-DC by using the at least one NR frequency for the selected PLMN, transmit, to the upper layer, information indicating absence of the upper layer indication.

20 Claims, 15 Drawing Sheets

(56) References Cited

U.S. PATENT DOCUMENTS

| | | | | |
|---|---|---|---|---|
| 2014/0235238 | A1* | 8/2014 | Pais | H04W 4/023 |
| | | | | 455/434 |
| 2018/0041936 | A1* | 2/2018 | Kim | H04W 72/085 |
| 2019/0379469 | A1 | 12/2019 | Lu et al. | |
| 2020/0163010 | A1* | 5/2020 | Qiao | H04W 76/27 |

OTHER PUBLICATIONS

3rd Generation Partnership Project, Technical Specification Group Radio Access Network; Evolved Universal Terrestrial Radio Access (E-UTRA); Radio Resource Control (RRC), Protocol specification (Release 15), 3GPP TS 36.331 V15.8.0, Dec. 2019, 964 pages.

Qualcomm Incorporated, "Introduction of Rel-16 eMTC enhancements", 3GPP TSG-RAN2 Meeting #18, R2-1915717, Reno, Nevada, Nov. 18-22, 2019, 306 pages.

KDDI Corporation, "Discussion on reselection between NPNs and public networks", 3GPP TSG-RAN WG2 Meeting #108, R2-1914492, Reno, USA, Nov. 18-22, 2019, 3 pages.

European Patent Office, "Supplementary European Search Report" dated Feb. 3, 2022, in connection with European Patent Application No. 21716952.3, 24 pages.

Samsung, "Support of 5G Indicator in EN-DC" 3GPP TSG-RAN WG2 Meeting #109-e, Electronic meeting, R2-2001576, Feb. 24-Mar. 6, 2020, 2 pages.

Huawei et al., "Introduction of bandlist for ENDC for 5G indicator" 3GPP TSG-RAN WG2 Meeting #109bis Electronic, R2-2003417, Apr. 20-30, 2020, 9 pages.

Huawei et al., "Introduction in new SIB of bandlist for ENDC for 5G indicator" 3GPP TSG-RAN WG2 Meeting #109bis Electronic, R1-2003419, Apr. 20-30, 2020, 6 pages.

TSG RAN, "LS on 5G indicator" 3GPP RAN Meeting #86, RP-193265, Sitges, Spain, Dec. 9-12, 2019, 2 pages.

* cited by examiner

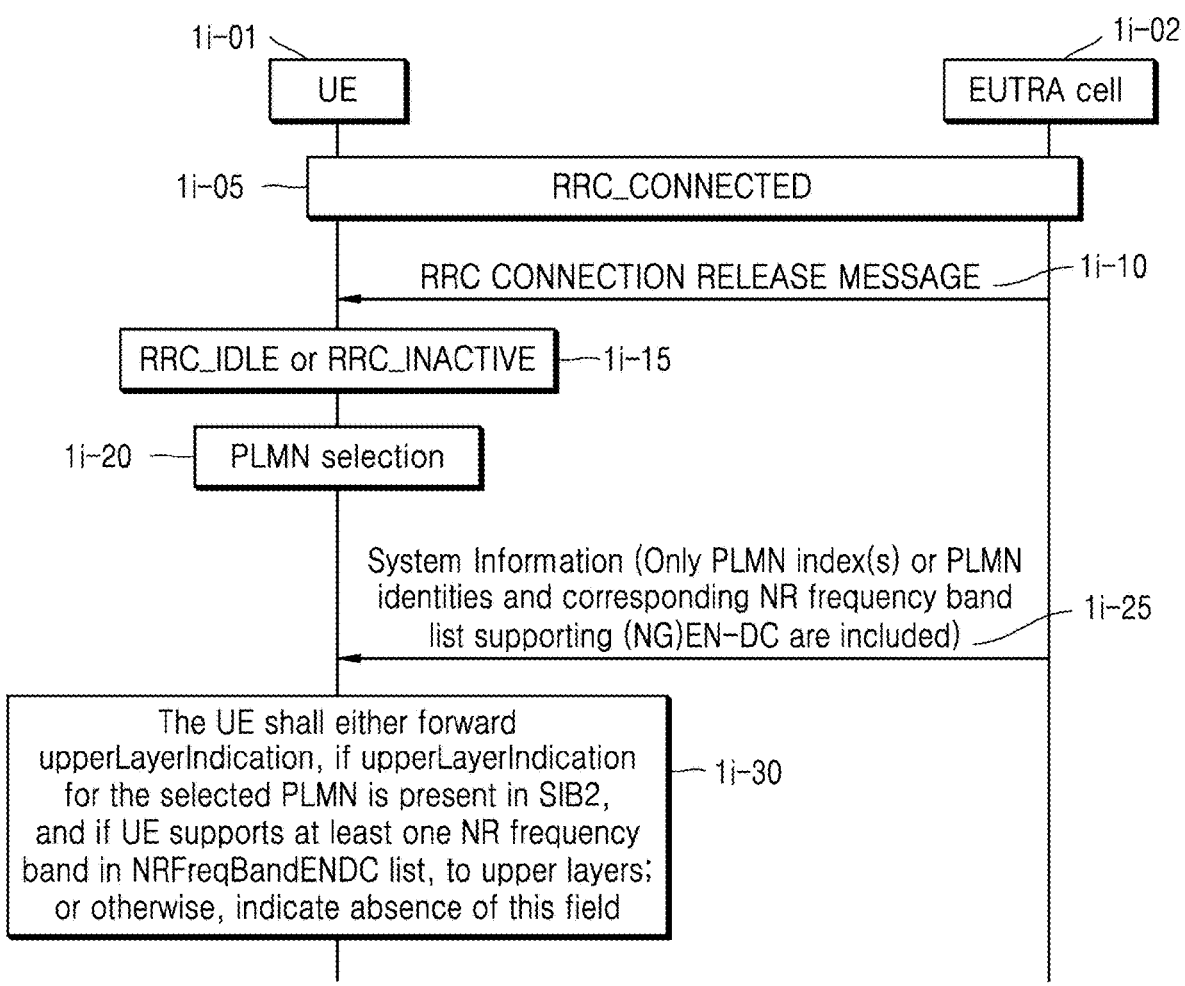

METHOD AND APPARATUS FOR PROVIDING FREQUENCY BAND LIST IN WIRELESS COMMUNICATION SYSTEM

CROSS-REFERENCE TO RELATED APPLICATION

This application is based on and claims priority under 35 U.S.C. § 119 to Korean Patent Application No. 10-2020-0006774 filed on Jan. 17, 2020 in the Korean Intellectual Property Office, the disclosure of which is incorporated by reference herein in its entirety.

BACKGROUND

1. Field

The disclosure relates to a method and apparatus for providing a frequency band list in a wireless communication system.

2. Description of Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' The 5G communication system defined in 3GPP is referred to as a new radio (NR) system. In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies are being studied, for example: beam-forming, massive multiple-input multiple-output (MIMO), full dimensional MIMO (FD-MIMO), array antennas, analog beam-forming, and large-scale antennas, and have been applied to NR systems. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G communication technology and IoT technology.

SUMMARY

Provided are a method and apparatus for providing a frequency band list to a user equipment (UE) in a wireless communication system.

Additional aspects will be set forth in part in the description which follows and, in part, will be apparent from the description, or may be learned by practice of the presented embodiments of the disclosure.

According to an embodiment of the disclosure, a terminal for cell reselection in a wireless communication system includes: a transceiver; and at least one processor configured to select a Public Land Mobile Network (PLMN) in an idle mode or an inactive mode, receive, from a base station, a PLMN identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s), receive, from the base station, a PLMN information list including one or more pieces of PLMN information via a third type system information block, wherein each of the one or more pieces of PLMN information includes a New Radio (NR) frequency band list for a corresponding PLMN in a same order as the first order for PLMN(s) in which the one or more pieces of PLMN identity information are listed in the PLMN identity list received via the first type system information block, determine whether at least one NR frequency for the selected PLMN is included in the NR frequency band list and whether the terminal supports to operate in E-UTRA-NR Dual Connectivity (EN-DC) by using the at least one NR frequency for the selected PLMN, when the at least one NR frequency for the selected PLMN is included in the NR frequency band list and the terminal supports to operate in the EN-DC by using the at least one NR frequency for the selected PLMN, transmit, to a upper layer, a upper layer indication, and when the at least one NR frequency for the selected PLMN is not included in the NR frequency band list or the terminal does not support to operate in the EN-DC by using the at least one NR frequency for the selected PLMN, transmit, to the upper layer, information indicating absence of the upper layer indication.

The at least one processor may be further configured to: receive, from the base station, the upper layer indication via a second type system information block, and when the at least one NR frequency for the selected PLMN is included in the NR frequency band list and the terminal supports to operate in the EN-DC by using the at least one NR frequency for the selected PLMN, transmit, to the upper layer, the upper layer indication regardless of the received upper layer indication, wherein the upper layer indication may be an indication to the upper layer that a cell for the selected PLMN offers NR capabilities.

The at least one processor may be further configured to: receive, from the base station, a Radio Resource Control (RRC) connection reconfiguration message including information associated with NR configuration, determine whether the terminal is configured to operate in the EN-DC based on the received RRC connection reconfiguration message, transmit, to the upper layer, the upper layer indication when the terminal is configured to operate in the EN-DC, and transmit, to the upper layer, information indicating absence of the upper layer indicator when the terminal is not configured to operate in the EN-DC.

The information associated with NR configuration may be transmitted to the terminal in a connected mode within the RRC connection reconfiguration message when at least one NR frequency band for the selected PLMN is supported.

The at least one processor may be further configured to transmit, to the base station, capability information including at least one of information indicating whether the terminal supports the EN-DC or information including NR bands supported by the terminal in the EN-DC.

According to an embodiment of the disclosure, a base station for cell reselection in a wireless communication system includes: a transceiver; and at least one processor configured to transmit, to a terminal, a Public Land Mobile Network (PLMN) identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s), and transmit, to the terminal, a PLMN information list including one or more pieces of PLMN information via a third type system information block, wherein each of the one or more pieces of PLMN information includes a New Radio (NR) frequency band list for a corresponding PLMN in a same order as the first order for PLMN(s) in which the one or more pieces of PLMN identity information are listed in the PLMN identity list received via the first type system information block, wherein, when at least one NR frequency for a PLMN selected by the terminal is included in the NR frequency band list and the terminal supports to operate in E-UTRA-NR Dual Connectivity (EN-DC) by using the at least one NR frequency for the PLMN selected by the terminal, a upper layer indication is transmitted to a upper layer of the terminal, and wherein, when the at least one NR frequency for the PLMN selected by the terminal is not included in the NR frequency band list or the terminal does not support to operate in the EN-DC by using the at least one NR frequency for the PLMN selected by the terminal, information indicating absence of the upper layer indication is transmitted to the upper layer of the terminal.

The at least one processor may be further configured to transmit, to the terminal, the upper layer indication via a second type system information block, and wherein, when the at least one NR frequency for the PLMN selected by the terminal is included in the NR frequency band list and the terminal supports to operate in the EN-DC by using the at least one NR frequency for the PLMN selected by the terminal, the upper layer indication may be transmitted to the upper layer of the terminal regardless of the received the upper layer indication, and wherein the upper layer indication may be an indication to the upper layer that a cell for the PLMN selected by the terminal offers NR capabilities.

The at least one processor may be further configured to transmit, to the terminal, a Radio Resource Control (RRC) connection reconfiguration message including information associated with NR configuration, wherein, when the terminal is configured to operate in the EN-DC based on the information associated with NR configuration, the upper layer indication may be transmitted to the upper layer of the terminal, and wherein, when the terminal is not configured to operate in the EN-DC based on the information associated with NR configuration, the information indicating absence of the upper layer indicator may be transmitted to the upper layer of the terminal.

The information associated with NR configuration may be transmitted to the terminal in a connected mode within the RRC connection reconfiguration message when at least one NR frequency band for the selected PLMN is supported.

The at least one processor may be further configured to receive, from the terminal, capability information including at least one of information indicating whether the terminal supports the EN-DC or information including NR bands supported by the terminal in the EN-DC.

According to an embodiment of the disclosure, a method, performed by a terminal, for cell reselection in a wireless communication system includes: selecting a Public Land Mobile Network (PLMN) in an idle mode or an inactive mode; receiving, from a base station, a PLMN identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s); receiving, from the base station, a PLMN information list including one or more pieces of PLMN information via a third type system information block, wherein each of the one or more pieces of PLMN information includes a New Radio (NR) frequency band list for a corresponding PLMN in a same order as the first order for PLMN(s) in which the one or more pieces of PLMN identity information are listed in the PLMN identity list received via the first type system information block; determining whether at least one NR frequency for the selected PLMN is included in the NR frequency band list and whether the terminal supports to operate in E-UTRA-NR Dual Connectivity (EN-DC) by using the at least one NR frequency for the selected PLMN; when the at least one NR frequency for the selected PLMN is included in the NR frequency band list and the terminal supports to operate in the EN-DC by using the at least one NR frequency for the selected PLMN, transmitting, to a upper layer, a upper layer indication; and when the at least one NR frequency for the selected PLMN is not included in the NR frequency band list or the terminal does not support to operate in the EN-DC by using the at least one NR frequency for the selected PLMN, transmitting, to the upper layer, information indicating absence of the upper layer indication.

The method may further include receiving, from the base station, the upper layer indication via a second type system information block, wherein the transmitting the upper layer indication may include, when the at least one NR frequency for the selected PLMN is included in the NR frequency band list and the terminal supports to operate in the EN-DC by using the at least one NR frequency for the selected PLMN, transmitting, to the upper layer, the upper layer indication regardless of the received the upper layer indication, and wherein the upper layer indication may be an indication to the upper layer that a cell for the selected PLMN offers NR capabilities.

The method may further include: receiving, from the base station, a Radio Resource Control (RRC) connection reconfiguration message including information associated with NR configuration; determining whether the terminal is configured to operate in the EN-DC based on the received RRC connection reconfiguration message; transmitting, to the upper layer, the upper layer indication when the terminal is configured to operate in the EN-DC; and transmitting, to the upper layer, information indicating absence of the upper layer indicator when the terminal is not configured to operate in the EN-DC.

The information associated with NR configuration may be transmitted to the terminal in a connected mode within the RRC connection reconfiguration message when at least one NR frequency band for the selected PLMN is supported.

The method may further include transmitting, to the base station, capability information including at least one of information indicating whether the terminal supports the EN-DC or information including NR bands supported by the terminal in the EN-DC.

According to an embodiment of the disclosure, a method, performed by a base station, for cell reselection in a wireless communication system includes: transmitting, to a terminal, a Public Land Mobile Network (PLMN) identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s); and transmitting, to the terminal, a PLMN information list including one or more pieces of PLMN information via a third type system information block, wherein each of the one or more pieces of PLMN information includes a New Radio (NR) frequency band list for a corresponding PLMN in a same order as the first order for PLMN(s) in which the one or more pieces of PLMN identity information are listed in the PLMN identity list received via the first type system information block, wherein, when at least one NR frequency for a PLMN selected by the terminal is included in the NR frequency band list and the terminal supports to operate in E-UTRA-NR Dual Connectivity (EN-DC) by using the at least one NR frequency for the PLMN selected by the terminal, a upper layer indication is transmitted to a upper layer of the terminal, and wherein, when the at least one NR frequency for the PLMN selected by the terminal is not included in the NR frequency band list or the terminal does not support to operate in the EN-DC by using the at least one NR frequency for the PLMN selected by the terminal, information indicating absence of the upper layer indication is transmitted to the upper layer of the terminal.

The method may further include transmitting, to the terminal, the upper layer indication via a second type system information block, wherein, when the at least one NR frequency for the PLMN selected by the terminal is included in the NR frequency band list and the terminal supports to operate in the EN-DC by using the at least one NR frequency for the PLMN selected by the terminal, the upper layer indication is transmitted to the upper layer of the terminal regardless of the received the upper layer indication, and wherein the upper layer indication is an indication to the upper layer that a cell for the PLMN selected by the terminal offers NR capabilities.

The method may further include transmitting, to the terminal, a Radio Resource Control (RRC) connection reconfiguration message including information associated with NR configuration, wherein, when the terminal is configured to operate in the EN-DC based on the information associated with NR configuration, the upper layer indication may be transmitted to the upper layer of the terminal, and wherein, when the terminal is not configured to operate in the EN-DC based on the information associated with NR configuration, the information indicating absence of the upper layer indicator may be transmitted to the upper layer of the terminal.

The information associated with NR configuration may be transmitted to the terminal in a connected mode within the RRC connection reconfiguration message when at least one NR frequency band for the selected PLMN is supported.

The method may further include receiving, from the terminal, capability information including at least one of information indicating whether the terminal supports the EN-DC or information including NR bands supported by the terminal in the EN-DC.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1I is a diagram for describing a procedure of determining whether a UE in an RRC idle mode or RRC inactive mode supports a certain frequency band, according to an embodiment of the disclosure;

FIG. 1O is a block diagram of a configuration of a base station, according to an embodiment of the disclosure.

DETAILED DESCRIPTION

Figure 1A:
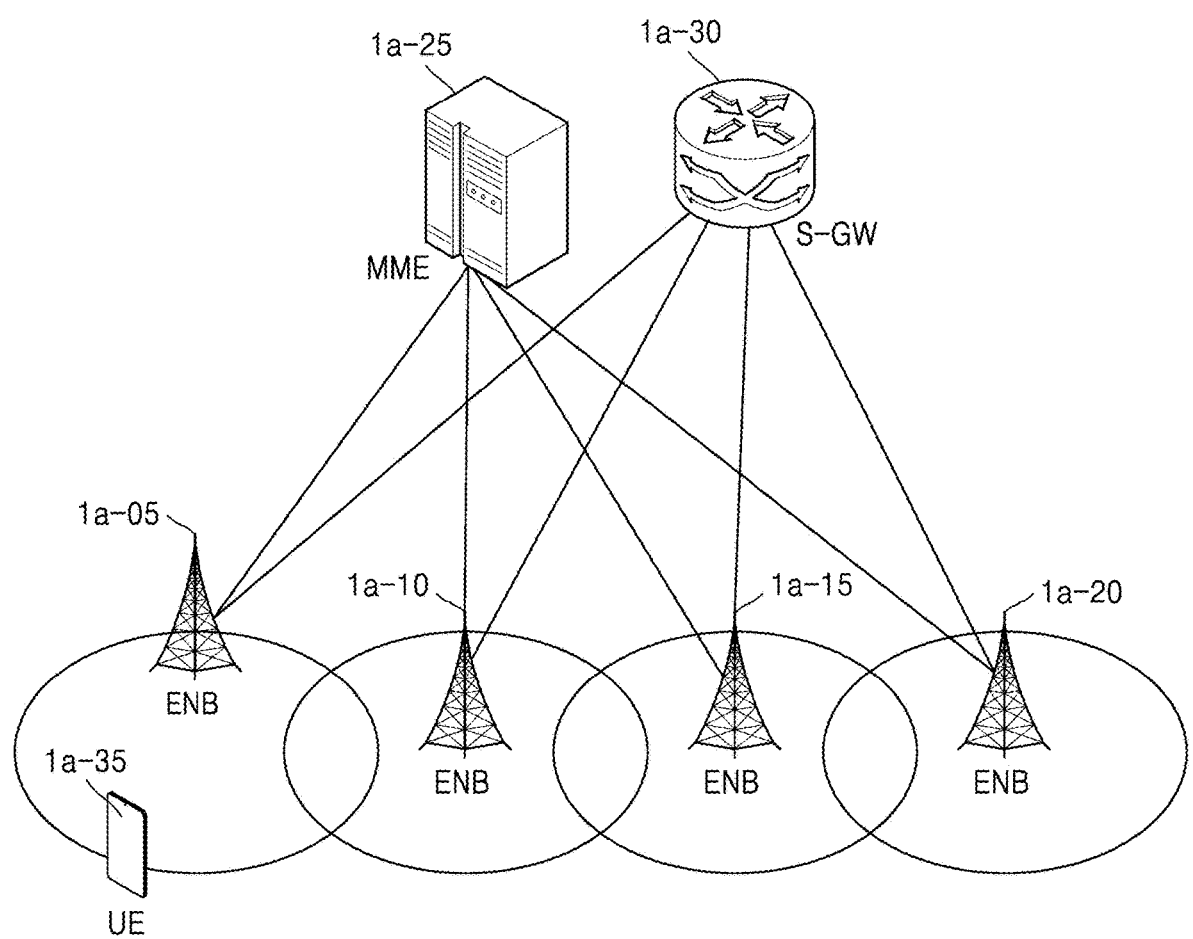
FIG. 1A is a diagram of a structure of a long-term evolution (LTE) system, according to an embodiment of the disclosure.

FIGS. 1A through 1O, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the 3rd generation partnership project long term evolution (3GPP LTE) standard. However, the disclosure is not limited by such terms and names, and may be equally applied to systems conforming to other standards. In the disclosure, an evolved node B (eNB) will be used interchangeably with a next generation node B (gNB) for convenience of description. In other words, a base station described as an eNB may also indicate a gNB.

Referring to FIG. 1A, a radio access network (RAN) of an LTE system may include evolved node Bs (eNBs) 1a-05, 1a-10, 1a-15, and 1a-20 (node Bs (NBs) or base stations), a mobility management entity (MME) 1a-25, and a serving-gateway (S-GW) 1a-30. A UE 1a-35 (or a terminal) may access an external network via the eNB 1a-05, 1a-10, 1a-15, or 1a-20 and the S-GW 1a-30.

In FIG. 1A, the eNBs 1a-05 through 1a-20 may correspond to existing NBs of a universal mobile telecommunication system (UMTS). The eNB 1a-05, 1a-10, 1a-15, or 1a-20 may be connected to the UE 1a-35 through a radio channel and may perform complex functions compared to the existing NB. In the LTE system, all user traffic including a real-time service such as voice over internet protocol (VoIP) may be provided via a shared channel. Accordingly, an entity that schedules the UEs 1a-35 by gathering state information such as buffer states, available transmit power states, and channel states of the UEs 1a-35 is required, and the eNB 1a-05, 1a-10, 1a-15, or 1a-20 may operate as the entity.

A single eNB may generally control multiple cells. For example, the LTE system may use radio access technology such as orthogonal frequency division multiplexing (OFDM) at a bandwidth of 20 MHz to achieve a data rate of 100 Mbps. Also, an adaptive modulation and coding (AMC) scheme may be used to determine a modulation scheme and a channel coding rate in accordance with the channel state of the UE 1a-35. The S-GW 1a-30 is an entity for providing data bearers and may configure or release the data bearers under the control of the MME 1a-25. The MME 1a-25 is an entity for performing a mobility management function and various control functions for the UE 1a-35 and may be connected to the eNBs 1a-05, 1a-10, 1a-15, and 1a-20.

Figure 1B:
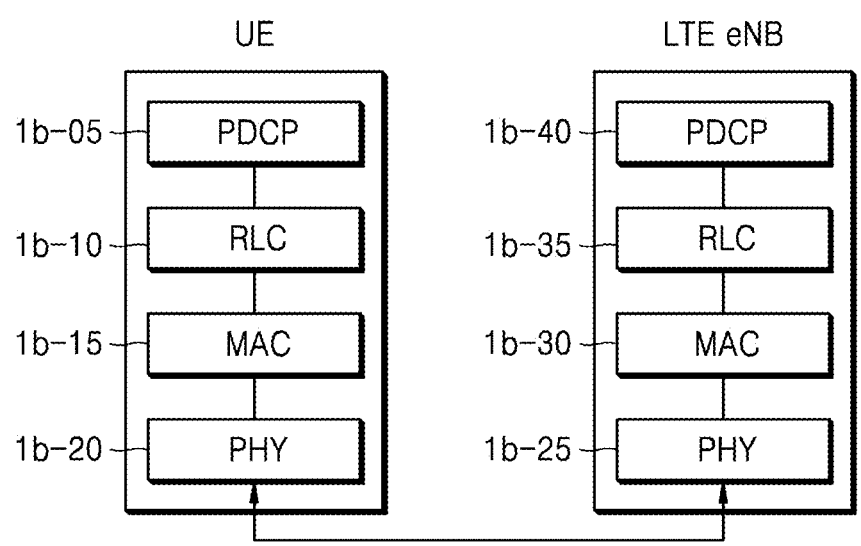
FIG. 1B is a diagram of a radio protocol architecture in an LTE system, according to an embodiment of the disclosure.

FIG. 1B is a diagram of a radio protocol architecture in an LTE system, according to an embodiment of the disclosure.

Referring to FIG. 1B, a radio protocol of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 may perform operations such as internet protocol (IP) header compression/restoration. Main functions of the PDCP layer 1b-05 or 1b-40 may be summarized as below.

Header compression and decompression: Robust header compression (ROHC) only
    Transfer of user data
    In-sequence delivery of upper layer packet data units (PDUs) at PDCP re-establishment procedure for RLC acknowledged mode (AM)
    For split bearers in dual connectivity (DC) (only support for RLC AM): PDCP PDU routing for transmission and PDCP PDU reordering for reception)
    Duplicate detection of lower layer service data units (SDUs) at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink The RLC layer 1b-10 or 1b-35 may perform, for example, an automatic request for repetition (ARQ) operation by reconfiguring PDCP PDUs to appropriate sizes. Main functions of the RLC layer 1b-10 or 1b-35 may be summarized as below.

Transfer of upper layer PDUs
    Error Correction through ARQ (only for AM data transfer)
    Concatenation, segmentation, and reassembly of RLC SDUs (only for unacknowledged mode (UM) and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer 1b-15 or 1b-30 may be summarized as below.

Mapping between logical channels and transport channels
    Multiplexing/demultiplexing of MAC SDUs belonging to one or different logical channels into/from transport blocks (TBs) delivered to/from the physical layer on transport channels
    Scheduling information reporting
    Error correction through HARQ
    Priority handling between logical channels of one UE
    Priority handling between UEs by means of dynamic scheduling
    Multimedia broadcast multicast service (MBMS) identification
    Transport format selection
    Padding A physical layer 1b-20 or 1b-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 1C:
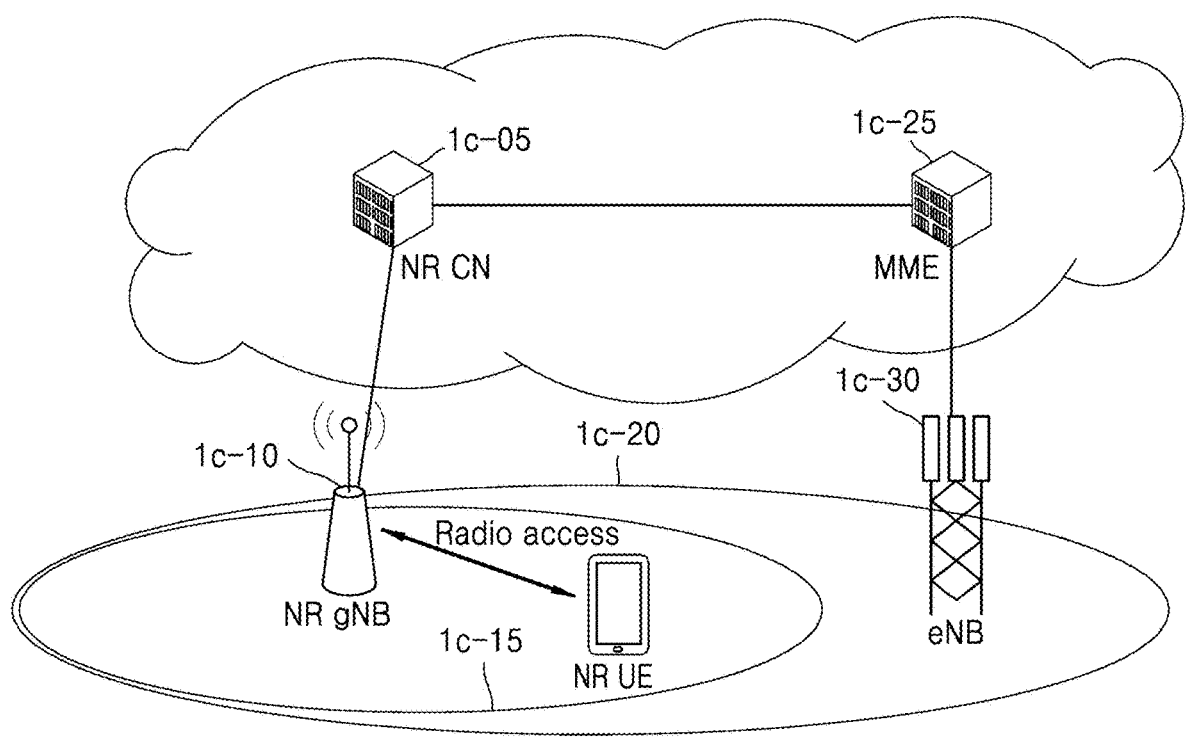
FIG. 1C is a diagram of a structure of a next-generation mobile communication system, according to an embodiment of the disclosure.

FIG. 1C is a diagram of a structure of a next-generation mobile communication system, according to an embodiment of the disclosure.

Referring to FIG. 1C, a RAN of a next-generation mobile communication system (hereinafter, NR or 5G) may include an NR gNB 1c-10 (or NR base station) and an NR core network (CN) 1c-05. An NR UE 1c-15 (or a terminal) may access an external network via the NR gNB 1c-10 and the NR CN 1c-05.

In FIG. 1C, the NR gNB 1c-10 may correspond to an eNB of an existing LTE system. The NR gNB 1c-10 is connected to the NR UE 1c-15 through radio channels and may provide superior services compared to an existing NB. In the next-generation mobile communication system, all user traffic may be provided via a shared channel. Accordingly, an entity that schedules NR UEs 1c-15 by gathering state information such as buffer states, available transmit power states, and channel states of the NR UEs 1c-15 is required, and the NR gNB 1c-10 may operate as the entity. A single NR gNB 1c-10 may control a plurality of cells. In the next-generation mobile communication system, a bandwidth equal to or greater than a current maximum bandwidth may be applied to implement an ultra-high data rate compared to a current LTE system. Also, a beamforming technique may be grafted by using OFDM as a radio access technique. Also, an AMC scheme may be used to determine a modulation scheme and a channel coding rate in accordance with a channel state of the NR UE 1c-15. The NR CN 1c-05 may perform functions such as mobility support, bearer setup, and quality of service (QoS) setup. The NR CN 1c-05 is an entity for performing a mobility management function and various control functions for the NR UE 1c-15 and may be connected to a plurality of the NR gNBs 1c-10. The next-generation mobile communication system may cooperate with the existing LTE system, and the NR CN 1c-05 may be connected to an MME 1c-25 through a network interface. The MME 1c-25 may be connected to an eNB 1c-30 that is an existing base station.

Figure 1D:
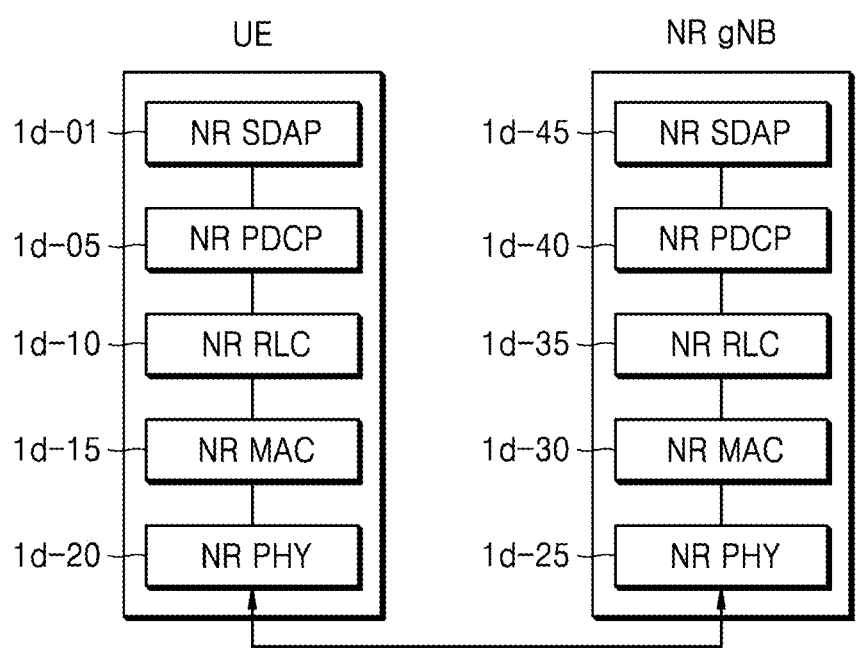
FIG. 1D is a diagram of a radio protocol architecture of a next-generation mobile communication system, according to an embodiment of the disclosure.

FIG. 1D is a diagram of a radio protocol architecture of a next-generation mobile communication system, according to an embodiment of the disclosure.

Referring to FIG. 1D, a radio protocol of the next-generation mobile communication system may include NR service data adaptation protocol (SDAP) layers 1d-01 and 1d-45, NR PDCP layers 1d-05 and 1d-40, NR RLC layers 1*d*-10 and 1*d*-35, NR MAC layers 1*d*-15 and 1*d*-30, and NR physical (PHY) layers 1*d*-20 and 1*d*-25 respectively for a UE and an NR gNB.

Main functions of the NR SDAP layers 1*d*-01 and 1*d*-45 may include some of the following functions.

Transfer of user plane data

Mapping between QoS flow and a data radio bearer (DRB) for both downlink (DL) and uplink (UL)

Marking QoS flow ID in both DL and UL packets

Reflective QoS flow to DRB mapping for the UL SDAP PDUs

For the NR SDAP layer 1*d*-01 or 1*d*-45, the UE may be configured with whether to use a header of the NR SDAP layer 1*d*-01 or 1*d*-45 for each NR PDCP layer 1*d*-05 or 1*d*-40, bearer, or logical channel or whether to use a function of the NR SDAP layer 1*d*-01 or 1*d*-45 via an RRC message. When a SDAP header is configured, a 1-bit non-access stratum (NAS) reflective QoS configuration indicator and a 1-bit access stratum (AS) reflective QoS configuration indicator of the SDAP header may indicate the UE to update or reconfigure mapping information between a QoS flow and a data bearer for both UL and DL. The SDAP header may include QoS flow ID indicating QoS. QoS information may be used as data processing priority information, scheduling information, etc. for supporting a smooth service.

Main functions of the NR PDCP layer 1*d*-05 or 1*d*-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

A reordering function of the NR PDCP layer 1*d*-05 or 1*d*-40 may include denote a function of reordering PDCP PDUs received from a lower layer, based on a PDCP sequence number (SN). The reordering function of the NR PDCP layer 1*d*-05 or 1*d*-40 may include a function of delivering the reordered data to an upper layer in order or a function of immediately delivering the reordered data without considering an order, may include a function of recording missing PDCP PDUs by reordering the PDCP PDUs, may include a function of reporting state information of the missing PDCP PDUs to a transmitter, and may include a function of requesting to retransmit the missing PDCP PDUs.

The main functions of the NR RLC layer 1*d*-10 or 1*d*-35 may include at least some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC layer 1*d*-10 or 1*d*-35 may denote a function of delivering RLC SDUs received from a lower layer, to an upper layer in order. When one RLC SDU is segmented into a plurality of RLC SDUs and received, the in-sequence delivery of the NR RLC layer 1*d*-10 or 1*d*-35 may include reassembly and delivery functions.

The in-sequence delivery of the NR RLC layer 1*d*-10 or 1*d*-35 may include a function of reordering received RLC PDUs on an RLC SN or PDCP SN basis, a function of recording missing RLC PDUs by reordering the RLC PDUs, a function of reporting state information of the missing RLC PDUs to a transmitter, and a function of requesting to retransmit the missing RLC PDUs. The in-sequence delivery of the NR RLC layer 1*d*-10 or 1*d*-35 may include a function of delivering only RLC SDUs previous to a missing RLC SDU, to the upper entity in order, when the missing RLC SDU exists. The in-sequence delivery of the NR RLC layer 1*d*-10 or 1*d*-35 may include a function of delivering all RLC SDUs received before a certain timer started, to the upper entity in order, when the certain timer expired despite of a missing RLS SDU. The in-sequence delivery of the NR RLC layer 1*d*-10 or 1*d*-35 may include a function of delivering all RLC SDUs currently received to the upper entity in order, when a certain timer expired despite of a missing RLS SDU.

The NR RLC layer 1*d*-10 or 1*d*-35 may process the RLC PDUs in an order of reception regardless of an order of sequence numbers (out-of-sequence delivery) and deliver the same to the NR PDCP layer 1*d*-05 or 1*d*-40.

When the NR RLC layer 1*d*-10 or 1*d*-35 receives segments, the NR RLC layer 1*d*-10 or 1*d*-35 may reassemble the segments to be received later or stored in a buffer, into a whole RLC PDU, process the hole RLC PDU and deliver the same to the NR PDCP layer 1*d*-05 or 1*d*-40.

The NR RLC layer 1*d*-10 or 1*d*-35 may not have a concatenation function, and the concatenation function may be performed by the NR MAC layer 1*d*-15 or 1*d*-30 or be replaced with a multiplexing function of the NR MAC layer 1*d*-15 or 1*d*-30.

In the above description, out-of-sequence delivery of the NR RLC layer 1*d*-10 or 1*d*-35 may denote a function of delivering RLC SDUs received from a lower layer, immediately to an upper layer out of an order. The out-of-sequence delivery of the NR RLC layer 1*d*-10 or 1*d*-35 may include a function of reassembling several RLC SDUs when originally one RLC SDU is segmented and received in the several RLC SDUs. The out-of-sequence delivery of the NR RLC layer 1*d*-10 or 1*d*-35 may include a function of storing RLC SNs or PDCP SNs of received RLC PDUs and recording missing RLC PDUs by aligning the received RLC PDUs in an order.

The NR MAC layer 1*d*-15 or 1*d*-30 may be connected to multiple NR RLC layers 1*d*-10 or 1*d*-35 configured for a single UE, and main functions of the NR MAC layer 1*d*-15 or 1*d*-30 may include at least some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS identification

Transport format selection

Padding

The PHY layer 1*d*-20 or 1*d*-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 1E:
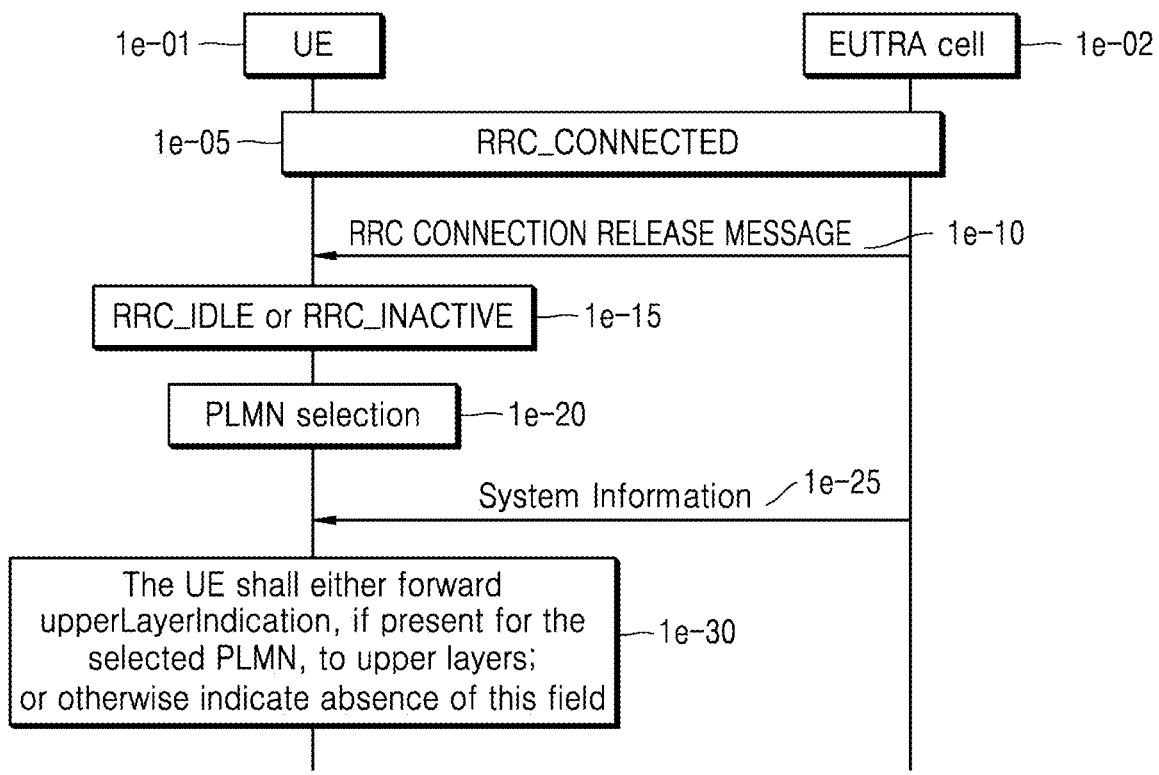
FIG. 1E is a diagram for describing a procedure of determining that a user equipment (UE) in a radio resource control (RRC) idle mode or RRC inactive mode is located in a certain coverage area, according to an embodiment of the disclosure.

FIG. 1E is a diagram for describing a procedure of determining that a UE 1e-01 in an RRC idle mode RRC_IDLE or RRC inactive mode RRC_INACTIVE is located in a certain coverage area, according to an embodiment of the disclosure.

Hereinafter, for convenience of descriptions, an example in which the UE 1e-01 that was operating in an LTE system is located in a coverage area of an NR system is described, but the LTE system and the NR system are only examples, and an embodiment of the disclosure may be applied to another next-generation communication system. In particular, FIG. 1E is a diagram for describing a procedure of determining whether the UE 1e-01 in the RRC idle mode (RRC_IDLE) or RRC inactive mode (RRC_INACTIVE) in the LTE system is located in a coverage area providing a 5G service.

An LTE base station according to an embodiment of the disclosure may signal whether 5G capability is supported to the UE 1e-01, as system information. In other words, the LTE base station may signal an indicator of whether NG-RAN E-UTRA-NR dual connectivity ((NG)EN-DC) is supported for each public land mobile network (PLMN) to the UE 1e-01, as system information. The UE 1e-01 may determine whether the UE 1e-01 is located in a coverage area supporting 5G capability, based on the indicator included in the system information, and accordingly, the UE 1e-01 may display a 5G icon by transmitting an indicator indicating whether 5G is supported to an upper layer.

Referring to FIG. 1E, the UE 1e-01 may establish an RRC connection with an evolved universal telecommunications system (UMTS) terrestrial radio access (EUTRA) cell 1e-02 and thus be in an RRC connected mode (RRC_CONNECTED), in operation 1e-05.

In operation 1e-10, when there is no data transmission/reception due to a certain reason or for a certain period of time, the EUTRA cell 1e-02 may transmit an RRC connection release message (RRCConnectionRelease) to the UE 1e-01. In operation 1e-10, the RRC connection release message may include RRC inactive configuration information (rrc_InactiveConfig).

In operation 1e-15, when the RRC connection release message includes the RRC inactive configuration information, the UE 1e-01 may transition to the RRC inactive mode. When the RRC connection release message does not include the RRC inactive configuration information, the UE 1e-01 may transition to the RRC idle mode. In other words, the UE 1e-01 that received the RRC connection release message may transition to the RRC inactive mode or RRC idle mode depending on whether the RRC inactive configuration information is included in the RRC connection release message.

In operation 1e-20, the UE 1e-01 in the RRC idle mode or RRC inactive mode may select a PLMN. The UE 1e-01 may select the PLMN via a series of following processes.

The UE 1e-01 may scan all radio frequency (RF) channels with respect to E-UTRA bands depending on capability of the UE 1e-01.

For each carrier, the UE 1e-01 may find a cell having strongest signal strength and receive system information from the cell.

When at least one PLMN identifier is receivable from the cell having the strongest signal strength, the UE 1e-01 may report an upper layer (for example, NAS) that the at least one PLMN identifier is a high quality PLMN. Here, when a measured received signal received power (RSRP) value is equal to or greater than −110 dBm, the UE 1e-01 may report the upper layer about the high quality PLMN, and when not, the UE 1e-01 may report the upper layer together with the RSRP value.

When the UE 1e-01 supports E-UTRA connected to a 5G core (5GC) with respect to a found PLMN, the UE 1e-01 may also report a CN type to the upper layer.

In operation 1e-25, the UE 1e-01 in the RRC idle mode or RRC inactive mode may perform a cell selection process. The cell selection process may denote a process for the UE 1e-01 to camp on a suitable cell associated to the PLMN selected in operation 1e-20. The suitable cell may denote a cell satisfying following conditions.

When the cell is a part of either the selected PLMN, a registered PLMN, or a PLMN of an equivalent PLMN list When the cell is not barred according to information provided from the upper layer When the cell is a part of at least one Tracking Area (TA) that is not a part of a list of "forbidden tracking areas for roaming", which belongs to the PLMN described above (The cell is part of at least one TA that is not part of the list of "forbidden tracking areas for roaming), which belongs to a PLMN that fulfils the first bullet above)

In operation 1e-25, the UE 1e-01 in the RRC idle mode or RRC inactive mode may receive the system information to perform the cell selection process. In operation 1e-25, when the UE 1e-01 received SystemInformationBlockType1, the UE 1e-01 may use plmn-IdentityList, trackingAreaCode, and cellIdentity for the cell as received in a corresponding cellAccessRelatedInfoList containing the selected PLMN in operation 1e-20. In particular, the plmn-IdentityList may include at least one PLMN-IdentityInfo, and the plmn-IdentityList including at least one PLMN-IdentityInfo for each core type (for example, an evolved packet core (EPC) and/or 5GC) supported by an LTE cell may be configured. For example, PLMN-IdentityInfo of the LTE cell connected to the EPC may be configured of plmn-IdentityList up to maxPLMN-r11. For reference, maxPLMN-r11 may have a value of 6. Also, PLMN-IdentityInfo of the LTE cell connected to the 5GC may be configured of plmn-IdentityList up to maxPLMN-r11. Similarly, maxPLMN-r11 may have a value of 6. One LTE cell may be connected only to the EPC, only to the 5GC, or both to the EPC and the 5GC. plmn-IdentityList may have an ASN.1 structure below.

Referring to Table 1, at least one PLMN-IdentityInfo may be configured for the LTE cell connected to the EPC, and each PLMN-IdentityInfo may be configured of a plmn-Identity value and cellReservedForOperatorUse.

TABLE 1

| | |
|---|---|
| PLMN-IdentityList ::= | SEQUENCE (SIZE (1..maxPLMN-r11)) OF PLMN-IdentityInfo |
| PLMN-IdentityInfo ::= | SEQUENCE { |
| plmn-Identity | PLMN-Identity, |
| cellReservedForOperatorUse | ENUMERATED {reserved, notReserved} |
| } | |

Hereinafter, PLMN-IdentityInfo will be described with reference to Table 2. At least one PLMN-IdentityInfo may be configured for the LTE cell connected to the 5GC. Also, when a same PLMN-Identity as the LTE connected to the EPC is used, each PLMN-IdentityInfo may include a plmn index instead of the PLMN-Identity value itself. For example, when the plmn index is '1', the plmn index may denote PLMN-Identity included in first PLMN-IdentityInfo of the LTE cell connected to the EPC. When the plmn index is '2', the plmn index may denote PLMN-Identity included in second PLMN-IdentityInfo of the LTE cell connected to the EPC. Accordingly, because PLMN-IdentityInfo does not include the same PLMN-Identity value, but includes plmn index, signaling overhead may be reduced. When PLMN-Identity different from the LTE cell connected to the EPC is to be broadcasted to each PLMN-IdentityInfo, the PLMN-Identity value itself may be included. In other words, the LTE cell may determine whether to broadcast the PLMN-Identity or plmn index via a CHOICE structure, and signal a result of the determination to the UE 1e-01. Also, PLMN-IdentityInfo may include cellReservedForOperatorUse for each PLMN.

TABLE 2

```
PLMN-IdentityInfo-r15 ::=       SEQUENCE {
    plmn-Identity-5GC-r15           CHOICE{
        plmn-Identity-r15               PLMN-Identity,
        plmn-Index-r15                  INTEGER
                                         (1..maxPLMN-r11)
    },
    cellReservedForOperatorUse-r15  ENUMERATED {reserved,
                                         notReserved},
    cellReservedForOperatorUse-CRS-r15  ENUMERATED {reserved,
                                         notReserved}
}
```

In operation 1e-25, the UE 1e-01 may receive SystemInformationBlockType2. In this case, in operation 1e-30, the UE 1e-01 may determine whether to transmit, to an upper layer, upperLayerIndication including information that the UE 1e-01 is within the coverage area providing the 5G service. In particular, the SystemInformationBlockType2 may include the upperLayerIndication about providing of 5G capability for each PLMN in a same order as PLMN information (PLMN identity/plmn index) included in the SystemInformationBlockType1. A corresponding ASN.1 structure is as follows.

PLMN-InfoList including at least one PLMN-Info may be broadcasted in SystemInformationBlockType2.
Each PLMN-Info may be mapped in a same order of PLMN Identity or plmn index broadcasted in SystemInformationBlockType1. In other words, first PLMN-Info may be mapped to plmn-Identity of first PLMN-IdentityInfo broadcasted in SystemInformationBlockType1.
Referring to Table 3, each PLMN-Info may include upperLayerIndication indicator about whether a cell in a corresponding PLMN provides 5G capability. When upperLayerIndication is set to TRUE, the cell in the corresponding PLMN may provide 5G capability. Otherwise, the cell in the corresponding PLMN may not provide 5G capability.

When upperLayerIndication is set to TRUE with respect to the PLMN selected in operation 1e-25 (or the selected PLMN identity), the UE 1e-01 in the RRC idle mode or RRC inactive mode may transmit upperLayerIndication to the upper layer in operation 1e-30. Otherwise, the UE 1e-01 may indicate that a corresponding field is absent (the UE shall to upper layers either forward upperLayerIndication, if present for the selected PLMN, or otherwise indicate absence of this field). The upperLayerIndication may be an indicator notifying the upper layers that the UE 1e-01 is in the coverage area providing the 5G service (upperLayerIndication is an indication to upper layers that the UE has entered a coverage area that offers 5G capabilities). For reference, when the UE 1e-01 transmits the upperLayerIndication to the upper layer, the UE 1e-01 may display a 5G icon on a display of the UE 1e-01.

Figure 1F:
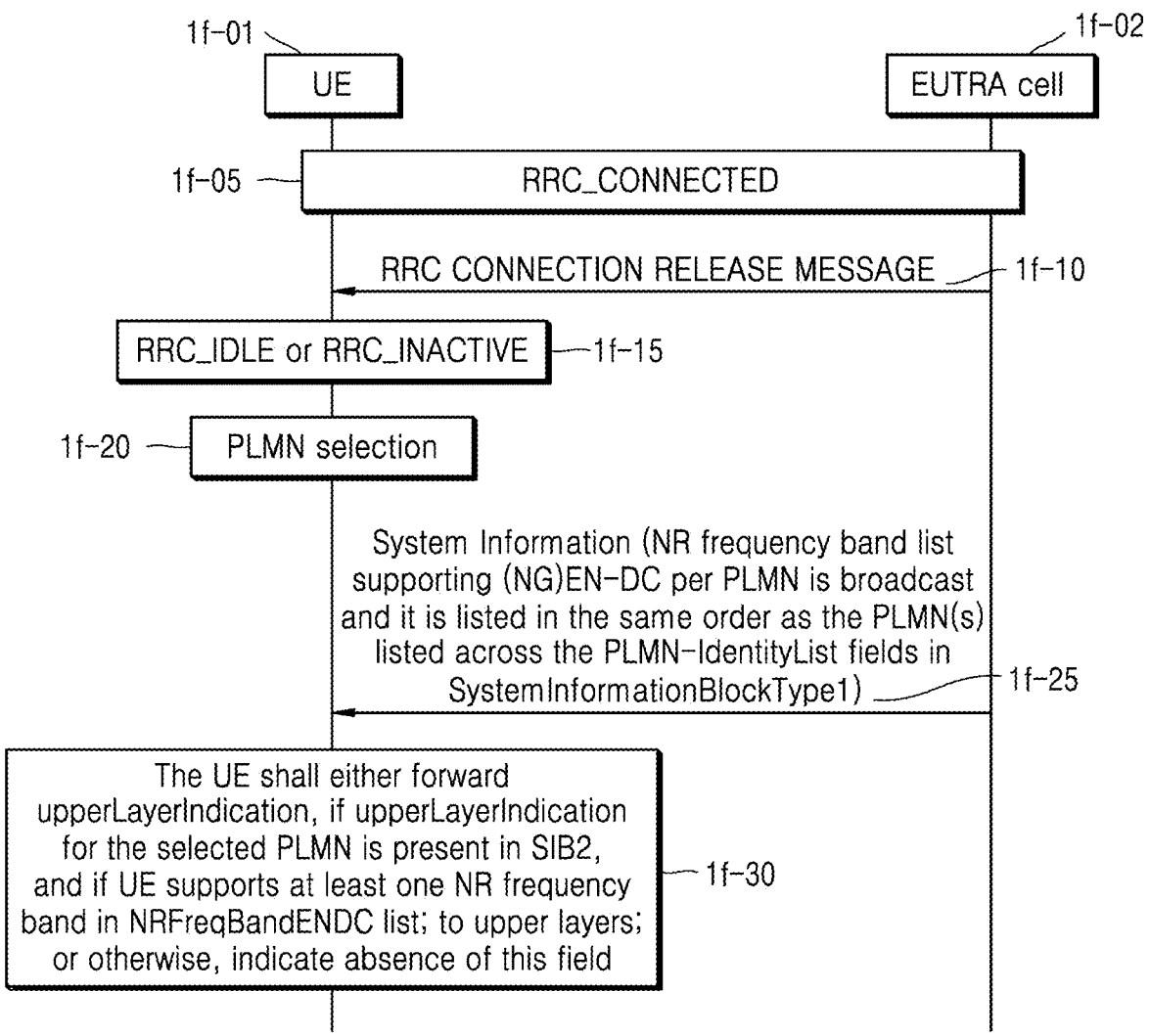
FIG. 1F is a diagram for describing a procedure of determining whether a UE in an RRC idle mode or RRC inactive mode supports a certain frequency band, according to an embodiment of the disclosure.

FIG. 1F is a diagram for describing a procedure of determining whether a UE 1f-01 supports a certain frequency band, according to an embodiment of the disclosure. Hereinafter, for convenience of description, an example in which the UE 1f-01 that is operating in an LTE system is located in a coverage area providing NR capability is described, but the LTE system and an NR system are only examples, and an embodiment of the disclosure may be applied to another next-generation communication system. In detail, FIG. 1F is a diagram for describing a procedure in which the LTE system determines that the UE 1f-01 in an RRC idle mode (RRC_IDLE) or RRC inactive mode (RRC_INACTIVE) is located in a coverage area providing 5G capability and determines whether the UE 1f-01 supports an NR frequency band supporting (NG)EN-DC.

A EUTRA cell 1f-02 according to an embodiment of the disclosure may signal whether 5G capability is supported, as system information. For example, the EUTRA cell 1f-02 may signal, to the UE 1f-01, an NR frequency band list supporting (NG)EN-DC for per PLMN, as the system information. As described in the above embodiment of the disclosure, the UE 1f-01 may determine whether the UE is located in the coverage area supporting the 5G capability, based on an indicator included in the system information. Also, the UE 1f-01 may display a 5G icon by transmitting an indicator indicating the 5G capability to an upper layer, based on whether at least one NR frequency band in the NR frequency band list supporting (NG)EN-DC included in the system information is supported.

Referring to FIG. 1F, the UE 1f-01 may establish an RRC connection with the EUTRA cell 1f-02 and thus be in an RRC connected mode (RRC_CONNECTED), in operation 1f-05.

In operation 1f-10, when there is no data transmission/reception due to a certain reason or for a certain period of time, the EUTRA cell 1f-02 may transmit an RRC connection release message (RRCConnectionRelease) to the UE 1f-01. In operation 1f-10, the RRC connection release message may include RRC inactive configuration information (rrc_InactiveConfig). In operation 1f-15, when the RRC connection release message includes the RRC inactive configuration information, the UE 1f-01 may transition to the

TABLE 3

```
PLMN-InfoList-r15 ::=     SEQUENCE (SIZE (1..maxPLMN-r11)) OF PLMN-Info-r15
PLMN-Info-r15 ::=         SEQUENCE {
    upperLayerIndication-r15    ENUMERATED {true}    OPTIONAL    -- Need OR
}
-- ASN1STOP
```

RRC inactive mode. In operation **1*f*-15, when the RRC connection release message does not include the RRC inactive configuration information, the UE 1*f*-01 may transition to the RRC idle mode. In other words, the UE 1*f*-01** that received the RRC connection release message may transition to the RRC inactive mode or RRC idle mode depending on whether the RRC inactive configuration information is included in the RRC connection release message.

In operation **1*f*-20, the UE 1*f*-01 in the RRC idle mode or RRC inactive mode may select a PLMN. The UE 1*f*-01** may select the PLMN via a series of following processes.

The UE **1*f*-01 may scan all RF channels with respect to E-UTRA bands depending on capability of the UE 1*f*-01**.

For each carrier, the UE **1*f*-01** may find a cell having strongest signal strength and receive system information from the cell.

When at least one PLMN identifier is receivable from the cell having the strongest signal strength, the UE **1*f*-01 may report an upper layer (for example, NAS) that the at least one PLMN identifier is a high quality PLMN. Here, when a measured RSRP value is equal to or greater than −110 dBm, the UE 1*f*-01 may report the upper layer about the high quality PLMN, and when not, the UE 1*f*-01** may report the upper layer together with the RSRP value.

When the UE **1*f*-01 supports E-UTRA connected to a 5GC with respect to a found PLMN, the UE 1*f*-01** may also report a CN type to the upper layer.

In operation **1*f*-25, the UE 1*f*-01 in the RRC idle mode or RRC inactive mode may perform a cell selection process. The cell selection process may denote a process for the UE 1*f*-01 to camp on a suitable cell associated to the PLMN selected in operation 1*f*-20**. The suitable cell may denote a cell satisfying following conditions.

When the cell is a part of either the selected PLMN, a registered PLMN, or a PLMN of an equivalent PLMN list When the cell is not barred according to information recently provided from the upper layer When the cell is a part of at least one TA that is not a part of a list of "forbidden tracking areas for roaming", which belongs to the PLMN described above (The cell is part of at least one TA that is not part of the list of "forbidden tracking areas for roaming", which belongs to a PLMN that fulfils the first bullet above)

In operation **1*f*-25, the UE 1*f*-01** in the RRC idle mode or RRC inactive mode may receive the system information to perform the cell selection process.

In operation **1*f*-25, the UE 1*f*-01 may receive SystemInformationBlockType1. Here, when PLMN Identity or plmn index matching the PLMN selected in operation 1*f*-20** is included in cellAccessRelatedInfoList, plmn-IdentityList, trackingAreaCode, and cellIdentity included in cellAccessRelatedInfoList may be used. In particular, the plmn-IdentityList may include at least one PLMN-IdentityInfo, and the plmn-IdentityList including at least one PLMN-IdentityInfo for each core type (for example, an evolved packet core (EPC) and/or 5GC) supported by an LTE cell may be configured. For example, PLMN-IdentityInfo of the LTE cell connected to the EPC may be configured of plmn-IdentityList up to maxPLMN-r11. For example, maxPLMN-r11 may have a value of 6. Alternatively, PLMN-IdentityInfo of an LTE cell connected to EPC based on a newly defined constant value may be configured of plmn-IdentityList up to maxPLMN-r16. Similarly, PLMN-IdentityInfo of the LTE cell connected to the 5GC may be configured of plmn-IdentityList up to maxPLMN-r11. For example, maxPLMN-r11 may have a value of 6. Alternatively, PLMN-IdentityInfo of the LTE cell connected to the 5GC based on a newly defined constant value may be configured of plmn-IdentityList up to maxPLMN-r16. One LTE cell may be connected only to the EPC, only to the 5GC, or both to the EPC and the 5GC. plmn-IdentityList may have an ASN.1 structure below.

Referring to Table 4, at least one PLMN-IdentityInfo may be configured for the LTE cell connected to the EPC, and each PLMN-IdentityInfo may be configured of a plmn-Identity value and cellReservedForOperatorUse.

TABLE 4

| | |
|---|---|
| PLMN-IdentityList ::= | SEQUENCE (SIZE (1..maxPLMN-r11)) OF PLMN-IdentityInfo |
| PLMN-IdentityInfo ::= | SEQUENCE { |
|   plmn-Identity |   PLMN-Identity, |
|   cellReservedForOperatorUse |   ENUMERATED {reserved, notReserved} |
| } | |

At least one PLMN-IdentityInfo may be configured for the LTE cell connected to the 5GC, and each PLMN-IdentityInfo may include a plmn index when a same Plmn-Identity as the LTE cell connected to the EPC is used. For example, when the plmn index is '1', the plmn index may denote PLMN-Identity included in first PLMN-IdentityInfo of the LTE cell connected to the EPC. Also, when the plmn index is '2', the plmn index may denote PLMN-Identity included in second PLMN-IdentityInfo of the LTE cell connected to the EPC. Accordingly, PLMN-IdentityInfo does not include the same PLMN-Identity value, but includes plmn index, and thus signaling overhead may be reduced. When PLMN-Identity different from the LTE cell connected to the EPC is to be broadcasted to each PLMN-IdentityInfo, the PLMN-Identity value itself may be included. In other words, the LTE cell may determine whether to broadcast the PLMN-Identity or plmn index via a CHOICE structure, and signal a result of the determination to the UE **1*f*-01**. Also, PLMN-IdentityInfo may include cellReservedForOperatorUse for each PLMN Identity.

TABLE 5

| | |
|---|---|
| PLMN-IdentityInfo-r15 ::= | SEQUENCE { |
|   plmn-Identity-5GC-r15 |   CHOICE{ |
|     plmn-Identity-r15 |     PLMN-Identity, |
|     plmn-Index-r15 |     INTEGER (1..maxPLMN-r11) |
|   }, | |
|   cellReservedForOperatorUse-r15 |   ENUMERATED {reserved, notReserved}, |
|   cellReservedForOperatorUse-CRS-r15 |   ENUMERATED {reserved, notReserved} |
| } | |

In operation **1*f*-25, the EUTRA cell 1*f*-02** may broadcast the NR frequency band list supporting (NG)EN-DC per PLMN, as the system information. For example, the NR frequency band list supporting (NG)EN-DC per PLMN may be broadcasted from SystemInformationBlockType1, SystemInformationBlockType2, SystemInformationBlockType5, SystemInformationBlockType24, or new SystemInformationBlockType (for example, SystemInformationBlockType27). In the disclosure, the NR frequency band list supporting (NG)EN-DC per PLMN may be broadcasted in a same order as PLMN-Identity/plmn index included in a plmn-IdentityList field of SystemInformationBlockType1. In other words, the plmn-IdentityList field does not need to additionally include a PLMN-Identity/plmn-index value itself. For example, the ASN.1 structure may have a following structure.

- Because the NR frequency band list per PLMN is broadcasted via the system information in the same order as plmn-Identity included in the plmn-IdentityList field of SystemInformationBlockType1, separate plmn identity/plmn index may not be included.
- Some plmn-Identity among plmn-Identity included in SystemInformationBlockType1 may not support the NR frequency band list supporting (NG)EN-DC. Accordingly, the NR frequency band list may be broadcasted from 0. In other words, when 0 is broadcasted for the NR frequency band list, a plmn corresponding to the plmn-Identity may denote that the NR frequency band list supporting (NG)EN-DC is not supported. Obviously, when there is no NR frequency band list supporting (NG)EN-DC in some plmn-Identity, the NR frequency band list may not be broadcasted.
- Some plmn-Identity among plmn-Identity included in SystemInformationBlockType1 may include a plurality of NR frequency band lists supporting (NG)EN-DC. In this case, the NR frequency band lists including NR frequency bands up to a specific constant value (constant To Be Determined (TBD)) may be broadcasted.
- Each NR frequency band supporting (NG)EN-DC may be indicated as FreqBandIndicatorNR, an absolute radio frequency channel number, or a carrier frequency. This may be represented as Table 6 below.

casted or nothing may be broadcasted. This may be represented as Table 7 below.

TABLE 7

| SystemInformationBlockType1 | |
| --- | --- |
| PLMN-IdentityList | PLMN-Identity 1 |
| | PLMN-Identity 2 |
| | PLMN-Identity 3 |
| SystemInformationBlockType x (x is 1, 2, 5, 24, or 27) | |
| NRFreqBandENCD-List | 10, 20, 30 |
| | 100, 200, 300 |
| | 0 |

In the above table, the three NRFreqBandENCD-List values represent FreqBandNR-List per PLMN, and PLMN-Identity 1 corresponds to the first list of NRFreqBandENCD-List values (10, 20, 30), PLMN-Identity 2 corresponds to the second list of NRFreqBandENCD-List values (100, 200, 300), and PLMN-Identity 3 corresponds to the third list of NRFreqBandENCD-List values (0).

In operation 1f-25, the UE 1f-01 may receive the system information including the NR frequency band list supporting (NG)EN-DC per PLMN, as described above. Here, the UE 1f-01 may receive SystemInformationBlockType2. In particular, the SystemInformationBlockType2 may include an indicator (upperLayerIndication) about providing of 5G capability for each PLMN in a same order as PLMN information (PLMN identity/plmn index) included in the SystemInformationBlockType1. An ASN.1 structure is as follows.

TABLE 6

```
-- ASN1START
  x = 1, 2, 5, 24, or 27 (new)
SystemInformationBlockTypex ::= SEQUENCE {
     NRFreqBandENDC-List         SEQUENCE (SIZE (1..maxPLMN-r11)) OF FreqBandNR-List
     ...
}
FreqBandNR-List ::= SEQUENCE {SIZE (0..constantTBD)} OF FreqBandinIndicatorNR
-- ASN1STOP
```

NRFreqBandENDC-List

The NR frequency bands supporting EN-DC per PLMN, listed in the same order as the PLMN(s) listed across the plmn-IdentityList fields in SystemInformationBlockType1.

The broadcasting of the NR frequency band list supporting (NG)EN-DC per PLMN via the system information, according to an embodiment of the disclosure may be in a following form.

- For PLMN-Identity 1, an NR frequency band list supporting (NG)EN-DC may be broadcasted as 10, 20, 30. 10, 20, 30 may denote FreqBandIndicatorNR.
- For PLMN-Identity 2, an NR frequency band list supporting (NG)EN-DC may be broadcasted as 100, 200, 300. 100, 200, 300 may denote FreqBandIndicatorNR.
- For PLMN-Identity 3, there may be no NR frequency band supporting (NG)EN-DC. Here, 0 may be broadcasted or nothing may be broadcasted. This may be represented as Table 7 below.

PLMN-InfoList including at least one PLMN-Info may be broadcasted in SystemInformationBlockType2.

Each PLMN-Info may be mapped in a same order of PLMN Identity/plmn index broadcasted in SystemInformationBlockType1. In other words, first PLMN-Info may be mapped to plmn-Identity of first PLMN-IdentityInfo broadcasted in SystemInformationBlockType1.

Each PLMN-Info may include upperLayerIndication indicator about whether a corresponding PLMN provides 5G capability. When upperLayerIndication is set to TRUE, the cell in the corresponding PLMN may provide 5G capability. Otherwise, the cell in the corresponding PLMN may not provide 5G capability. For reference, upperLayerIndication may be set to TRUE only when the NR frequency band supporting (NG)EN-DC is present.

TABLE 8

```
PLMN-InfoList-r15 ::=      SEQUENCE (SIZE (1..maxPLMN-r11)) OF PLMN-Info-r15
PLMN-Info-r15 ::=     SEQUENCE {
    upperLayerIndication-r15    ENUMERATED {true}    OPTIONAL    -- Need OR
}
-- ASN1STOP
```

In operation 1f-30, the UE 1f-01 may transmit the upperLayerIndication to the upper layer when the upperLayerIndication is set to TRUE for the PLMN selected in operation 1f-20 and at least one NR frequency band is supported in the NR frequency band list supporting (NG)EN-DC for the selected PLMN. The upperLayerIndication may refer to an indicator for indicating the upper layer that the UE 1f-01 has entered or is located in the coverage area providing 5G capability and the at least one NR frequency band is supported in the NR frequency band list supported by the cell for the selected PLMN. Otherwise, the UE 1f-01 may indicate, to the upper layer, absence of the upperLayerIndication. In other words, the UE 1f-01 may indicate, to the upper layer, the absence of the upperLayerIndication when there is no upperLayerIndication for the selected PLMN, FALSE is set, and/or at least one NR frequency band is not supported among the NR frequency band list for the selected PLMN. For reference, when the UE 1f-01 transmits the upperLayerIndication to the upper layer, the UE 1f-01 may display a 5G icon on a display of the UE 1f-01.

In operation 1f-30, the UE 1f-01 may transmit, to the upper layer, the upperLayerIndication including information that the upperLayerIndication for the PLMN registered in operation 1f-20 or a PLMN belonging to an equivalent PLMN list is set to TRUE and that at least one NR frequency band is supported in the NR frequency band list supported by the cell for the corresponding PLMN. Otherwise, the UE 1f-01 may indicate, to the upper layer, absence of the upperLayerIndication.

In operation 1f-30, the UE 1f-01 may transmit the upperLayerIndication to the upper layer when at least one NR frequency band is supported in the NR frequency band list supporting (NG)EN-DC for the selected PLMN, regardless of the upperLayerIndication being set to TRUE. In other words, the upperLayerIndication may denote an indicator for indicating the upper layer that the at least one NR frequency band is supported in the NR frequency band list for (NG)EN-DC supported by the cell for the selected PLMN. Otherwise, the UE 1f-01 may indicate, to the upper layer, absence of the upperLayerIndication. For reference, the upperLayerIndication may be used distinguishably from existing upperLayerIndication by introducing a new indicator different from the existing upperLayerIndication.

Figure 1G:
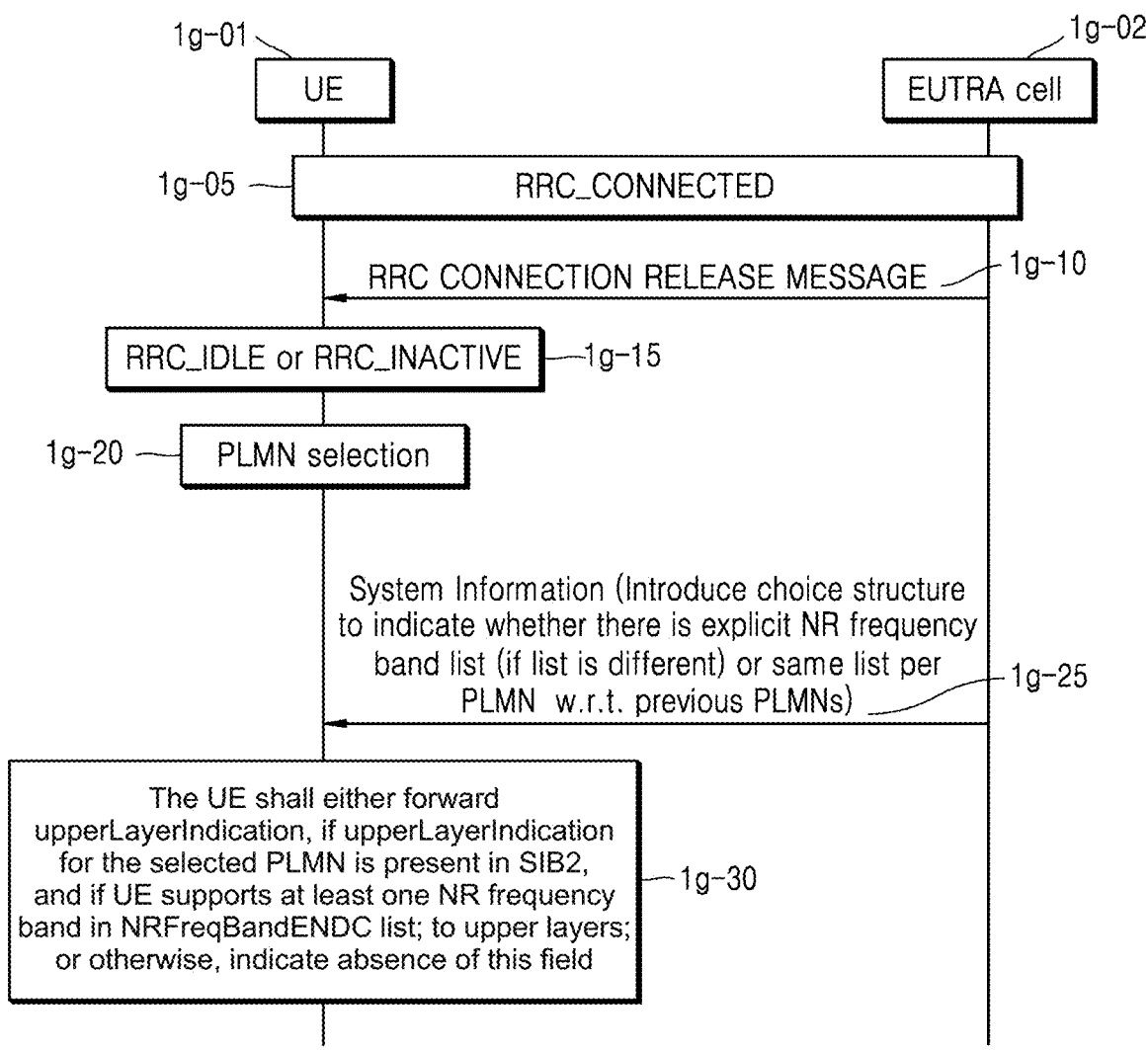
FIG. 1G is a diagram for describing a procedure of determining whether a UE in an RRC idle mode or RRC inactive mode supports a certain frequency band, according to an embodiment of the disclosure.

FIG. 1G is a diagram for describing a procedure of determining whether a UE 1g-01 supports a certain frequency band, according to an embodiment of the disclosure. Hereinafter, for convenience of description, an example in which the UE 1g-01 that was operating in an LTE system is located in a coverage area of an NR system is described, but the LTE system and the NR system are only examples, and an embodiment of the disclosure may be applied to another next-generation communication system. In detail, FIG. 1G is a diagram for describing a procedure of determining that the UE 1g-01 in an RRC idle mode (RRC_IDLE) or RRC inactive mode (RRC_INACTIVE) is located in a certain coverage area and determining whether a serving cell supports an NR frequency band supporting (NG)EN-DC.

An LTE base station according to an embodiment of the disclosure may signal whether 5G capability is supported, as system information. For example, an LTE base station may signal, to the UE 1g-01, an NR frequency band list supporting (NG)EN-DC for per PLMN, as the system information. Because an NR frequency band list may be the same per PLMN according to an embodiment of the disclosure, when an NR frequency band list is included for a previous PLMN, a previous PLMN index or previous plmn-Identity may be included for a PLMN supporting the same NR frequency band list. Accordingly, signaling overhead may be reduced because redundant NR frequency band list is not included in system information with respect to at least one PLMN. As described in the above embodiment of the disclosure, the UE 1g-01 may determine whether the UE 1g-01 has entered or is located in a coverage area supporting 5G capability, based on an indicator included in the system information. Also, the UE 1g-01 may display a 5G icon by transmitting an indicator indicating the 5G capability to an upper layer, based on whether at least one NR frequency band in the NR frequency band list supporting (NG)EN-DC included in the system information is supported.

Referring to FIG. 1G, the UE 1g-01 may establish an RRC connection with a EUTRA cell 1g-02 and thus be in an RRC connected mode (RRC_CONNECTED), in operation 1g-05.

In operation 1g-10, when there is no data transmission/reception due to a certain reason or for a certain period of time, the EUTRA cell 1g-02 may transmit an RRC connection release message (RRCConnectionRelease) to the UE 1g-01. In operation 1g-10, the RRC connection release message may include RRC inactive configuration information (rrc_InactiveConfig).

In operation 1g-15, when the RRC connection release message includes the RRC inactive configuration information, the UE 1g-01 may transition to the RRC inactive mode. When the RRC connection release message does not include the RRC inactive configuration information, the UE 1g-01 may transition to the RRC idle mode. In other words, the UE 1g-01 that received the RRC connection release message may transition to the RRC inactive mode or RRC idle mode depending on whether the RRC inactive configuration information is included.

In operation 1g-20, the UE 1g-01 in the RRC idle mode or RRC inactive mode may select a PLMN. The UE 1g-01 may select the PLMN via a series of following processes.

The UE 1g-01 may scan all RF channels with respect to E-UTRA bands depending on capability of the UE 1g-01.

For each carrier, the UE 1g-01 may find a cell having strongest signal strength and receive system information from the cell.

When at least one PLMN identifier is receivable from the cell having the strongest signal strength, the UE 1g-01 may report an upper layer (for example, NAS) that the at least one PLMN identifier is a high quality PLMN. Here, when a measured RSRP value is equal to or greater than −110 dBm, the UE 1g-01 may report the upper layer about the high quality PLMN, and when not, the UE 1g-01 may report the upper layer together with the RSRP value.

When the UE 1g-01 supports E-UTRA connected to a 5GC with respect to a found PLMN, the UE 1g-01 may also report a CN type to the upper layer.

In operation 1g-25, the UE 1g-01 in the RRC idle mode or RRC inactive mode may perform a cell selection process. The cell selection process may denote a process for the UE 1g-01 to camp on a suitable cell associated to the PLMN selected in operation 1g-20. The suitable cell may denote a cell satisfying following conditions.

When the cell is a part of either the selected PLMN, a registered PLMN, or a PLMN of an equivalent PLMN list When the cell is not barred according to information provided from the upper layer When the cell is a part of at least one TA that is not a part of a list of "forbidden tracking areas for roaming", which belongs to the PLMN described above (The cell is part of at least one TA that is not part of the list of "forbidden tracking areas for roaming), which belongs to a PLMN that fulfills the first bullet above)

In operation 1g-25, the UE 1g-01 in the RRC idle mode or RRC inactive mode may receive the system information to perform the cell selection process. In operation 1g-25, when the UE 1g-01 received SystemInformationBlockType1, a PLMN identity or plmn index corresponding to the PLMN selected in operation 1g-20 may be included in cellAccessRelatedInfoList. In this case, plmn-IdentityList, trackingAreaCode, and cellIdentity for a cell as received in the corresponding cellAccessRelatedInfoList containing the selected PLMN may be used. In particular, the plmn-IdentityList may include at least one PLMN-IdentityInfo, and the plmn-IdentityList including at least one PLMN-IdentityInfo for each core type (for example, an evolved packet core (EPC) and/or 5GC) supported by an LTE cell may be configured. For example, PLMN-IdentityInfo of the LTE cell connected to the EPC may be configured of plmn-IdentityList up to maxPLMN-r11. For example, max-PLMN-r11 may have a value of 6. Alternatively, PLMN-IdentityInfo of an LTE cell connected to EPC by defining a new constant value may be configured of plmn-IdentityList up to maxPLMN-r16. Similarly, PLMN-IdentityInfo of the LTE cell connected to the 5GC may be configured of plmn-IdentityList up to maxPLMN-r11. For example, max-PLMN-r11 may have a value of 6. Alternatively, PLMN-IdentityInfo of the LTE cell connected to the 5GC based on a newly defined constant value may be configured of plmn-IdentityList up to maxPLMN-r16. One LTE cell may be connected only to the EPC, only to the 5GC, or both to the EPC and the 5GC. plmn-IdentityList may have an ASN.1 structure below.

At least one PLMN-IdentityInfo may be configured for the LTE cell connected to the EPC, and each PLMN-IdentityInfo may be configured of a plmn-Identity value and cellReservedForOperatorUse. This may be represented as Table 9 below.

TABLE 9

| | |
|---|---|
| PLMN-IdentityList ::= | SEQUENCE (SIZE (1..maxPLMN-r11)) OF PLMN-IdentityInfo |

TABLE 9-continued

| | |
|---|---|
| PLMN-IdentityInfo ::= | SEQUENCE { |
| plmn-Identity | PLMN-Identity, |
| cellReservedForOperatorUse | ENUMERATED {reserved, notReserved} |
| } | |

At least one PLMN-IdentityInfo may be configured for the LTE cell connected to the 5GC, and each PLMN-IdentityInfo may include a plmn index when a same Plmn-Identity as the LTE cell connected to the EPC is used. For example, when the plmn index is '1', the plmn index may denote PLMN-Identity included in first PLMN-IdentityInfo of the LTE cell connected to the EPC. Also, when the plmn index is '2', the plmn index may denote PLMN-Identity included in second PLMN-IdentityInfo of the LTE cell connected to the EPC. In other words, PLMN-IdentityInfo does not include the same PLMN-Identity value, but includes plmn index, and thus signaling overhead may be reduced. When PLMN-Identity different from the LTE cell connected to the EPC is to be broadcasted to each PLMN-IdentityInfo, the PLMN-Identity value itself may be included. In other words, the LTE cell may determine whether to broadcast the PLMN-Identity or plmn index via a CHOICE structure, and signal a result of the determination to the UE 1g-01. Also, PLMN-IdentityInfo may include cellReservedForOperatorUse for each PLMN. This may be represented as Table 10 below.

TABLE 10

| | |
|---|---|
| PLMN-IdentityInfo-r15 ::= | SEQUENCE { |
| plmn-Identity-5GC-r15 | CHOICE{ |
| plmn-Identity-r15 | PLMN-Identity, |
| plmn-Index-r15 | INTEGER (1..maxPLMN-r11) |
| }, | |
| cellReservedForOperatorUse-r15 | ENUMERATED {reserved, notReserved}, |
| cellReservedForOperatorUse-CRS-r15 | ENUMERATED {reserved, notReserved} |
| } | |

In operation 1g-25, the EUTRA cell 1g-02 may broadcast the NR frequency band list supporting (NG)EN-DC per PLMN, as the system information. For example, the NR frequency band list supporting (NG)EN-DC per PLMN may be broadcasted from SystemInformationBlockType1, SystemInformationBlockType2, SystemInformationBlockType5, SystemInformationBlockType24, or new SystemInformationBlockType (for example, SystemInformationBlockType27). According to an embodiment of the disclosure, when a specific PLMN includes an NR frequency band list such that the system information does not include a redundant NR frequency band list for at least one PLMN, another PLMN supporting the same NR frequency band list may indicate that the same NR frequency band list is supported by using a specific PLMN identity or a PLMN index indicating the specific PLMN identity. In this case, signaling overhead may be reduced because the redundant frequency band list is not included in the system information per PLMN.

The NR frequency band list per PLMN may be broadcasted in a same order as PLMN-Identity/plmn index included in a plmn-IdentityList field of SystemInformationBlockType1.

Some plmn-Identity among plmn-Identity of SystemInformationBlockType1 may not support the NR frequency band list supporting (NG)EN-DC. Accordingly, the NR frequency band list may be broadcasted from 0. In other words, when 0 is broadcasted for the NR frequency band list, a plmn corresponding to the plmn-Identity may denote that the NR frequency band list supporting (NG)EN-DC is not supported. Obviously, when there is no NR frequency band list supporting (NG)EN-DC in some plmn-Identity, the NR frequency band list may not be broadcasted.

Some plmn-Identity among plmn-Identity included in SystemInformationBlockType1 may include one or a plurality of NR frequency band lists supporting (NG) EN-DC. In this case, the NR frequency band lists including NR frequency bands up to a maximum specific constant value (constant TBD) may be broadcasted.

When the NR frequency band list supporting (NG)EN-DC is included in a previous PLMN and the same NR frequency band list for (NG)EN-DC is supported in a current PLMN, SystemInformationBlockTypex may not include the NR frequency band list but may include a previous PLMN index or PLMN identity. In other words, the NR frequency band list may be indicated via a choice structure.

Each NR frequency band may be indicated by FreqBandIndicatorNR, an absolute radio frequency channel number, or a carrier frequency.

For example, the broadcasting of the NR frequency band list supporting (NG)EN-DC per PLMN via the system information, according to an embodiment of the disclosure may be in a form of Table 11 below.

TABLE 11

| SystemInformationBlockType1 | |
| --- | --- |
| PLMN-IdentityList | PLMN-Identity 1 |
| | PLMN-Identity 2 |
| | PLMN-Identity 3 |

TABLE 11-continued

| SystemInformationBlockType x (x is 1, 2, 5, 24, or 27) | | |
| --- | --- | --- |
| NRFreqBandENCD-List | FreqBandNR-List | 10, 20, 30 |
| | PLMN-IdentityIndex (PLMN-Identity) | 1 (PLMN-Identity 1) |
| | FreqBandNR-List | 0 |

In the above table, PLMN-Identity 1 corresponds to the first list of NRFreqBandENCD-List values (10, 20, 30), PLMN-Identity 2 corresponds to the second list of NRFreqBandENCD-List values (1, or PLMN-Identity 1), and PLMN-Identity 3 corresponds to the third list of NRFreqBandENCD-List values (0).

For PLMN-Identity 1, an NR frequency band list supporting (NG)EN-DC may be broadcasted as 10, 20, 30. 10, 20, 30 may denote FreqBandIndicatorNR.

For PLMN-Identity 2, because the NR frequency band list supporting (NG)EN-DC is the same as the NR frequency band list supported by PLMN-Identity 1, PLMN-Identity 2 may not include the NR frequency band list, but may include PLMN-Identity 1 or plmn index '1' indicating PLMN-Identity.—Accordingly, PLMN-Identity 2 may indicate that the NR frequency band list supporting (NG)EN-DC is 10, 20, 30.

For PLMN-Identity 3, there may be no NR frequency band supporting (NG)EN-DC. Here, 0 may be broadcasted or nothing may be broadcasted.

In operation 1g-25, the UE 1g-01 may receive the system information including the NR frequency band list supporting (NG)EN-DC per PLMN, as described above. Here, the UE 1g-01 may receive SystemInformationBlockType2. In particular, the SystemInformationBlockType2 may include an indicator (upperLayerIndication) about providing of 5G capability for each PLMN in a same order as PLMN information (PLMN identity/plmn index) included in the SystemInformationBlockType1. An ASN.1 structure is as follows.

PLMN-InfoList including at least one PLMN-Info may be broadcasted in SystemInformationBlockType2.

Each PLMN-Info may be mapped in a same order of PLMN Identity broadcasted in SystemInformationBlockType1. In other words, first PLMN-Info may be mapped to plmn-Identity of first PLMN-IdentityInfo broadcasted in SystemInformationBlockType1.

Each PLMN-Info may include upperLayerIndication indicator about whether a corresponding PLMN provides 5G capability. When upperLayerIndication is set to TRUE, the corresponding PLMN may provide 5G capability. Otherwise, the corresponding PLMN may not provide 5G capability. For reference, upperLayerIndication may be set to TRUE only when the NR frequency band supporting (NG)EN-DC is present. This may be represented as Table 12 below.

TABLE 12

| PLMN-InfoList-r15 ::= | SEQUENCE (SIZE (1..maxPLMN-r11)) OF PLMN-Info-r15 | | |
| --- | --- | --- | --- |
| PLMN-Info-r15 ::= | SEQUENCE { | | |
| upperLayerIndication-r15 | ENUMERATED {true} | OPTIONAL | -- Need OR |
| } | | | |
| -- ASN1STOP | | | |

In operation 1g-30, the UE 1g-01 may transmit the upperLayerIndication to the upper layer when the upperLayerIndication is set to TRUE for the PLMN selected in operation 1g-20 and at least one NR frequency band is supported in the NR frequency band list supporting (NG) EN-DC for the selected PLMN. In other words, the upperLayerIndication may refer to an indicator for indicating the upper layer that the UE 1g-01 has entered or is located in the coverage area providing 5G capability and the at least one NR frequency band is supported in the NR frequency band list for (NG)EN-DC supported by the cell for the selected PLMN. Otherwise, the UE 1g-01 may indicate, to the upper layer, absence of the upperLayerIndication. In other words, the UE 1g-01 may indicate, to the upper layer, the absence of the upperLayerIndication when there is no upperLayerIndication for the selected PLMN, FALSE is set, and/or at least one NR frequency band is not supported among the NR frequency band list for (NG)EN-DC for the selected PLMN. For reference, when the UE 1g-01 transmits the upperLayerIndication to the upper layer, the UE 1g-01 may display a 5G icon on a display of the UE 1g-01.

In operation 1g-30, the UE 1g-01 may transmit, to the upper layer, the upperLayerIndication including information that the upperLayerIndication for the PLMN registered in operation 1g-20 or a PLMN belonging to an equivalent PLMN list is set to TRUE and that at least one NR frequency band is supported in the NR frequency band list for (NG) EN-DC with respect to the corresponding PLMN. Otherwise, the UE 1g-01 may indicate, to the upper layer, absence of the upperLayerIndication.

In operation 1g-30, the UE 1g-01 may transmit the upperLayerIndication to the upper layer when at least one NR frequency band is supported in the NR frequency band list supporting (NG)EN-DC for the selected PLMN, regardless of the upperLayerIndication being set to TRUE. In other words, the upperLayerIndication may denote an indicator for indicating the upper layer that the at least one NR frequency band is supported in the NR frequency band list for (NG)EN-DC supported by the cell for the selected PLMN. Otherwise, the UE 1g-01 may indicate, to the upper layer, absence of the upperLayerIndication. For reference, the upperLayerIndication may be used distinguishably from existing upperLayerIndication by introducing a new indicator different from the existing upperLayerIndication.

Figure 1H:
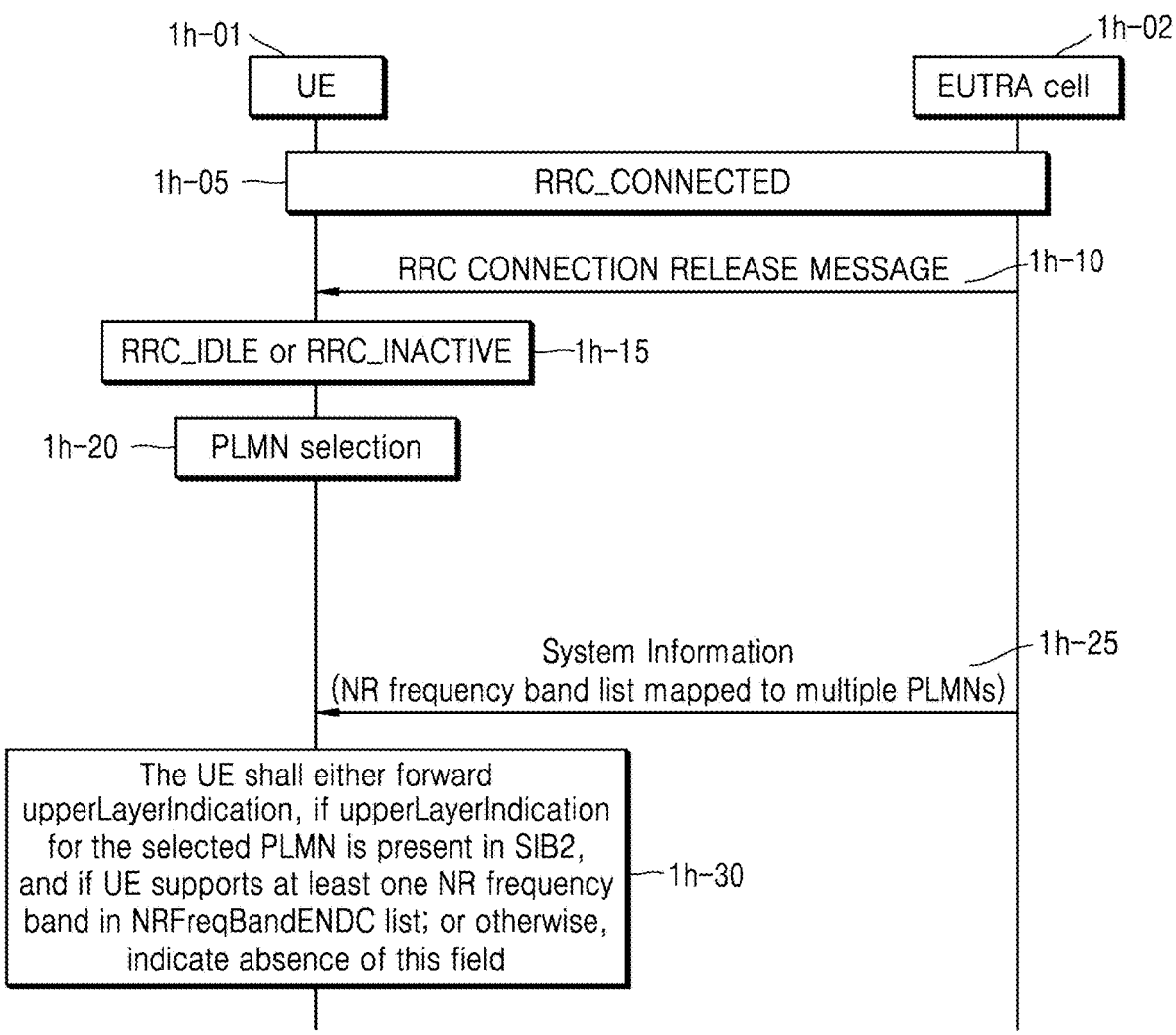
FIG. 1H is a diagram for describing a procedure of determining whether a UE in an RRC idle mode or RRC inactive mode supports a certain frequency band, according to an embodiment of the disclosure.

FIG. 1H is a diagram for describing a procedure of determining whether a UE 1h-01 supports a certain NR frequency band, according to an embodiment of the disclosure. Hereinafter, for convenience of description, an example in which the UE 1h-01 that was operating in an LTE system is located in a coverage area of an NR system is described, but the LTE system and the NR system are only examples, and an embodiment of the disclosure may be applied to another next-generation communication system. In detail, FIG. 1H is a diagram for describing a procedure of determining that the UE 1h-01 in an RRC idle mode (RRC_IDLE) or RRC inactive mode (RRC_INACTIVE) is located in a coverage area providing 5G capability and determining whether a serving cell supports an NR frequency band supporting (NG)EN-DC.

An LTE base station according to an embodiment of the disclosure may signal whether 5G capability is supported, as system information. For example, the LTE base station may signal, to the UE 1h-01, a NR frequency band list supporting (NG)EN-DC for each PLMN list, as the system information. According to an embodiment of the disclosure, the NR frequency band list may be the same per PLMN, and thus one NR frequency band list may be broadcasted for a plurality of PLMNs, via the system information. Signaling overhead may be reduced because redundant NR frequency band list is not included in the system information with respect to at least one PLMN. As described in the above embodiment of the disclosure, the UE 1h-01 may determine whether the UE 1h-01 has entered or is located in a coverage area supporting 5G capability, based on an indicator included in the system information. Also, the UE 1h-01 may display a 5G icon by transmitting an indicator indicating the 5G capability to an upper layer, based on whether at least one NR frequency band in the NR frequency band list supporting (NG)EN-DC included in the system information is supported.

Referring to FIG. 1H, the UE 1h-01 may establish an RRC connection with a EUTRA cell 1h-02 and thus be in an RRC connected mode (RRC_CONNECTED), in operation 1h-05.

In operation 1h-10, when there is no data transmission/reception due to a certain reason or for a certain period of time, the EUTRA cell 1h-02 may transmit an RRC connection release message (RRCConnectionRelease) to the UE 1h-01. In operation 1h-10, the RRC connection release message may include RRC inactive configuration information (rrc_InactiveConfig).

In operation 1h-15, when the RRC connection release message includes the RRC inactive configuration information, the UE 1h-01 may transition to the RRC inactive mode. When the RRC connection release message does not include the RRC inactive configuration information, the UE 1h-01 may transition to the RRC idle mode. In other words, the UE 1h-01 that received the RRC connection release message may transition to the RRC inactive mode or RRC idle mode depending on whether the RRC inactive configuration information is included.

In operation 1h-20, the UE 1h-01 in the RRC idle mode or RRC inactive mode may select a PLMN. The UE 1h-01 may select the PLMN via a series of following processes.

The UE 1h-01 may scan all RF channels with respect to E-UTRA bands depending on capability of the UE 1h-01.

For each carrier, the UE 1h-01 may find a cell having strongest signal strength and receive system information from the cell.

When at least one PLMN identifier is receivable from the cell having the strongest signal strength, the UE 1h-01 may report an upper layer (for example, NAS) that the at least one PLMN identifier is a high quality PLMN. Here, when a measured RSRP value is equal to or greater than −110 dBm, the UE 1h-01 may report the upper layer about the high quality PLMN, and when not, the UE 1h-01 may report the upper layer together with the RSRP value.

When the UE 1h-01 supports E-UTRA connected to a 5GC with respect to a found PLMN, the UE 1h-01 may also report a CN type to the upper layer.

In operation 1h-25, the UE 1h-01 in the RRC idle mode or RRC inactive mode may perform a cell selection process. The cell selection process may denote a process for the UE 1h-01 to camp on a suitable cell associated to the PLMN selected in operation 1h-20. The suitable cell may denote a cell satisfying following conditions.

When the cell is a part of either the selected PLMN, a registered PLMN, or a PLMN of an equivalent PLMN list When the cell is not barred according to information provided from the upper layer When the cell is a part of at least one TA that is not a part of a list of "forbidden tracking areas for roaming", which belongs to the PLMN described above (The cell is part of at least one TA that is not part of the list of "forbidden tracking areas for roaming), which belongs to a PLMN that fulfils the first bullet above)

In operation 1h-25, the UE 1h-01 in the RRC idle mode or RRC inactive mode may receive the system information to perform the cell selection process. In operation 1h-25, when the UE 1h-01 received SystemInformationBlockType1, a PLMN identity/plmn index corresponding to the PLMN selected in operation 1h-20 may be included in cellAccessRelatedInfoList. In this case, plmn-IdentityList, trackingAreaCode, and cellIdentity for a cell as received in the corresponding cellAccessRelatedInfoList containing the selected PLMN may be used. In particular, the plmn-IdentityList may include at least one PLMN-IdentityInfo, and the plmn-IdentityList including at least one PLMN-IdentityInfo for each core type (for example, an evolved packet core (EPC) and/or 5GC) supported by an LTE cell may be configured. For example, PLMN-IdentityInfo of the LTE cell connected to the EPC may be configured of plmn-IdentityList up to maxPLMN-r11. For example, maxPLMN-r11 may have a value of 6. Alternatively, PLMN-IdentityInfo of an LTE cell connected to EPC by defining a new constant value may be configured of plmn-IdentityList up to maxPLMN-r16. Similarly, PLMN-IdentityInfo of the LTE cell connected to the 5GC may be configured of plmn-IdentityList up to maxPLMN-r11. For example, maxPLMN-r11 may have a value of 6. Alternatively, PLMN-IdentityInfo of the LTE cell connected to the 5GC based on a newly defined constant value may be configured of plmn-IdentityList up to maxPLMN-r16. One LTE cell may be connected only to the EPC, only to the 5GC, or both to the EPC and the 5GC. The plmn-IdentityList may have an ASN.1 structure below.

At least one PLMN-IdentityInfo may be configured for the LTE cell connected to the EPC, and each PLMN-IdentityInfo may be configured of a plmn-Identity value and cellReservedForOperatorUse. This may be represented as Table 13 below.

TABLE 13

| | |
|---|---|
| PLMN-IdentityList ::= | SEQUENCE (SIZE (1..maxPLMN-r11)) OF PLMN-IdentityInfo |
| PLMN-IdentityInfo ::= | SEQUENCE { |
| plmn-Identity | PLMN-Identity, |
| cellReservedForOperatorUse | ENUMERATED {reserved, notReserved} |
| } | |

At least one PLMN-IdentityInfo may be configured for the LTE cell connected to the 5GC, and each PLMN-IdentityInfo may include a plmn index when a same Plmn-Identity as the LTE cell connected to the EPC is used. For example, when the plmn index is '1', the plmn index may denote PLMN-Identity included in first PLMN-IdentityInfo of the LTE cell connected to the EPC. Also, when the plmn index is '2', the plmn index may denote PLMN-Identity included in second PLMN-IdentityInfo of the LTE cell connected to the EPC. In other words, PLMN-IdentityInfo does not include the same PLMN-Identity value, but includes plmn index, and thus signaling overhead may be reduced. When PLMN-Identity different from the LTE cell connected to the EPC is to be broadcasted to each PLMN-IdentityInfo, the PLMN-Identity value itself may be included. In other words, the LTE cell may determine whether to broadcast the PLMN-Identity or plmn index via a CHOICE structure, and signal a result of the determination to the UE 1h-01. Also, PLMN-IdentityInfo may include cellReservedForOperatorUse for each PLMN.

In operation 1h-25, the EUTRA cell 1h-02 may broadcast the NR frequency band list supporting (NG)EN-DC per PLMN list, as the system information. For example, the NR frequency band list supporting (NG)EN-DC per PLMN list may be broadcasted from SystemInformationBlockType1, SystemInformationBlockType2, SystemInformationBlockType5, SystemInformationBlockType24, or new SystemInformationBlockType (for example, SystemInformationBlockType27). In an embodiment of the disclosure, in order for the system information not to include the redundant NR frequency band list for at least one PLMN, plmn-IdentityList or plmn-IdentityIndex List may be included for at least one PLMN supporting the same NR frequency band list, and the NR frequency band list mapped thereto may be broadcasted via the system information. In this case, signaling overhead may be reduced because the redundant frequency band list is not included in the system information per PLMN. For example, the ASN.1 structure may have a following structure.

When the NR frequency band lists supporting (NG)EN-DC are the same for the at least one PLMN, the NR frequency band list for same PLMN-IdentityIndexList or PLMN-IdentityList may be broadcasted.

Some plmn-Identity among plmn-Identity included in SystemInformationBlockType1 may not support the NR frequency band list supporting (NG)EN-DC. Accordingly, the NR frequency band list may be configured from 0. In other words, when 0 is broadcasted for the NR frequency band list, a plmn corresponding to the plmn-Identity may denote that the NR frequency band list supporting (NG)EN-DC is not supported. Obviously, when a specific PLMN identity does not include the NR frequency band list, a corresponding PLMN may indicate that the NR frequency band list supporting (NG)EN-DC is not supported.

At least one NR frequency band supporting (NG)EN-DC may be present in PLMN-IdentityIndexList or PLMN-IdentityList. In this case, the NR frequency band lists including NR frequency bands up to a maximum specific constant value (constant TBD) may be broadcasted.

Each NR frequency band may be indicated by FreqBandIndicatorNR, an absolute radio frequency channel number, or a carrier frequency.

For example, the broadcasting of the NR frequency band list supporting (NG)EN-DC per PLMN list via the system information, according to an embodiment of the disclosure may be in a form of Table 14 below.

TABLE 14

| SystemInformationBlockType1 | |
|---|---|
| PLMN-IdentityList | PLMN-Identity 1<br>PLMN-Identity 2<br>PLMN-Identity 3<br>PLMN-Identity 4 |
| SystemInformationBlockType x (x is 1, 2, 5, 24, or 27) | |
| NRFreqBandENCD-List | 1, 2, 4 (PLMN-IdentityIndexList) or PLMN-Identity 1/2/4 (PLMN-IdentityIndexList)<br>3 (PLMN-IdentityIndexList) or PLMN-Identity 3 (PLMN-IdentityIndexList) | 100, 200, 300 (NRFreqENDC-List)<br><br>0 (NRFreqENDC-List) |

In the above table, PLMN-Identity 1, PLMN-Identity 2 and PLMN-Identity 4 each correspond to the first list of NRFreqBandENCD-List values (100, 200, 300), and PLMN-Identity 3 corresponds to the second list of NRFreqBandENCD-List values (0).

Because the NR frequency band lists supporting (NG) EN-DC are the same as 100, 200, 300 for PLMN-Identity 1, PLMN-Identity 2, PLMN-Identity 4, SysteminformationBlockTypex may include PLMN- IdentityList including values of PLMN-Identity 1, PLMN-Identity 2, and PLMN-Identity 4 or PLMN-IdentityIndexList configured of '1', 2', and '4'. Also, the NR frequency band list (100, 200, 300) mapped thereto may be broadcasted by being included in SysteminformationBlockTypex.

For PLMN-Identity 3, there may be no NR frequency band supporting (NG)EN-DC. Here, 0 may be broadcasted or nothing may be broadcasted. Obviously, SysteminformationBlockTypex may include PLMN-Identity 3 or may include PLMN index '3' indicating PLMN-Identity 3.

When the NR frequency band list supporting (NG)EN-DC is the same for all PLMNs, a 1-bit indicator may be introduced. In other words, when the 1-bit indicator is set (for example, TRUE), the 1-bit indicator may indicate that all PLMNs support the same NR frequency band list for (NG)EN-DC when the NR frequency band list supporting (NG)EN-DC is included.

In operation 1h-25, the UE 1h-01 may receive the system information including the NR frequency band list supporting (NG)EN-DC per PLMN list, as described above. Here, the UE 1h-01 may receive SystemInformationBlockType2. In detail, SystemInformationBlockType2 may include an indicator (upperLayerIndication) indicating whether 5G capability is provided per PLMN in a same order as SystemInformationBlockType1. An ASN.1 structure is as follows.

- PLMN-InfoList including at least one PLMN-Info may be broadcasted in SystemInformationBlockType2.
- Each PLMN-Info may be mapped in a same order of PLMN Identity/plmn index broadcasted in SystemInformationBlockType1. In other words, first PLMN-Info may be mapped to plmn index or plmn-Identity of first PLMN-IdentityInfo broadcasted in SystemInformationBlockType1.
- Each PLMN-Info may include upperLayerIndication indicator about whether a corresponding PLMN provides 5G capability. When upperLayerIndication is set to TRUE, the corresponding PLMN may provide 5G capability. Otherwise, the corresponding PLMN may not provide 5G capability. For reference, upperLayerIndication may be set to TRUE only when the NR frequency band supporting (NG)EN-DC is present. This may be represented as Table 15 below.

TABLE 15

```
PLMN-InfoList-r15 ::=        SEQUENCE (SIZE (1..maxPLMN-r11)) OF PLMN-Info-r15
PLMN-Info-r15 ::=    SEQUENCE {
    upperLayerIndication-r15     ENUMERATED {true}     OPTIONAL     -- Need OR
}
-- ASN1STOP
```

In operation 1h-30, the UE 1h-01 may transmit the upperLayerIndication to the upper layer when the upperLayerIndication is set to TRUE for the PLMN selected in operation 1h-20 and at least one NR frequency band is supported in the NR frequency band list for the selected PLMN. In other words, the upperLayerIndication may refer to an indicator for indicating the upper layer that the UE 1h-01 has entered or is located in the coverage area providing 5G capability and the at least one NR frequency band is supported in the NR frequency band list supported by the cell for the selected PLMN. Otherwise, the UE 1h-01 may indicate, to the upper layer, absence of the upperLayerIndication. In other words, the UE 1h-01 may indicate, to the upper layer, the absence of the upperLayerIndication when there is no upperLayerIndication for the selected PLMN, FALSE is set, and/or at least one NR frequency band is not supported among the NR frequency band list for the selected PLMN. For reference, when the UE 1h-01 transmits the upperLayerIndication to the upper layer, the UE 1h-01 may display a 5G icon on a display of the UE 1h-01.

In operation 1h-30, the UE 1h-01 may transmit, to the upper layer, the upperLayerIndication when information that the upperLayerIndication for the PLMN registered in operation 1h-20 or a PLMN belonging to an equivalent PLMN list is set to TRUE and that at least one NR frequency band is supported in the NR frequency band list for the corresponding PLMN is included. Otherwise, the UE 1h-01 may indicate, to the upper layer, absence of the upperLayerIndication.

In operation 1h-30, the UE 1h-01 may transmit the upperLayerIndication to the upper layer when at least one NR frequency band is supported in the NR frequency band list supporting (NG)EN-DC for the selected PLMN, regardless of the upperLayerIndication being set to TRUE. In other words, the upperLayerIndication may denote an indicator for indicating the upper layer that the at least one NR frequency band is supported in the NR frequency band list for (NG)EN-DC supported by the cell for the selected PLMN. Otherwise, the UE 1h-01 may indicate, to the upper layer, absence of the upperLayerIndication. For reference, the upperLayerIndication may be used distinguishably from existing upperLayerIndication by introducing a new indicator different from the existing upperLayerIndication.

FIG. 1I is a diagram for describing a procedure of determining whether a UE 1i-01 supports a certain NR frequency band, according to an embodiment of the disclosure. Hereinafter, for convenience of description, an example in which the UE 1i-01 that was operating in an LTE system is located in a coverage area of an NR system is described, but the LTE system and the NR system are only examples, and an embodiment of the disclosure may be applied to another next-generation communication system. In detail, FIG. 1I is a diagram for describing a procedure in which the LTE system determines that the UE 1i-01 in an RRC idle mode (RRC_IDLE) or RRC inactive mode (RRC_INACTIVE) is located in a coverage area providing 5G capability and determines whether a serving cell supports an NR frequency band supporting (NG)EN-DC.

An LTE base station according to an embodiment of the disclosure may signal whether 5G capability is supported, as system information. For example, the LTE base station may signal, to the UE 1i-01, an NR frequency band list only for a PLMN supporting (NG)EN-DC, as the system information. Because a specific PLMN may not support (NG)EN-DC, in an embodiment of the disclosure, the NR frequency band list is signaled as the system information only for the PLMN supporting (NG)EN-DC, and thus signaling overhead may be reduced. As described in the above embodiment of the disclosure, the UE 1i-01 may determine whether the UE 1i-01 has entered or is located in a coverage area supporting 5G capability, based on an indicator included in the system information. Also, the UE 1i-01 may display a 5G icon by transmitting an indicator indicating the 5G capability to an upper layer, based on whether at least one NR frequency band in the NR frequency band list supporting (NG)EN-DC included in the system information is supported.

Referring to FIG. 1I, the UE 1i-01 may establish an RRC connection with a EUTRA cell 1i-02 and thus be in an RRC connected mode (RRC_CONNECTED), in operation 1i-05.

In operation 1i-10, when there is no data transmission/reception due to a certain reason or for a certain period of time, the EUTRA cell 1i-02 may transmit an RRC connection release message (RRCConnectionRelease) to the UE 1i-01. In operation 1i-10, the RRC connection release message may include RRC inactive configuration information (rrc_InactiveConfig). In operation 1i-15, when the RRC connection release message includes the RRC inactive configuration information, the UE 1i-01 may transition to the RRC inactive mode. When the RRC connection release message does not include the RRC inactive configuration information, the UE 1i-01 may transition to the RRC idle mode. In other words, the UE 1i-01 that received the RRC connection release message may transition to the RRC inactive mode or RRC idle mode depending on whether the RRC inactive configuration information is included in the RRC connection release message.

In operation 1i-20, the UE 1i-01 in the RRC idle mode or RRC inactive mode may select a PLMN. The UE 1i-01 may select the PLMN via a series of following processes.

The UE 1i-01 may scan all RF channels with respect to E-UTRA bands depending on capability of the UE 1i-01.

For each carrier, the UE 1i-01 may find a cell having strongest signal strength and receive system information from the cell.

When at least one PLMN identifier is receivable from the cell having the strongest signal strength, the UE 1i-01 may report an upper layer (for example, NAS) that the at least one PLMN identifier is a high quality PLMN. Here, when a measured RSRP value is equal to or greater than −110 dBm, the UE 1i-01 may report the upper layer about the high quality PLMN, and when not, the UE 1i-01 may report the upper layer together with the RSRP value.

When the UE 1i-01 supports E-UTRA connected to a 5GC with respect to a found PLMN, the UE 1i-01 may also report a CN type to the upper layer.

In operation 1i-25, the UE 1i-01 in the RRC idle mode or RRC inactive mode may perform a cell selection process. The cell selection process may denote a process for the UE 1i-01 to camp on a suitable cell associated to the PLMN selected in operation 1i-20. The suitable cell may denote a cell satisfying following conditions.

When the cell is a part of either the selected PLMN, a registered PLMN, or a PLMN of an equivalent PLMN list When the cell is not barred according to information provided from the upper layer When the cell is a part of at least one TA that is not a part of a list of "forbidden tracking areas for roaming", which belongs to the PLMN described above (The cell is part of at least one TA that is not part of the list of "forbidden tracking areas for roaming), which belongs to a PLMN that fulfills the first bullet above)

In operation 1i-25, the UE 1i-01 in the RRC idle mode or RRC inactive mode may receive the system information to perform the cell selection process. In operation 1i-25, when the UE 1i-01 received SystemInformationBlockType1, a PLMN identity or plmn index corresponding to the PLMN selected in operation 1i-20 may be included in cellAccessRelatedInfoList. In this case, plmn-IdentityList, trackingAreaCode, and cellIdentity for a cell as received in the corresponding cellAccessRelatedInfoList containing the selected PLMN may be used. In particular, the plmn-IdentityList may include at least one PLMN-IdentityInfo, and the plmn-IdentityList including at least one PLMN-IdentityInfo for each core type (for example, an evolved packet core (EPC) and/or 5GC) supported by an LTE cell may be configured. For example, PLMN-IdentityInfo of the LTE cell connected to the EPC may be configured of plmn-IdentityList up to maxPLMN-r11. For example, maxPLMN-r11 may have a value of 6. Alternatively, PLMN-IdentityInfo of an LTE cell connected to EPC by defining a new constant value may be configured of plmn-IdentityList up to maxPLMN-r16. Similarly, PLMN-IdentityInfo of the LTE cell connected to the 5GC may be configured of plmn-IdentityList up to maxPLMN-r11. For example, maxPLMN-r11 may have a value of 6. Alternatively, PLMN-IdentityInfo of the LTE cell connected to the 5GC based on a newly defined constant value may be configured of plmn-IdentityList up to maxPLMN-r16. One LTE cell may be connected only to the EPC, only to the 5GC, or both to the EPC and the 5GC.

The plmn-IdentityList may have an ASN.1 structure below.

At least one PLMN-IdentityInfo may be configured for the LTE cell connected to the EPC, and each PLMN-IdentityInfo may be configured of a plmn-Identity value and cellReservedForOperatorUse. This may be represented as Table 16 below.

TABLE 16

| | |
|---|---|
| PLMN-IdentityList ::= | SEQUENCE (SIZE (1..maxPLMN-r11)) OF PLMN-IdentityInfo |
| PLMN-IdentityInfo ::=<br>  plmn-Identity<br>  cellReservedForOperatorUse<br>} | SEQUENCE {<br>  PLMN-Identity,<br>  ENUMERATED {reserved, notReserved} |

At least one PLMN-IdentityInfo may be configured for the LTE cell connected to the 5GC, and each PLMN-IdentityInfo may include a plmn index when a same Plmn-Identity as the LTE cell connected to the EPC is used. For example, when the plmn index is '1', the plmn index may denote PLMN-Identity included in first PLMN-IdentityInfo of the LTE cell connected to the EPC. Also, when the plmn index is '2', the plmn index may denote PLMN-Identity included in second PLMN-IdentityInfo of the LTE cell connected to the EPC. In other words, PLMN-IdentityInfo does not include the same PLMN-Identity value, but includes plmn index, and thus signaling overhead may be reduced. When PLMN-Identity different from the LTE cell connected to the EPC is to be broadcasted to each PLMN-IdentityInfo, the PLMN-Identity value itself may be included. In other words, the LTE cell may determine whether to broadcast the PLMN-Identity or plmn index via a CHOICE structure, and signal a result of the determination to the UE 1i-01. Also, PLMN-IdentityInfo may include cellReservedForOperatorUse for each PLMN. This may be represented as Table 17 below.

TABLE 17

| | |
|---|---|
| PLMN-IdentityInfo-r15 ::= | SEQUENCE { |
| plmn-Identity-5GC-r15 | CHOICE{ |
| plmn-Identity-r15 | PLMN-Identity, |
| plmn-Index-r15 | INTEGER |
| | (1..maxPLMN-r11) |
| }, | |
| cellReservedForOperatorUse-r15 | ENUMERATED {reserved, notReserved}, |
| cellReservedForOperatorUse-CRS-r15 | ENUMERATED {reserved, notReserved} |
| } | |

In operation 1i-25, the EUTRA cell 1i-02 according to an embodiment of the disclosure may broadcast the NR frequency band list for (NG)EN-DC, as system information, only for the PLMN supporting (NG)EN-DC.

For example, the NR frequency band list for (NG)EN-DC per PLMN list or PLMN may be broadcasted from SystemInformationBlockType1, SystemInformationBlockType2, SystemInformationBlockType5, SystemInformationBlockType24, or new SystemInformationBlockType (for example, SystemInformationBlockType27). In detail, The NR frequency band list for (NG)EN-DC may be included in the system information only for the PLMN supporting (NG)EN-DC. Here, the system information may include a PLMN identity and NR frequency band list corresponding to the PLMN identity. Also, the system information may include a PLMN index for indicating the PLMN identity and the NR frequency band list corresponding to the PLMN index. As described in the above embodiment of the disclosure, when a plurality of PLMNs support the same NR frequency band list, the PLMN-IdentityList or PLMN-IdentityIndexList may be included and a NR frequency band list corresponding thereto may be included. For example, when the PLMN index is '1', the PLMN index may indicate plmn-Identity included in first PLMN-IdentityInfo of plmn-IdentityList broadcasted via SystemInformationBlockType1.

Each NR frequency band may be indicated by FreqBandIndicatorNR, an absolute radio frequency channel number, or a carrier frequency.

For example, the broadcasting of the NR frequency band list only for PLMN supporting (NG)EN-DC via the system information, according to an embodiment of the disclosure may be in a form of Table 18 below.

TABLE 18

| SystemInformationBlockType1 | |
|---|---|
| PLMN-IdentityList | PLMN-Identity 1 |
| | PLMN-Identity 2 |
| | PLMN-Identity 3 |
| | PLMN-Identity 4 |

TABLE 18-continued

| SystemInformationBlockType x (x is 1, 2, 5, 24, or 27) | | |
|---|---|---|
| NRFreqBandENCD-List | 4 (PLMN-IdentityIndex) or PLMN-Identity 4 (PLMN-Identity) | 10, 20, 30 (NRFreqNR-List) |

In the above table PLMN-Identity 4 corresponds to the NRFreqBandENCD-List values (10, 20, 30).

For PLMN-Identity 4, an NR frequency band list supporting (NG)EN-DC may be broadcasted as 10, 20, 30. 10, 20, 30 may denote FreqBandIndicatorNR. The NR frequency band list may include a value of PLMN-Identity 4 or a plmn index '4' for indicating the PLMN-Identity 4.

Table 18 may denote that there is no NR frequency band list supporting (NG)EN-DC in PLMN-Identity 1, PLMN-Identity 2, and PLMN-Identity 3.

When the NR frequency band list supporting (NG)EN-DC is the same for all PLMNs, a 1-bit indicator may be introduced. In detail, when the 1-bit indicator is set (for example, TRUE), the 1-bit indicator may indicate that all PLMNs support the same NR frequency band list for (NG) EN-DC when the NR frequency band list supporting (NG) EN-DC is included.

In operation 1i-25, the UE 1i-01 may receive the system information including the NR frequency band list for the PLMN supporting (NG)EN-DC described above. In operation 1i-25, the UE 1i-01 may receive SystemInformationBlockType2. In detail, SystemInformationBlockType2 may include an indicator (upperLayerIndication) indicating whether 5G capability is provided per PLMN in a same order as SystemInformationBlockType1. An ASN.1 structure is as follows.

PLMN-InfoList including at least one PLMN-Info may be broadcasted in SystemInformationBlockType2.

Each PLMN-Info may be mapped in a same order of PLMN Identity or plmn index broadcasted in SystemInformationBlockType1. In other words, first PLMN-Info may be mapped to plmn-Identity of first PLMN-IdentityInfo broadcasted in SystemInformationBlockType1.

Each PLMN-Info may include upperLayerIndication indicator about whether a corresponding PLMN provides 5G capability. When upperLayerIndication is set to TRUE, the corresponding PLMN may provide 5G capability. Otherwise, the corresponding PLMN may not provide 5G capability. For reference, upperLayerIndication may be set to TRUE only when the NR frequency band supporting (NG)EN-DC is present. This may be represented as Table 19 below.

TABLE 19

| | | | |
|---|---|---|---|
| PLMN-InfoList-r15 ::= | SEQUENCE (SIZE (1..maxPLMN-r11)) OF PLMN-Info-r15 | | |
| PLMN-Info-r15 ::= | SEQUENCE { | | |
| upperLayerIndication-r15 | ENUMERATED {true} | OPTIONAL | -- Need OR |
| } | | | |
| -- ASN1STOP | | | |

In operation 1*i*-30, the UE 1*i*-01 may transmit the upperLayerIndication to the upper layer when the upperLayerIndication is set to TRUE for the PLMN selected in operation 1*i*-20 and at least one NR frequency band is supported in the NR frequency band list for (NG)EN-DC for the selected PLMN. In other words, the upperLayerIndication may refer to an indicator for indicating the upper layer that the UE 1*i*-01 has entered or is located in the coverage area providing 5G capability and the at least one NR frequency band is supported in the NR frequency band list for (NG) EN-DC supported by the cell for the selected PLMN. Otherwise, the UE 1*i*-01 may indicate the upper layer about absence of the upperLayerIndication. In other words, the UE 1*i*-01 may indicate the upper layer about the absence of the upperLayerIndication when there is no upperLayerIndication for the selected PLMN, FALSE is set, and/or at least one NR frequency band is not supported among the NR frequency band list for the selected PLMN. For reference, when the UE 1*i*-01 transmits the upperLayerIndication to the upper layer, the UE 1*i*-01 may display a 5G icon on a display of the UE 1*i*-01.

In operation 1*i*-30, the UE 1*i*-01 may transmit, to the upper layer, the upperLayerIndication when information that the upperLayerIndication for the PLMN registered in operation 1*i*-20 or a PLMN belonging to an equivalent PLMN list is set to TRUE and that at least one NR frequency band is supported in the NR frequency band list for the corresponding PLMN is included. Otherwise, the UE 1*i*-01 may indicate, to the upper layer, absence of the upperLayerIndication.

In operation 1*i*-30, the UE 1*i*-01 may transmit the upperLayerIndication to the upper layer when at least one NR frequency band is supported in the NR frequency band list supporting (NG)EN-DC for the selected PLMN, regardless of the upperLayerIndication being set to TRUE. In other words, the upperLayerIndication may denote an indicator for indicating the upper layer that the at least one NR frequency band is supported in the NR frequency band list for (NG)EN-DC supported by the cell for the selected PLMN. Otherwise, the UE 1*i*-01 may indicate, to the upper layer, absence of the upperLayerIndication. For reference, the upperLayerIndication may be used distinguishably from existing upperLayerIndication by introducing a new indicator different from the existing upperLayerIndication.

Figure 1J:
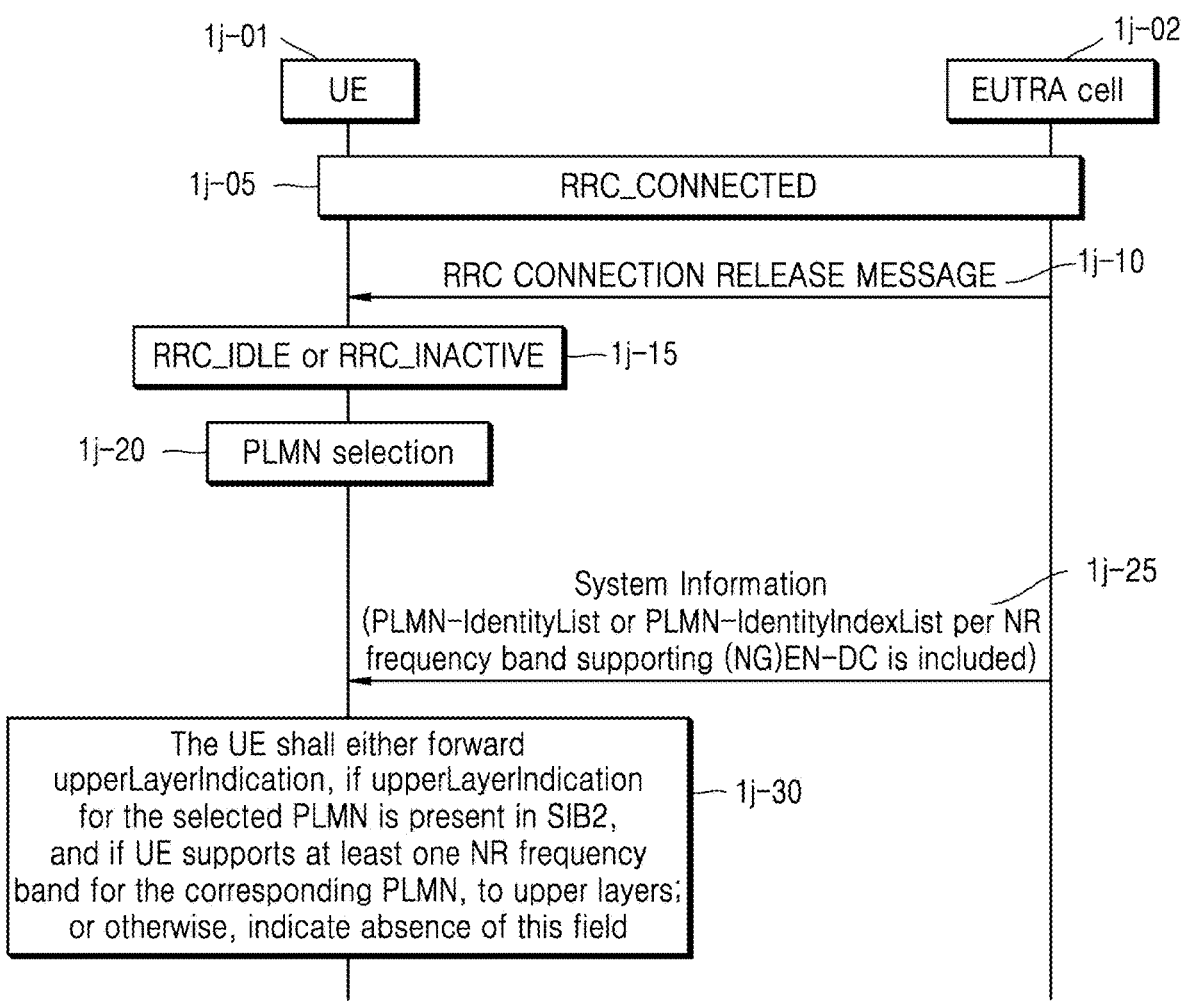
FIG. 1J is a diagram for describing a procedure of determining whether a certain frequency band is supported, according to an embodiment of the disclosure.

FIG. 1J is a diagram for describing a procedure of determining whether a UE 1*j*-01 supports a certain NR frequency band, according to an embodiment of the disclosure. Hereinafter, for convenience of description, an example in which the UE 1*j*-01 that was operating in an LTE system is located in a coverage area of an NR system is described, but the LTE system and the NR system are only examples, and an embodiment of the disclosure may be applied to another next-generation communication system. In detail, FIG. 1J is a diagram for describing a procedure in which the LTE system determines that the UE 1*j*-01 in an RRC idle mode (RRC_IDLE) or RRC inactive mode (RRC_INACTIVE) is located in a coverage area providing 5G capability and determines whether a serving cell supports an NR frequency band supporting (NG)EN-DC.

An LTE base station according to an embodiment of the disclosure may signal whether 5G capability is supported, as system information. For example, an LTE base station may signal, to the UE 1*j*-01, at least one PLMN per NR frequency band supporting (NG)EN-DC, as the system information. As described in the above embodiment of the disclosure, the UE 1*j*-01 determines whether the UE 1*j*-01 has entered or is located in the coverage area supporting 5G capability, based on an indicator included in the system information, and determines whether the NR frequency band supporting (NG)EN-DC included in the system information is supported, to thereby display a 5G icon by transmitting the indicator indicating 5G capability to an upper layer.

Referring to FIG. 1J, the UE 1*j*-01 may establish an RRC connection with a EUTRA cell 1*j*-02 and thus be in an RRC connected mode (RRC_CONNECTED), in operation 1*j*-05. In operation 1*j*-10, when there is no data transmission/reception due to a certain reason or for a certain period of time, the EUTRA cell 1*j*-02 may transmit an RRC connection release message (RRCConnectionRelease) to the UE 1*j*-01. In operation 1*j*-10, the RRC connection release message may include RRC inactive configuration information (rrc_InactiveConfig).

In operation 1*j*-15, when an RRC inactive message includes the RRC inactive configuration information, the UE 1*j*-01 may transition to the RRC inactive mode. When the RRC inactive message does not include the RRC inactive configuration information, the UE 1*j*-01 may transition to the RRC idle mode. In other words, the UE 1*j*-01 that received the RRC connection release message may transition to the RRC inactive mode or RRC idle mode depending on whether the RRC inactive configuration information is included in the RRC connection release message.

In operation 1*j*-20, the UE 1*j*-01 in the RRC idle mode or RRC inactive mode may select a PLMN. The UE 1*j*-01 may select the PLMN via a series of following processes.

The UE 1*j*-01 may scan all RF channels with respect to E-UTRA bands depending on capability of the UE 1*j*-01.

For each carrier, the UE 1*j*-01 may find a cell having strongest signal strength and receive system information from the cell.

When at least one PLMN identifier is receivable from the cell having the strongest signal strength, the UE 1*j*-01 may report an upper layer (for example, NAS) that the at least one PLMN identifier is a high quality PLMN. Here, when a measured RSRP value is equal to or greater than −110 dBm, the UE 1*j*-01 may report the upper layer about the high quality PLMN, and when not, the UE 1*j*-01 may report the upper layer together with the RSRP value.

When the UE 1*j*-01 supports E-UTRA connected to a 5GC with respect to a found PLMN, the UE 1*j*-01 may also report a CN type to the upper layer.

In operation 1*j*-25, the UE 1*j*-01 in the RRC idle mode or RRC inactive mode may perform a cell selection process. The cell selection process may denote a process for the UE 1*j*-01 to camp on a suitable cell associated to the PLMN selected in operation 1*j*-20. The suitable cell may denote a cell satisfying following conditions.

When the cell is a part of either the selected PLMN, a registered PLMN, or a PLMN of an equivalent PLMN list When the cell is not barred according to information provided from the upper layer When the cell is a part of at least one TA that is not a part of a list of "forbidden tracking areas for roaming", which belongs to the PLMN described above (The cell is part of at least one TA that is not part of the list of "forbidden tracking areas for roaming), which belongs to a PLMN that fulfils the first bullet above)

In operation 1*j*-25, the UE 1*j*-01 in the RRC idle mode or RRC inactive mode may receive the system information to perform the cell selection process. In operation 1*j*-25, when the UE 1*j*-01 received SystemInformationBlockType1, a PLMN identity or plmn index corresponding to the PLMN selected in operation 1j-20 may be included in cellAccessRelatedInfoList. In this case, plmn-IdentityList, trackingAreaCode, and cellIdentity for a cell as received in the corresponding cellAccessRelatedInfoList containing the selected PLMN may be used. In particular, the plmn-IdentityList may include at least one PLMN-IdentityInfo, and the plmn-IdentityList including at least one PLMN-IdentityInfo for each core type (for example, an evolved packet core (EPC) and/or 5GC) supported by an LTE cell may be configured. For example, PLMN-IdentityInfo of the LTE cell connected to the EPC may be configured of plmn-IdentityList up to maxPLMN-r11. For example, maxPLMN-r11 may have a value of 6. Alternatively, PLMN-IdentityInfo of an LTE cell connected to EPC by defining a new constant value may be configured of plmn-IdentityList up to maxPLMN-r16. Similarly, PLMN-IdentityInfo of the LTE cell connected to the 5GC may be configured of plmn-IdentityList up to maxPLMN-r11. For example, maxPLMN-r11 may have a value of 6. Alternatively, PLMN-IdentityInfo of the LTE cell connected to the 5GC based on a newly defined constant value may be configured of plmn-IdentityList up to maxPLMN-r16. One LTE cell may be connected only to the EPC, only to the 5GC, or both to the EPC and the 5GC. The plmn-IdentityList may have an ASN.1 structure below.

At least one PLMN-IdentityInfo may be configured for the LTE cell connected to the EPC, and each PLMN-IdentityInfo may be configured of a plmn-Identity value and cellReservedForOperatorUse. This may be represented as Table 20 below.

TABLE 20

| | |
|---|---|
| PLMN-IdentityList ::= | SEQUENCE (SIZE (1..maxPLMN-r11)) OF PLMN-IdentityInfo |
| PLMN-IdentityInfo ::= | SEQUENCE { |
| plmn-Identity | PLMN-Identity, |
| cellReservedForOperatorUse | ENUMERATED {reserved, notReserved} |
| } | |

At least one PLMN-IdentityInfo may be configured for the LTE cell connected to the 5GC, and each PLMN-IdentityInfo may include a plmn index when a same Plmn-Identity as the LTE cell connected to the EPC is used. For example, when the plmn index is '1', the plmn index may denote PLMN-Identity included in first PLMN-IdentityInfo of the LTE cell connected to the EPC. Also, when the plmn index is '2', the plmn index may denote PLMN-Identity included in second PLMN-IdentityInfo of the LTE cell connected to the EPC. In other words, PLMN-IdentityInfo does not include the same PLMN-Identity value, but includes plmn index, and thus signaling overhead may be reduced. When PLMN-Identity different from the LTE cell connected to the EPC is to be broadcasted to each PLMN-IdentityInfo, the PLMN-Identity value itself may be included. In other words, the LTE cell may determine whether to broadcast the PLMN-Identity or plmn index via a CHOICE structure, and signal a result of the determination to the UE 1j-01. Also, PLMN-IdentityInfo may include cellReservedForOperatorUse for each PLMN. This may be represented as Table 21 below.

TABLE 21

| | |
|---|---|
| PLMN-IdentityInfo-r15 ::= | SEQUENCE { |
| plmn-Identity-5GC-r15 | CHOICE{ |
| plmn-Identity-r15 | PLMN-Identity, |
| plmn-Index-r15 | INTEGER (1..maxPLMN-r11) |
| }, | |
| cellReservedForOperatorUse-r15 | ENUMERATED {reserved, notReserved}, |
| cellReservedForOperatorUse-CRS-r15 | ENUMERATED {reserved, notReserved} |
| } | |

In operation 1j-25, the EUTRA cell 1j-02 may broadcast at least one PLMN per NR frequency band supporting (NG)EN-DC, as the system information. For example, information about the NR frequency band supporting (NG)EN-DC and the at least one PLMN supporting the NR frequency band may be broadcasted from SystemInformationBlockType1, SystemInformationBlockType2, SystemInformationBlockType5, SystemInformationBlockType24, or new SystemInformationBlockType (for example, SystemInformationBlockType27). In detail, Information about the NR frequency band supporting (NG)EN-DC and at least one PLMN supporting the NR frequency band may be included. Here, the information about PLMN may include a value of PLMN identify itself or a plmn index for indicating the value of PLMN identity.

Each NR frequency band may be indicated by FreqBandIndicatorNR, an absolute radio frequency channel number, or a carrier frequency.

For example, the broadcasting of the information about at least one PLMN per NR frequency band supporting (NG) EN-DC via the system information, according to an embodiment of the disclosure may be in a form of Table 22 below.

TABLE 22

| SystemInformationBlockType x (x is 1, 2, 5, 24, or 27) | | |
|---|---|---|
| PLMN-IdentityIn-dexPerNRFreqBandENCD-List | 1, 2 (PLMN-IdentityIndexList) | 10 |
| | 2, 3 (PLMN-IdentityIndexList) | 20 |
| | 3 (PLMN-IdentityIndexList) | 300 |

An NR frequency band '10' may be supported in PLMN-Identity 1 and PLMN-Identity 2. The system information may include a PLMN index '1' indicating a PLMN Identity 1 and a PLMN index '2' indicating a PLMN Identity 2, and broadcast the NR frequency band '10'. The system information may include a value of the PLMN identity itself instead of the PLMN index.

To indicate that an NR frequency band '20' is supported in PLMN-Identity 2 and PLMN-Identity 3, the system information may include the PLMN index '2' indicating the PLMN Identity 2 and a PLMN index '3' indicating a PLMN Identity 3, and broadcast the NR frequency band '20'. Also, the system information may include a value of the PLMN identity itself instead of the PLMN index.

To indicate that an NR frequency band '300' is supported in PLMN-Identity 3, the system information may include the PLMN index '3' indicating the PLMN Identity 3, and broadcast the NR frequency band '300'. The system information may include a value of the PLMN identity itself instead of the PLMN index.

A PLMN not supporting an NR frequency band may not be signaled.

In addition, information or indicator indicating that a specific NR frequency band is supported in all PLMNs may be included. For example, an indicator indicating that the specific NR frequency band is supported in all PLMNs may be set in the system information and the specific NR frequency band may be included.

In operation 1*j*-25, the UE 1*j*-01 may receive the system information including the PLMN information per NR frequency band supporting (NG)EN-DC, as described above. In operation 1*j*-25, the UE 1*j*-01 may receive SystemInformationBlockType2. In detail, SystemInformationBlockType2 may include an indicator (upperLayerIndication) indicating whether 5G capability is provided per PLMN in a same order as SystemInformationBlockType1. An ASN.1 structure is as follows.

PLMN-InfoList including at least one PLMN-Info may be broadcasted in SystemInformationBlockType2.

Each PLMN-Info may be mapped in a same order of PLMN Identity broadcasted in SystemInformationBlockType1. In other words, first PLMN-Info may be mapped to plmn-Identity of first PLMN-IdentityInfo broadcasted in SystemInformationBlockType1.

Each PLMN-Info may include upperLayerIndication indicator about whether a corresponding PLMN provides 5G capability. When upperLayerIndication is set to TRUE, the corresponding PLMN may provide 5G capability. Otherwise, the corresponding PLMN may not provide 5G capability. For reference, upperLayerIndication may be set to TRUE only when the NR frequency band supporting (NG)EN-DC is present. This may be represented as Table 23 below.

TABLE 23

```
PLMN-InfoList-r15 ::=      SEQUENCE (SIZE (1..maxPLMN-r11)) OF PLMN-Info-r15
PLMN-Info-r15 ::=      SEQUENCE {
   upperLayerIndication-r15    ENUMERATED {true}     OPTIONAL     -- Need OR
}
-- ASN1STOP
```

In operation 1*j*-30, the UE 1*j*-01 may transmit the upperLayerIndication to the upper layer when the upperLayerIndication is set to TRUE for the PLMN selected in operation 1*j*-20 and at least one NR frequency band for (NG)EN-DC is supported for the selected PLMN. In other words, the upperLayerIndication may refer to an indicator for indicating the upper layer that the UE 1*j*-01 has entered or is located in the coverage area providing 5G capability and one NR frequency band for (NG)EN-DC supported by at least a cell for the selected PLMN is supported. Otherwise, the UE 1*j*-01 may indicate, to the upper layer, absence of the upperLayerIndication. In other words, the UE 1*j*-01 may indicate, to the upper layer, the absence of the upperLayerIndication when there is no upperLayerIndication for the selected PLMN, FALSE is set, and/or at least one NR frequency band for (NG)EN-DC is not supported for the selected PLMN. For reference, when the UE 1*j*-01 transmits the upperLayerIndication to the upper layer, the UE 1*j*-01 may display a 5G icon on a display of the UE 1*j*-01.

In operation 1*j*-30, the UE 1*j*-01 may transmit, to the upper layer, the upperLayerIndication when information that the upperLayerIndication for the PLMN registered in operation 1*j*-20 or a PLMN belonging to an equivalent PLMN list is set to TRUE and that at least one NR frequency band for (NG)EN-DC is supported for the corresponding PLMN is included. Otherwise, the UE 1*j*-01 may indicate, to the upper layer, absence of the upperLayerIndication.

In operation 1*j*-30, the UE 1*j*-01 may transmit the upperLayerIndication to the upper layer when at least one NR frequency band supporting (NG)EN-DC is supported for the selected PLMN, regardless of the upperLayerIndication being set to TRUE. In other words, the upperLayerIndication may denote an indicator for indicating the upper layer that the at least one NR frequency band for (NG)EN-DC supported by the cell for the selected PLMN is supported. Otherwise, the UE 1*j*-01 may indicate, to the upper layer, absence of the upperLayerIndication. For reference, the upperLayerIndication may be used distinguishably from existing upperLayerIndication by introducing a new indicator different from the existing upperLayerIndication.

Figure 1K:
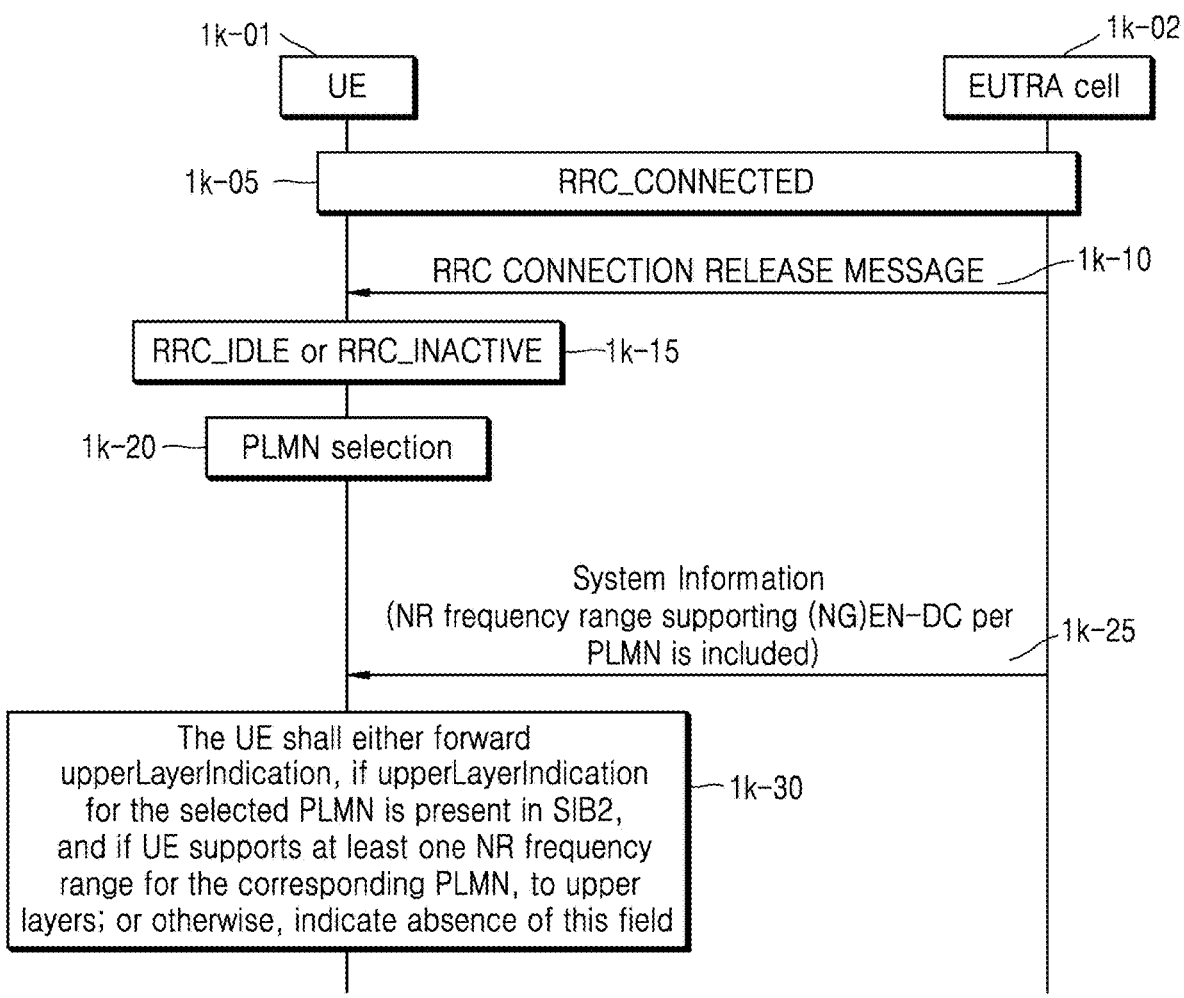
FIG. 1K is a diagram for describing a procedure of determining whether a certain frequency range is supported, according to an embodiment of the disclosure.

FIG. 1K is a diagram for describing a procedure of determining whether a UE 1*k*-01 supports a certain frequency range, according to an embodiment of the disclosure. Hereinafter, for convenience of description, an example in which the UE 1*k*-01 that was operating in an LTE system is located in a coverage area of an NR system is described, but the LTE system and the NR system are only examples, and an embodiment of the disclosure may be applied to another next-generation communication system. In detail, FIG. 1K is a diagram for describing a procedure of determining that the UE 1*k*-01 in an RRC idle mode (RRC_IDLE) or RRC inactive mode (RRC_INACTIVE) is located in a coverage area providing 5G capability and determining whether a serving cell supports an NR frequency range supporting (NG)EN-DC.

A EUTRA cell 1*k*-02 according to an embodiment of the disclosure may signal whether 5G capability is supported, as system information. For example, the EUTRA cell 1*k*-02 may signal, to the UE 1*k*-01, an NR frequency range supporting (NG)EN-DC for per PLMN, as the system information. As described in the above embodiment of the disclosure, the UE 1*k*-01 may determine whether the UE 1*k*-01 has entered or is located in the coverage area supporting 5G capability, based on an indicator included in the system information, determine whether the broadcasted NR frequency range is supported, determine whether the NR frequency range supporting (NG)EN-DC included in the system information is supported, and display a 5G icon by transmitting an indicator indicating the 5G capability to an upper layer.

Referring to FIG. 1K, the UE 1*k*-01 may establish an RRC connection with the EUTRA cell 1*k*-02 and thus be in an RRC connected mode (RRC_CONNECTED), in operation 1*k*-05.

In operation 1*k*-10, when there is no data transmission/reception due to a certain reason or for a certain period of time, the EUTRA cell 1*k*-02 may transmit an RRC connection release message (RRCConnectionRelease) to the UE 1*k*-01. In operation 1*k*-10, the RRC connection release message may include RRC inactive configuration information (rrc_InactiveConfig).

In operation 1*k*-15, when the RRC connection release message includes the RRC inactive configuration information, the UE 1*k*-01 may transition to the RRC inactive mode. When the RRC connection release message does not include the RRC inactive configuration information, the UE 1k-01 may transition to the RRC idle mode, in operation 1k-15. In other words, the UE 1k-01 that received the RRC connection release message may transition to the RRC inactive mode or RRC idle mode depending on whether the RRC inactive configuration information is included in the RRC connection release message.

In operation 1k-20, the UE 1k-01 in the RRC idle mode or RRC inactive mode may select a PLMN. The UE 1k-01 may select the PLMN via a series of following processes.

The UE 1k-01 may scan all RF channels with respect to E-UTRA bands depending on capability of the UE 1k-01.

For each carrier, the UE 1k-01 may find a cell having strongest signal strength and receive system information from the cell.

When at least one PLMN identifier is receivable from the cell having the strongest signal strength, the UE 1k-01 may report an upper layer (for example, NAS) that the at least one PLMN identifier is a high quality PLMN. Here, when a measured RSRP value is equal to or greater than −110 dBm, the UE 1k-01 may report the upper layer about the high quality PLMN, and when not, the UE 1k-01 may report the upper layer together with the RSRP value.

When the UE 1k-01 supports E-UTRA connected to a 5GC with respect to a found PLMN, the UE 1k-01 may also report a CN type to the upper layer.

In operation 1k-25, the UE 1k-01 in the RRC idle mode or RRC inactive mode may perform a cell selection process. The cell selection process may denote a process for the UE 1k-01 to camp on a suitable cell associated to the PLMN selected in operation 1k-20. The suitable cell may denote a cell satisfying following conditions.

When the cell is a part of either the selected PLMN, a registered PLMN, or a PLMN of an equivalent PLMN list When the cell is not barred according to information provided from the upper layer When the cell is a part of at least one TA that is not a part of a list of "forbidden tracking areas for roaming", which belongs to the PLMN described above (The cell is part of at least one TA that is not part of the list of "forbidden tracking areas for roaming), which belongs to a PLMN that fulfills the first bullet above)

In operation 1k-25, the UE 1k-01 in the RRC idle mode or RRC inactive mode may receive the system information to perform the cell selection process.

In operation 1k-25, when the UE 1k-01 received SystemInformationBlockType1, a PLMN identity or plmn index corresponding to the PLMN selected in operation 1k-20 may be included in cellAccessRelatedInfoList. In this case, plmn-IdentityList, trackingAreaCode, and cellIdentity for a cell as received in the corresponding cellAccessRelatedInfoList containing the selected PLMN may be used. In particular, the plmn-IdentityList may include at least one PLMN-IdentityInfo, and the plmn-IdentityList including at least one PLMN-IdentityInfo for each core type (for example, an evolved packet core (EPC) and/or 5GC) supported by an LTE cell may be configured. For example, PLMN-IdentityInfo of the LTE cell connected to the EPC may be configured of plmn-IdentityList up to maxPLMN-r11. For example, maxPLMN-r11 may have a value of 6. Alternatively, PLMN-IdentityInfo of an LTE cell connected to EPC based on a newly defined constant value may be configured of plmn-IdentityList up to maxPLMN-r16. Similarly, PLMN-IdentityInfo of the LTE cell connected to the 5GC may be configured of plmn-IdentityList up to maxPLMN-r11. For example, maxPLMN-r11 may have a value of 6. Alternatively, PLMN-IdentityInfo of the LTE cell connected to the 5GC based on a newly defined constant value may be configured of plmn-IdentityList up to maxPLMN-r16. One LTE cell may be connected only to the EPC, only to the 5GC, or both to the EPC and the 5GC. The plmn-IdentityList may have an ASN.1 structure below.

At least one PLMN-IdentityInfo may be configured for the LTE cell connected to the EPC, and each PLMN-IdentityInfo may be configured of a plmn-Identity value and cellReservedForOperatorUse. This may be represented as Table 24 below.

TABLE 24

| | |
|---|---|
| PLMN-IdentityList ::= | SEQUENCE (SIZE (1..maxPLMN-r11)) OF PLMN-IdentityInfo |
| PLMN-IdentityInfo ::= | SEQUENCE { |
| plmn-Identity | PLMN-Identity, |
| cellReservedForOperatorUse | ENUMERATED {reserved, notReserved} |
| } | |

At least one PLMN-IdentityInfo may be configured for the LTE cell connected to the 5GC, and each PLMN-IdentityInfo may include a plmn index when a same Plmn-Identity as the LTE cell connected to the EPC is used. For example, when the plmn index is '1', the plmn index may denote PLMN-Identity included in first PLMN-IdentityInfo of the LTE cell connected to the EPC. Also, when the plmn index is '2', the plmn index may denote PLMN-Identity included in second PLMN-IdentityInfo of the LTE cell connected to the EPC. In other words, PLMN-IdentityInfo does not include the same PLMN-Identity value, but includes plmn index, and thus signaling overhead may be reduced. When PLMN-Identity different from the LTE cell connected to the EPC is to be broadcasted to each PLMN-IdentityInfo, the PLMN-Identity value itself may be included. In other words, the LTE cell may determine whether to broadcast the PLMN-Identity or plmn index via a CHOICE structure, and signal a result of the determination to the UE 1k-01. Also, PLMN-IdentityInfo may include cellReservedForOperatorUse for each PLMN. This may be represented as Table 25 below.

TABLE 25

| | |
|---|---|
| PLMN-IdentityInfo-r15 ::= | SEQUENCE { |
| plmn-Identity-5GC-r15 | CHOICE{ |
| plmn-Identity-r15 | PLMN-Identity, |
| plmn-Index-r15 | INTEGER (1..maxPLMN-r11) |
| }, | |
| cellReservedForOperatorUse-r15 | ENUMERATED {reserved, notReserved}, |
| cellReservedForOperatorUse-CRS-r15 | ENUMERATED {reserved, notReserved} |
| } | |

In operation 1k-25, the EUTRA cell 1k-02 may broadcast the NR frequency range supporting (NG)EN-DC per PLMN, as the system information. For example, NR frequency range information supporting (NG)EN-DC per PLMN may be broadcasted from SystemInformationBlockType1, SystemInformationBlockType2, SystemInformationBlockType5, SystemInformationBlockType24, or new SystemInformationBlockType (for example, SystemInformationBlockType27). For example, The NR frequency range information supporting (NG) EN-DC per PLMN may be included. Here, information about PLMN may include a value of PLMN identify itself or a plmn index for indicating the value of PLMN identity. Alternatively, the NR frequency range information may be included in a same order as the PLMN included in SystemInformationBlockType1. Here, when a specific PLMN does not support an NR frequency range, information indicating that the NR frequency range is not supported may be additionally signaled. For example, it may be indicated that the NR frequency range is not supported by broadcasting an indicator indicating that the NR frequency range is not supported or by not broadcasting information about a frequency range (FR).

PLMN-InfoList including at least one PLMN-Info may be broadcasted in SystemInformationBlockType2.

Each PLMN-Info may be mapped in a same order of PLMN Identity broadcasted in SystemInformationBlockType1. In other words, first PLMN-Info may be mapped to plmn-Identity of first PLMN-IdentityInfo broadcasted in SystemInformationBlockType1.

Each PLMN-Info may include upperLayerIndication indicator about whether 5G capability is provided. When upperLayerIndication is set to TRUE, the corresponding PLMN may provide 5G capability. Otherwise, the corresponding PLMN may not provide 5G capability. For reference, upperLayerIndication may be set to TRUE only when the NR frequency range supporting (NG)EN-DC is present. This may be represented as Table 27 below.

TABLE 27

| | | | |
|---|---|---|---|
| PLMN-InfoList-r15 ::= | SEQUENCE (SIZE (1..maxPLMN-r11)) OF PLMN-Info-r15 | | |
| PLMN-Info-r15 ::= | SEQUENCE { | | |
| upperLayerIndication-r15 | ENUMERATED {true} | OPTIONAL | -- Need OR |
| } | | | |
| -- ASN1STOP | | | |

FR1, FR2, or both FR1 and FR2 may be included for the NR frequency range supporting (NG)EN-DC per PLMN.

For example, the broadcasting of the NR frequency range information supporting (NG)EN-DC per PLMN, as the system information, may be in a form of Table 26 below.

TABLE 26

| SystemInformationBlockType1 | |
|---|---|
| PLMN-IdentityList | PLMN-Identity 1 |
| | PLMN-Identity 2 |
| | PLMN-Identity 3 |
| SystemInformationBlockType x (x is 1, 2, 5, 24, or 27) | |
| NRFreqBandENCD-List | FR1, FR2 |
| | FR1 |
| | absent |

In the above table, PLMN-Identity 1 corresponds to the first list of NRFreqBandENCD-List values (FR1, FR2), PLMN-Identity 2 corresponds to the second list of NRFreqBandENCD-List values (FR1), and PLMN-Identity 3 corresponds to the third list of NRFreqBandENCD-List values (absent).

PLMN-Identity 1 may indicate that FR1 and FR2 support (NG)EN-DC by including FR1 and FR2.

PLMN-Identity 2 may indicate that FR1 supports (NG) EN-DC by including FR1.

PLMN-Identity 3 may indicate that (NG)EN-DC is not supported because no value is included.

Unlike Table 26, FR information may be signaled only for the PLMN supporting (NG)EN-DC.

In operation 1k-25, the UE 1k-01 may receive the system information including the NR frequency range information for the PLMN supporting (NG)EN-DC described above.

In operation 1k-25, the UE 1k-01 may receive SystemInformationBlockType2. In detail, SystemInformationBlockType2 may include an indicator (upperLayerIndication) indicating whether 5G capability is provided per PLMN in a same order as SystemInformationBlockType1. An ASN.1 structure is as follows.

In operation 1k-30, the UE 1k-01 may transmit the upperLayerIndication to the upper layer when the upperLayerIndication is set to TRUE for the PLMN selected in operation 1k-20 and the NR frequency range is supported for the selected PLMN. In other words, the upperLayerIndication may refer to an indicator for indicating the upper layer that the UE 1k-01 has entered or is located in the coverage area providing 5G capability and at least one NR frequency range is supported in an NR frequency range list supported by the cell for the selected PLMN. Otherwise, the UE 1k-01 may indicate, to the upper layer, absence of the upperLayerIndication. In other words, the UE 1k-01 may indicate, to the upper layer, the absence of the upperLayerIndication when there is no upperLayerIndication for the selected PLMN, FALSE is set, and/or at least one NR frequency range is not supported among the NR frequency range list for the selected PLMN. For reference, when the UE 1k-01 transmits the upperLayerIndication to the upper layer, the UE 1k-01 may display a 5G icon on a display of the UE 1k-01.

In operation 1k-30, the UE 1k-01 may transmit, to the upper layer, the upperLayerIndication when the upperLayerIndication for the PLMN registered in operation 1k-20 or a PLMN belonging to an equivalent PLMN list is set to TRUE and that at least one NR frequency range is supported in the NR frequency range list for the corresponding PLMN. Otherwise, the UE 1k-01 may indicate, to the upper layer, absence of the upperLayerIndication.

In operation 1k-30, the UE 1k-01 may transmit the upperLayerIndication to the upper layer when at least one NR frequency range supporting (NG)EN-DC is supported for the selected PLMN, regardless of the upperLayerIndication being set to TRUE. In other words, the upperLayerIndication may denote an indicator for indicating the upper layer that the at least one NR frequency range for (NG)EN-DC supported by the cell for the selected PLMN is supported. Otherwise, the UE 1k-01 may indicate, to the upper layer, absence of the upperLayerIndication. For reference, the upperLayerIndication may be used distinguishably from existing upperLayerIndication by introducing a new indicator different from the existing upperLayerIndication.

Figure 1L:
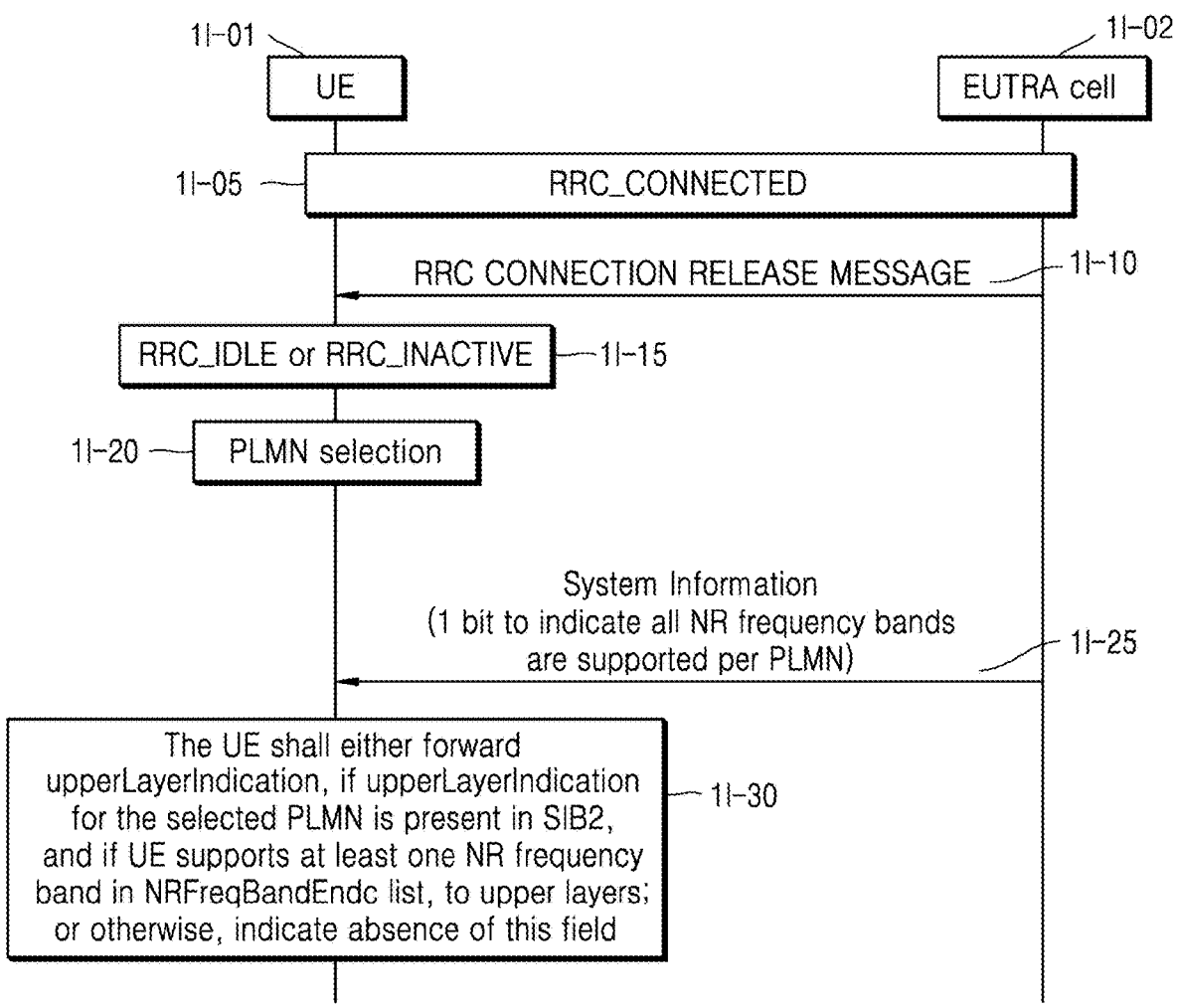
FIG. 1L is a diagram for describing a procedure of determining whether a certain frequency band is supported, according to an embodiment of the disclosure.

FIG. 1L is a diagram for describing a procedure of determining whether a UE 1*l*-01 supports a certain frequency band, according to an embodiment of the disclosure. Hereinafter, for convenience of description, an example in which the UE 1*l*-01 that was operating in an LTE system is located in a coverage area of an NR system is described, but the LTE system and the NR system are only examples, and an embodiment of the disclosure may be applied to another next-generation communication system. In detail, FIG. 1L is a diagram for describing a procedure in which the LTE system determines that the UE 1*l*-01 in an RRC idle mode (RRC_IDLE) or RRC inactive mode (RRC_INACTIVE) is located in a coverage area providing 5G capability and determines whether a serving cell supports an NR frequency band supporting (NG)EN-DC.

An LTE base station according to an embodiment of the disclosure may signal whether 5G capability is supported, as system information. For example, the LTE base station may signal, to the UE 1*l*-01, a NR frequency band list supporting (NG)EN-DC for each PLMN, as the system information. According to an embodiment of the disclosure, because all NR frequency bands may be supported for a specific PLMN, 1 bit may be introduced to indicate that all NR frequency bands are supported without including an NR frequency band list or it may be indicated that all NR frequency bands are supported by not including the NR frequency band list. In addition, 1 bit may be introduced per NR frequency range to indicate whether all NR frequency band lists are supported for FR1 and whether all NR frequency band lists are supported for FR2. In this case, signaling overhead may be reduced because all NR frequency band lists are not included in the system information for the specific PLMN. As described in the above embodiment of the disclosure, the UE 1*l*-01 determines whether the UE 1*l*-01 has entered or is located in the coverage area supporting 5G capability, based on an indicator included in the system information, and determines whether at least one NR frequency band among the signaled NR frequency band list is supported, to thereby transmit the indicator indicating 5G capability to an upper layer and display a 5G icon.

Referring to FIG. 1L, the UE 1*l*-01 may establish an RRC connection with a EUTRA cell 1*l*-02 and thus be in an RRC connected mode (RRC_CONNECTED), in operation 1*l*-05.

In operation 1*l*-10, when there is no data transmission/reception due to a certain reason or for a certain period of time, the EUTRA cell 1*l*-02 may transmit an RRC connection release message (RRCConnectionRelease) to the UE 1*l*-01. In operation 1*l*-10, the RRC connection release message may include RRC inactive configuration information (rrc_InactiveConfig).

In operation 1*l*-15, when the RRC inactive configuration information is included, the UE 1*l*-01 may transition to the RRC inactive mode. When the RRC inactive configuration information is not included, the UE 1*l*-01 may transition to the RRC idle mode. In other words, the UE 1*l*-01 that received the RRC connection release message may transition to the RRC inactive mode or RRC idle mode depending on whether the RRC inactive configuration information is included.

In operation 1*l*-20, the UE 1*l*-01 in the RRC idle mode or RRC inactive mode may select a PLMN. The UE 1*l*-01 may select the PLMN via a series of following processes.

The UE 1*l*-01 may scan all RF channels with respect to E-UTRA bands depending on capability of the UE 1*l*-01.

For each carrier, the UE 1*l*-01 may find a cell having strongest signal strength and receive system information from the cell.

When at least one PLMN identifier is receivable from the cell having the strongest signal strength, the UE 1*l*-01 may report an upper layer (for example, NAS) that the at least one PLMN identifier is a high quality PLMN. Here, when a measured RSRP value is equal to or greater than −110 dBm, the UE 1*l*-01 may report the upper layer about the high quality PLMN, and when not, the UE 1*l*-01 may report the upper layer together with the RSRP value.

When the UE 1*l*-01 supports E-UTRA connected to a 5GC with respect to a found PLMN, the UE 1*l*-01 may also report a CN type to the upper layer.

In operation 1*l*-25, the UE 1*l*-01 in the RRC idle mode or RRC inactive mode may perform a cell selection process. The cell selection process may denote a process for the UE 1*l*-01 to camp on a suitable cell associated to the PLMN selected in operation 1*l*-20. The suitable cell may denote a cell satisfying following conditions.

When the cell is a part of either the selected PLMN, a registered PLMN, or a PLMN of an equivalent PLMN list When the cell is not barred according to information provided from the upper layer When the cell is a part of at least one TA that is not a part of a list of "forbidden tracking areas for roaming", which belongs to the PLMN described above (The cell is part of at least one TA that is not part of the list of "forbidden tracking areas for roaming), which belongs to a PLMN that fulfills the first bullet above)

In operation 1*l*-25, the UE 1*l*-01 in the RRC idle mode or RRC inactive mode may receive the system information to perform the cell selection process.

In operation 1*l*-25, when the UE 1*l*-01 received SystemInformationBlockType1, a PLMN identity or plmn index corresponding to the PLMN selected in operation 1*l*-20 may be included in cellAccessRelatedInfoList. In this case, plmn-IdentityList, trackingAreaCode, and cellIdentity for a cell as received in the corresponding cellAccessRelatedInfoList containing the selected PLMN may be used. In particular, the plmn-IdentityList may include at least one PLMN-IdentityInfo, and the plmn-IdentityList including at least one PLMN-IdentityInfo for each core type (for example, an evolved packet core (EPC) and/or 5GC) supported by an LTE cell may be configured. For example, PLMN-IdentityInfo of the LTE cell connected to the EPC may be configured of plmn-IdentityList up to maxPLMN-r11. For example, maxPLMN-r11 may have a value of 6. Alternatively, PLMN-IdentityInfo of an LTE cell connected to EPC by defining a new constant value may be configured of plmn-IdentityList up to maxPLMN-r16. Similarly, PLMN-IdentityInfo of the LTE cell connected to the 5GC may be configured of plmn-IdentityList up to maxPLMN-r11. For example, maxPLMN-r11 may have a value of 6. Alternatively, PLMN-IdentityInfo of an LTE cell connected to 5GC by defining a new constant value may be configured of plmn-IdentityList up to maxPLMN-r16. One LTE cell may be connected only to the EPC, only to the 5GC, or both to the EPC and the 5GC. The plmn-IdentityList may have an ASN.1 structure below.

At least one PLMN-IdentityInfo may be configured for the LTE cell connected to the EPC, and each PLMN-IdentityInfo may be configured of a plmn-Identity value and cellReservedForOperatorUse. This may be represented as Table 28 below.

TABLE 28

```
PLMN-IdentityList ::=          SEQUENCE (SIZE
                               (1..maxPLMN-r11))
                               OF PLMN-IdentityInfo
PLMN-IdentityInfo ::=          SEQUENCE {
    plmn-Identity                 PLMN-Identity,
    cellReservedForOperatorUse    ENUMERATED {reserved,
                                  notReserved}
}
```

At least one PLMN-IdentityInfo may be configured for the LTE cell connected to the 5GC, and each PLMN-IdentityInfo may include a plmn index when a same Plmn-Identity as the LTE cell connected to the EPC is used. For example, when the plmn index is '1', the plmn index may denote PLMN-Identity included in first PLMN-IdentityInfo of the LTE cell connected to the EPC, and when the plmn index is '2', the plmn index may denote PLMN-Identity included in second PLMN-IdentityInfo of the LTE cell connected to the EPC. By including the plmn index instead of a same value of PLMN-Identity, signaling overhead may be reduced. When PLMN-Identity different from the LTE cell connected to the EPC is to be broadcasted to each PLMN-IdentityInfo, the PLMN-Identity value itself may be included. In other words, the LTE cell may determine whether to broadcast the PLMN-Identity or plmn index via a CHOICE structure, and signal a result of the determination to the UE 1*l*-01. Also, cellReservedForOperatorUse may be included for each PLMN.

In operation 1*l*-25, the EUTRA cell 1*l*-02 according to an embodiment of the disclosure may broadcast the NR frequency band list supporting (NG)EN-DC per PLMN, as the system information. For example, the NR frequency band list supporting (NG)EN-DC per PLMN may be broadcasted from SystemInformationBlockType1, SystemInformationBlockType2, SystemInformationBlockType5, SystemInformationBlockType24, or new SystemInformationBlockType (for example, SystemInformationBlockType27). According to an embodiment of the disclosure, when all NR frequency band lists supporting (NG)EN-DC are supported for the specific PLMN, 1 bit may be introduced to indicate the same. Alternatively, 1 bit per FR may be introduced for the specific PLMN to indicate whether all NR frequency band lists supporting (NG)EN-DC per FR are supported. Also, it may be indicated that all NR frequency band lists are supported by not including the NR frequency band list, when all NR frequency band lists supporting (NG)EN-DC are supported for the specific PLMN, without introducing 1 bit. Alternatively, it may be indicated that all NR frequency band lists per FR are supported by not including the NR frequency band list, when all NR frequency band lists supporting (NG)EN-DC per FR are supported for the specific PLMN.

For example, 1 bit may be included to indicate that all NR frequency band lists supporting (NG)EN-DC are supported for the specific PLMN. Alternatively, it may be indicated that all NR frequency band lists are supported by not including the NR frequency band list.

1 bit may be included to indicate that all NR frequency band lists supporting (NG)EN-DC are supported per FR for the specific PLMN. Alternatively, it may be indicated that all NR frequency band lists are supported by not including the NR frequency band list per FR.

According to the embodiments of the disclosure described above, the NR frequency band list may be included for the PLMN supporting (NG)EN-DC, or the NR frequency band list may be included for the PLMN in a same order as PLMN included in SystemInformationBlockType1. Alternatively, PLMN information and NR frequency band supporting (NG)EN-DC per NR frequency band may be included.

Each NR frequency band may be indicated by FreqBandIndicatorNR, an absolute radio frequency channel number, or a carrier frequency.

In operation 1*l*-25, the UE 1*l*-01 may receive the system information including the NR frequency band list supporting (NG)EN-DC per PLMN described above. In operation 1*i*-25, SystemInformationBlockType2 may be received. In detail, SystemInformationBlockType2 may include an indicator (upperLayerIndication) indicating whether 5G capability is provided per PLMN in a same order as SystemInformationBlockType1. An ASN.1 structure is as follows.

PLMN-InfoList including at least one PLMN-Info may be broadcasted in SystemInformationBlockType2.

Each PLMN-Info may be mapped in a same order of PLMN Identity broadcasted in SystemInformationBlockType1. In other words, first PLMN-Info may be mapped to plmn-Identity of first PLMN-IdentityInfo broadcasted in SystemInformationBlockType1.

Each PLMN-Info may include upperLayerIndication indicator about whether 5G capability is provided. When upperLayerIndication is set to TRUE, the corresponding PLMN may provide 5G capability. Otherwise, the corresponding PLMN may not provide 5G capability. For reference, upperLayerIndication may be set to TRUE only when the NR frequency range supporting (NG)EN-DC is present. This may be represented as Table 29 below.

TABLE 29

```
PLMN-InfoList-r15 ::=    SEQUENCE (SIZE (1..maxPLMN-r11)) OF PLMN-Info-r15
PLMN-Info-r15 ::=        SEQUENCE {
    upperLayerIndication-r15    ENUMERATED (true)    OPTIONAL    -- Need OR
}
-- ASN1STOP
```

In operation 1*l*-30, the UE 1*l*-01 may transmit the upperLayerIndication to the upper layer when the upperLayerIndication is set to TRUE for the PLMN selected in operation 1*l*-20 and at least one NR frequency band is supported in the NR frequency band list for the selected PLMN. The upperLayerIndication may refer to an indicator for indicating the upper layer that the UE 1*l*-01 has entered the coverage area providing 5G capability and the at least one NR frequency band is supported in the NR frequency band list supported by the cell for the selected PLMN. Otherwise, the UE 1*l*-01 may indicate, to the upper layer, absence of the upperLayerIndication. In other words, the UE 1*l*-01 may indicate, to the upper layer, the absence of the upperLayerIndication when there is no upperLayerIndication for the selected PLMN, FALSE is set, and/or at least one NR frequency band is not supported among the NR frequency band list for the selected PLMN. For reference, when the UE 1*l*-01 transmits the upperLayerIndication to the upper layer, the UE 1*l*-01 may display a 5G icon on a display of the UE 1*l*-01.

Alternatively, in operation 1*l*-30, the UE 1*l*-01 may transmit, to the upper layer, the upperLayerIndication when the upperLayerIndication for the PLMN registered in operation 1*l*-20 or a PLMN belonging to an equivalent PLMN list is set to TRUE and that at least one NR frequency band is supported in the NR frequency band list for the corresponding PLMN. Otherwise, the UE 1*l*-01 may indicate, to the upper layer, absence of the upperLayerIndication.

Alternatively, in operation 1*l*-30, the UE 1*l*-01 may transmit the upperLayerIndication to the upper layer when at least one NR frequency band supporting (NG)EN-DC is supported for the selected PLMN, regardless of the upperLayerIndication being set to TRUE. In other words, the upperLayerIndication may denote an indicator for indicating the upper layer that the at least one NR frequency band for (NG)EN-DC supported by the cell for the selected PLMN is supported. Otherwise, the UE 1*l*-01 may indicate, to the upper layer, absence of the upperLayerIndication. For reference, the upperLayerIndication may be used distinguishably from existing upperLayerIndication by introducing a new indicator different from the existing upperLayerIndication.

Figure 1M:
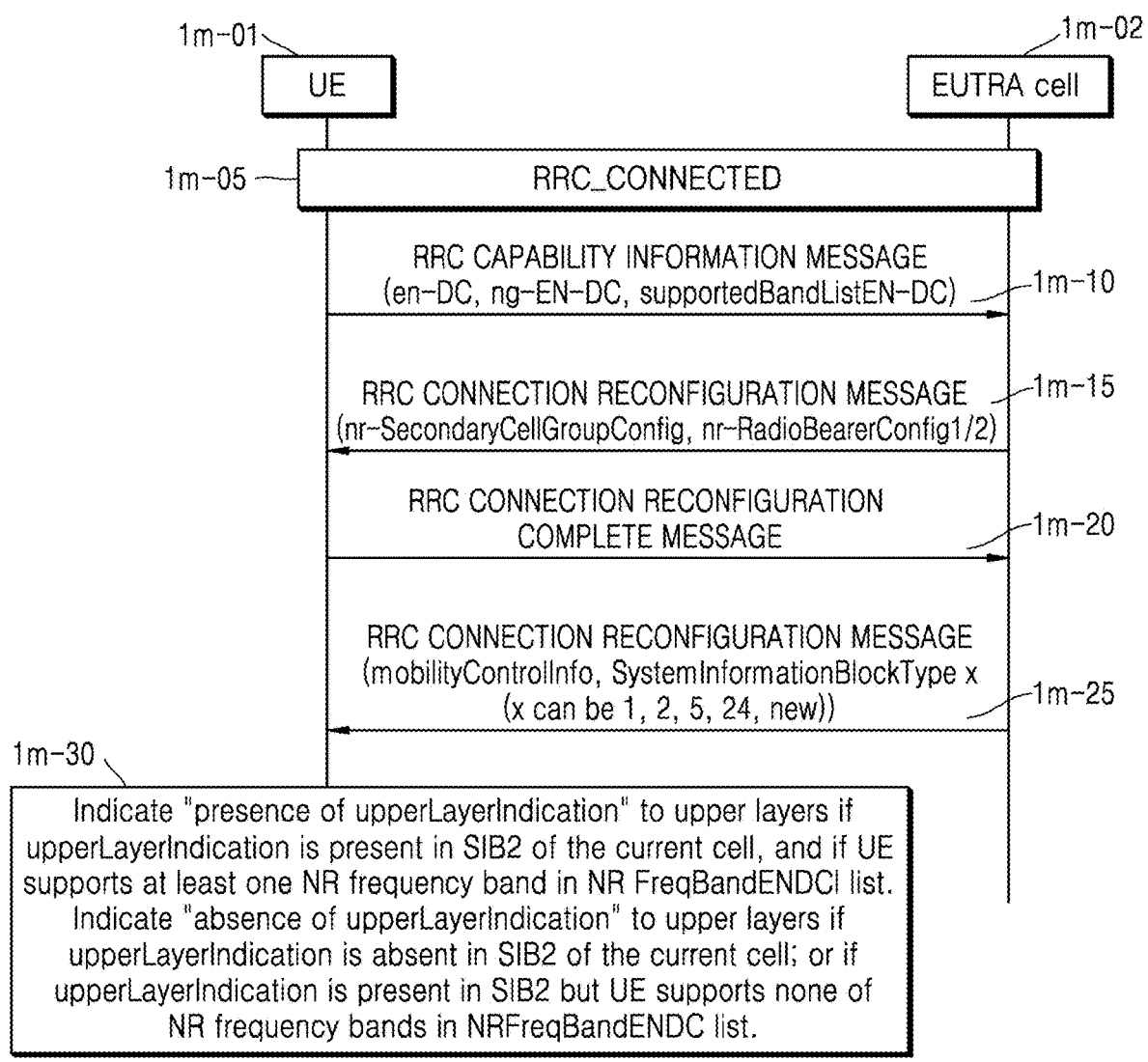
FIG. 1M is a diagram for describing a procedure of determining whether a certain frequency band or frequency range is supported, according to an embodiment of the disclosure.

FIG. 1M is a diagram for describing a procedure of determining whether a UE 1*m*-01 supports a certain frequency band or frequency range, according to an embodiment of the disclosure. Hereinafter, for convenience of description, an example in which the UE 1*m*-01 that was operating in an LTE system is located in a coverage area of an NR system is described, but the LTE system and the NR system are only examples, and an embodiment of the disclosure may be applied to another next-generation communication system. FIG. 1M is a diagram for describing a procedure of determining that the UE 1*m*-01 in an RRC idle mode (RRC_IDLE) or RRC inactive mode (RRC_INACTIVE) is located in a coverage area providing 5G capability and determining whether an NR frequency band or NR frequency range supporting (NG)EN-DC is supported.

A base station according to an embodiment of the disclosure may add system information including whether 5G capability is supported in dedicated signaling and provide the same to the UE 1*m*-01. For example, the dedicated signaling may denote an RRCConnectionReconfiguration message. The system information included in the dedicated signaling may follow the above-described embodiment of the disclosure. The UE 1*m*-01 in an RRC connected mode may determine that the UE 1*m*-01 has entered the coverage area supporting the 5G capability, based on the system information added to the dedicated signaling and determine whether the NR frequency band or NR frequency range is supported, to thereby display a 5G icon by transmitting an indicator indicating the 5G capability to an upper layer.

Referring to FIG. 1M, the UE 1*m*-01 may establish an RRC connection with a EUTRA cell 1*m*-02 and thus be in the RRC connected mode (RRC_CONNECTED), in operation 1*m*-05.

In operation 1*m*-10, the UE 1*m*-01 in the RRC connected mode may transmit, to the EUTRA cell 1*m*-02, a UE capability information message. The UE capability information message may include at least one of an indicator about whether EN-DC is supported, an indicator about whether (NG)EN-DC is supported, or an NR frequency band list supported in (NG)EN-DC (supportedBandListEN-DC). For reference, the supportedBandListEN-DC is a list commonly applied to EN-DC and (NG)EN-DC. This is because the supportedBandListEN-DC is information about RF and is irrelevant from a core.

In operation 1*m*-15, the EUTRA cell 1*m*-02 may establish (NG)EN-DC by transmitting an RRC connection reconfiguration message (RRCConnectionReconfiguration) to the UE 1*m*-01 in the RRC connected mode. The RRC connection reconfiguration message may include at least one of nr-SecondaryCellGroupConfig, nr-RadioBearerConfig1, or nr-RadioBearerConfig2.

In operation 1*m*-20, the UE 1*m*-01 in the RRC connected mode may apply information included in the received RRC connection reconfiguration message and transmit an RRC connection reconfiguration complete message (RRCConnectionReconfigurationComplete) to the EUTRA cell 1*m*-02.

In operation 1*m*-25, the UE 1*m*-01 in the RRC connected mode may receive, from the EUTRA cell 1*m*-02, an RRC connection reconfiguration message including a mobilityControlInfo element.

Based on the embodiment of the disclosure described above, the RRC connection reconfiguration message may be transmitted to the UE 1*m*-01 via RRC connection, by including system information (for example, SystemInformationBlockType 1, 2, 5, 24, or new) in which NR frequency band (list) or NR frequency range information supporting (NG)EN-DC is included. When the UE 1*m*-01 supports EN-DC and/or EUTRA-5GC, the EUTRA cell 1*m*-02 may transmit the system information to the UE 1*m*-01 by adding the system information to the RRC connection reconfiguration message. Alternatively, the EUTRA cell 1*m*-02 may transmit, to the UE 1*m*-01 supporting (NG)EN-DC, the RRC connection reconfiguration message (RRCConnectionReconfiguration) including SystemInformationBlockType24.

In operation 1*m*-30, the UE 1*m*-01 in the RRC connected mode may indicate presence of upperLayerIndication to an upper layer when the upperLayerIndication is set to TRUE for a registered PLMN, a selected PLMN, or a PLMN belonging to an equivalent PLMN list in SystemInformationBlockType2 broadcasted from a current cell (for example, a cell that performed handover) and when the UE 1*m*-01 supports at least one NR frequency band for (NG) EN-DC for the corresponding PLMN. Information about the NR frequency band for (NG)EN-DC may be included in the RRC connection reconfiguration message received in operation 1*m*-25. When the upperLayerIndication is not set to TRUE (for example, is set to absent or FALSE) for the registered PLMN, the selected PLMN, or the PLMN belonging to the equivalent PLMN list in SystemInformationBlockType2 broadcasted from the cell or when the upperLayerIndication is set to TRUE but the at least one NR frequency band for (NG)EN-DC is not supported, absence of the upperLayerIndication may be indicated to the upper layer.

In operation 1*m*-30, the UE 1*m*-01 in the RRC connected mode may indicate the presence of the upperLayerIndication to the upper layer when the at least one NR frequency band for (NG)EN-DC included in the RRC connection reconfiguration message received in operation 1*m*-25 is supported. When the at least one NR frequency band for (NG)EN-DC is not supported, the UE 1*m*-01 may indicate the absence of upperLayerIndication to the upper layer.

Alternatively, in operation 1*m*-30, the UE 1*m*-01 in the RRC connected mode may indicate the absence of upperLayerIndication to the upper layer when the RRC connection reconfiguration message received in operation 1*m*-25 does not include the system information (for example, SystemInformationBlockType 1, 2, 5, 24, or new) including the NR frequency band (list) or NR frequency range supporting (NG)EN-DC.

In operation 1m-25, the EUTRA cell 1m-02 may transmit, to the UE 1m-01, the system information included in the RRC connection reconfiguration message by configuring the system information in a form of delta signaling. Because the UE 1m-01 received information about the NR frequency band list for (NG)EN-DC when entering an RRC connected state, the delta signaling may indicate including only information about a change in the cell that performed handover. For example, the EUTRA cell 1m-02 may provide information about only a PLMN not suitable to the UE 1m-01. In other words, the system information including only information about a PLMN not supporting the NR frequency band (list) or NR frequency range for (NG)EN-DC may be transmitted to the UE 1m-01 by including the system information in the RRC connection reconfiguration message. Alternatively, the EUTRA cell 1m-02 may add information about a PLMN suitable to the UE 1m-01 to the system information and transmit the system information by including the system information in the RRC connection reconfiguration message. For example, when only the information about a PLMN is included and the NR frequency band (list) or NR frequency range for (NG)EN-DC is not included, the UE 1m-01 may determine that the NR frequency band (list) or NR frequency range for (NG)EN-DC supporting each PLMN is the same as information included in system information received before transiting to the RRC connected mode. Obviously, the EUTRA cell 1m-02 may add information about a PLMN and an NR frequency band (list) or NR frequency range for (NG)EN-DC for a new PLMN to system information, and transmit the system information to the UE 1m-01 by adding the system information in the RRC connection reconfiguration message.

In operation 1m-25, the RRC connection reconfiguration message may not include mobilityControlInfo but may include the system information including the NR frequency band (list) or NR frequency range supporting (NG)EN-DC.

Figure 1N:
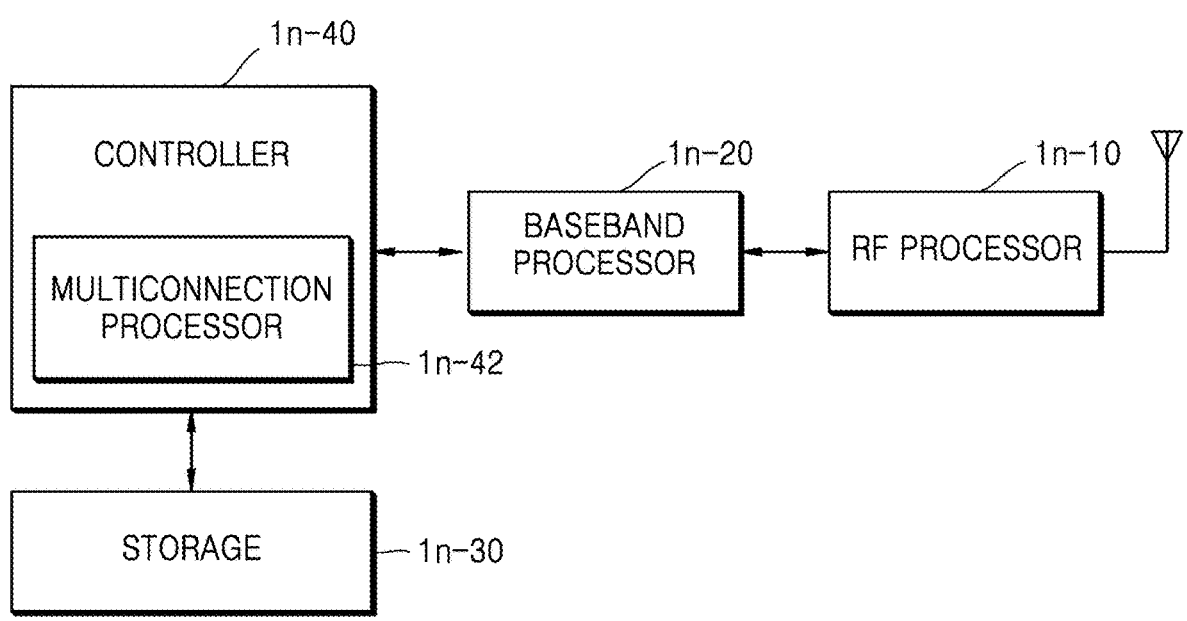
FIG. 1N is a block diagram showing an internal structure of a UE, according to an embodiment of the disclosure.
Figure 10:
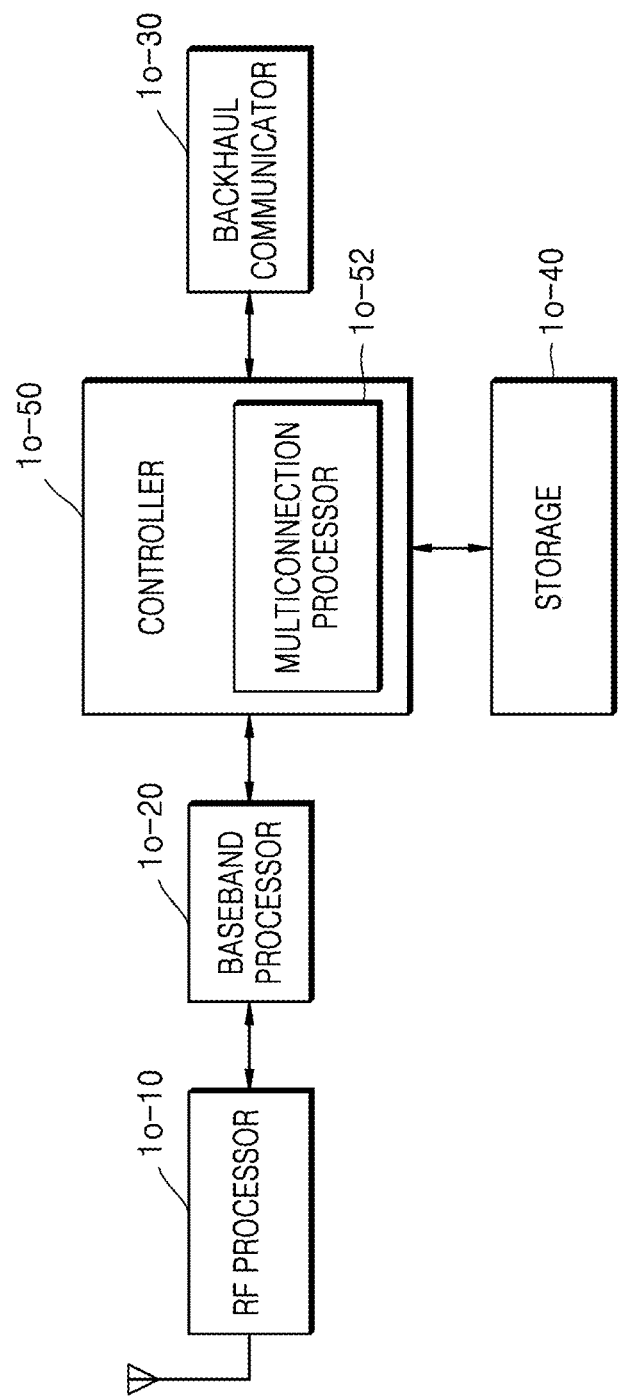

FIG. 1N is a block diagram showing an internal structure of a UE, according to an embodiment of the disclosure.

Referring to FIG. 1N, the UE includes a radio frequency (RF) processor 1n-10, a baseband processor 1n-20, a storage 1n-30, and a controller 1n-40. In an embodiment, the controller 1n-40 may include a multi-connection processor 1n-42.

The RF processor 1n-10 may perform functions for transmitting and receiving signals through radio channels, e.g., signal band conversion and amplification. That is, the RF processor 1n-10 up-converts a baseband signal provided from the baseband processor 1n-20, to an RF band signal and transmit the RF band signal through an antenna, and down-converts an RF band signal received through an antenna, to a baseband signal. For example, the RF processor 1n-10 may include a transmit filter, a receive filter, an amplifier, a mixer, an oscillator, a digital-to-analog converter (DAC), and an analog-to-digital converter (ADC). Although only a single antenna is illustrated in FIG. 1N, the UE may include multiple antennas. The RF processor 1n-10 may include a plurality of RF chains. The RF processor 1n-10 may perform beamforming. For beamforming, the RF processor 1n-10 may adjust phases and amplitudes of signals transmitted or received through multiple antennas or antenna elements. The RF processor 1n-10 may perform a MIMO operation and may receive several layers while performing the MIMO operation.

The baseband processor 1n-20 may convert between a baseband signal and a bitstream based on physical layer specifications of a system. For example, for data transmission, the baseband processor 1n-20 generates complex symbols by encoding and modulating a transmit bitstream. For data reception, the baseband processor 1n-20 reconstructs a received bitstream by demodulating and decoding a baseband signal provided from the RF processor 1n-10. For example, according to an OFDM scheme, for data transmission, the baseband processor 1n-20 generates complex symbols by encoding and modulating a transmit bitstream, maps the complex symbols to subcarriers, and then configures OFDM symbols by performing inverse fast Fourier transformation (IFFT) and cyclic prefix (CP) insertion. For data reception, the baseband processor 1n-20 may split a baseband signal provided from the RF processor 1n-10, in OFDM symbol units, reconstruct signals mapped to subcarriers by performing fast Fourier transformation (FFT), and then reconstruct a received bitstream by demodulating and decoding the signals.

The baseband processor 1n-20 and the RF processor 1n-10 transmit and receive signals as described above. As such, each of the baseband processor 1n-20 and the RF processor 1n-10 may also be called a transmitter, a receiver, a transceiver, or a communicator. At least one of the baseband processor 1n-20 or the RF processor 1n-10 may include multiple communication modules to support multiple different radio access technologies. Also, at least one of the baseband processor 1n-20 or the RF processor 1n-10 may include multiple communication modules to process signals of different frequency bands. For example, the different radio access technologies may include wireless LAN (For example, IEEE 802.11), a cellular network (for example, LTE), and the like. The different frequency bands may include a super high frequency (SHF) (e.g., 2.5 GHz and 5 GHz) band and an mmWave (e.g., 60 GHz) band.

The storage 1n-30 may store data for operation of the UE, e.g., basic programs, application programs, and configuration information. In particular, the storage 1n-30 may store information related to a second access node performing wireless communication by using a second wireless access technology. The storage 1n-30 may provide the stored data upon request by the controller 1n-40.

The controller 1n-40 may control overall operations of the UE. For example, the controller 1n-40 may transmit and receive signals through the baseband processor 1n-20 and the RF processor 1n-10. The controller 1n-40 may record and read data on and from the storage 1n-30. In this regard, the controller 1n-40 may include at least one processor. For example, the controller 1n-40 may include a communication processor (CP) for controlling communications and an application processor (AP) for controlling an upper layer such as an application program.

FIG. 1O is a block diagram of a configuration of an LTE or NR base station, according to an embodiment of the disclosure.

As shown in FIG. 1O, the base station may include an RF processor 1o-10, a baseband processor 1o-20, a backhaul communicator 1o-30, a storage 1o-40, and a controller 1o-50. In an embodiment, the controller 1o-50 may include a multi-connection processor 1o-52.

The RF processor 1o-10 may perform functions for transmitting and receiving signals through radio channels, e.g., signal band conversion and amplification. That is, the RF processor 1o-10 up-converts a baseband signal provided from the baseband processor 1o-20, to an RF band signal and transmit the RF band signal through an antenna, and down-converts an RF band signal received through an antenna, to a baseband signal. For example, the RF processor 1o-10 may include a transmit filter, a receive filter, an amplifier, a mixer, an oscillator, a DAC, and an ADC. Although only a single antenna is illustrated in FIG. 1O, the base station may include multiple antennas. The RF processor 1o-10 may include a plurality of RF chains. In addition, the RF processor 1o-10 may perform beamforming. For beamforming, the RF processor 1o-10 may adjust phases and amplitudes of signals transmitted or received through multiple antennas or antenna elements. The RF processor 1o-10 may perform a downlink MIMO operation by transmitting at least one layer.

The baseband processor 1o-20 may convert between a baseband signal and a bitstream based on physical layer specifications of a first radio access technology. For example, for data transmission, the baseband processor 1o-20 generates complex symbols by encoding and modulating a transmit bitstream. For data reception, the baseband processor 1o-20 reconstructs a received bitstream by demodulating and decoding a baseband signal provided from the RF processor 1o-10. For example, according to an OFDM scheme, for data transmission, the baseband processor 1o-20 generates complex symbols by encoding and modulating a transmit bitstream, maps the complex symbols to subcarriers, and then configures OFDM symbols by performing IFFT and CP insertion. For data reception, the baseband processor 1o-20 may split a baseband signal provided from the RF processor 1o-10, in OFDM symbol units, reconstruct signals mapped to subcarriers by performing FFT, and then reconstruct a received bitstream by demodulating and decoding the signals. The baseband processor 1o-20 and the RF processor 1o-10 transmit and receive signals as described above. As such, each of the baseband processor 1o-20 and the RF processor 1o-10 may also be called a transmitter, a receiver, a transceiver, a communicator, or a wireless communicator.

The backhaul communicator 1o-30 may provide an interface for communicating with other nodes in a network. In other words, the backhaul communicator 1o-30 may convert a bit string transmitted from a main base station to another node, for example, an auxiliary base station or a core network, into a physical signal, and convert a physical signal received from the other node into a bit string.

The storage 1o-40 may store data for operation of the main base station, e.g., basic programs, application programs, and configuration information. In particular, the storage 1o-40 may store information about bearers allocated for a connected UE, a measurement report transmitted from the connected UE, etc. The storage 1o-40 may store criteria information used to determine whether to provide or release multi-connection to or from the UE. The storage 1o-40 may provide the stored data upon request by the controller 1o-50.

The controller 1o-50 may control overall operations of the main base station. For example, the controller 1o-50 may transmit and receive signals through the baseband processor 1o-20 and the RF processor 1o-10 or through the backhaul communicator 1o-30. The controller 1o-50 may record and read data on and from the storage 1o-40. In this regard, the controller 1o-50 may include at least one processor.

Although the present disclosure has been described with various embodiments, various changes and modifications may be suggested to one skilled in the art. It is intended that the present disclosure encompass such changes and modifications as fall within the scope of the appended claims.

What is claimed is:

1. A terminal for cell reselection in a wireless communication system, the terminal comprising:
a transceiver; and
at least one processor configured to:
select a public land mobile network (PLMN) in an idle mode or an inactive mode,
receive, from a base station, a PLMN identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s),
receive, from the base station, a PLMN information list including one or more pieces of PLMN information via a third type system information block, wherein each of the one or more pieces of PLMN information includes a New Radio (NR) frequency band list for a corresponding PLMN and the one or more pieces of PLMN information is listed in a same order as the first order for PLMN(s) in which the one or more pieces of PLMN identity information are listed in the PLMN identity list received via the first type system information block,
determine whether a first NR frequency band list for the selected PLMN is included in PLMN information list and whether the terminal supports to operate in Evolved Universal Terrestrial Radio Access (E-UTRA) NR dual connectivity (EN-DC) by using a serving cell and at least one NR frequency band in the first NR frequency band list,
when the first NR frequency band list for the selected PLMN is included in the PLMN information list and the terminal supports to operate in the EN-DC by using the serving cell and the at least one NR frequency band for the selected PLMN, transmit, to a upper layer, a upper layer indication, and
when the first NR frequency band list for the selected PLMN is not included in the PLMN information list or the terminal does not support to operate in the EN-DC by using the serving cell and the at least one NR frequency band for the selected PLMN, transmit, to the upper layer, information indicating absence of the upper layer indication.

2. The terminal of claim 1, wherein the at least one processor is further configured to:
receive, from the base station, the upper layer indication via a second type system information block, and
when the first NR frequency band list for the selected PLMN is included in the PLMN information list and the terminal supports to operate in the EN-DC by using the serving cell and the at least one NR frequency band for the selected PLMN, transmit, to the upper layer, the upper layer indication regardless of the received upper layer indication,
wherein the received upper layer indication is an indication to the upper layer that a cell for the selected PLMN offers NR capabilities.

3. The terminal of claim 1, wherein the at least one processor is further configured to:
receive, from the base station, a radio resource control (RRC) connection reconfiguration message including information associated with NR configuration, determine whether the terminal is configured to operate in the EN-DC based on the RRC connection reconfiguration message, transmit, to the upper layer, the upper layer indication when the terminal is configured to operate in the EN-DC, and transmit, to the upper layer, information indicating absence of the upper layer indicator when the terminal is not configured to operate in the EN-DC.

4. The terminal of claim 3, wherein the information associated with NR configuration is transmitted to the terminal in a connected mode within the RRC connection reconfiguration message when at least one NR frequency band for the selected PLMN is supported.

5. The terminal of claim 3, wherein the at least one processor is further configured to transmit, to the base station, capability information comprising at least one of information indicating whether the terminal supports the EN-DC or information including NR bands supported by the terminal in the EN-DC.

6. A base station for cell reselection in a wireless communication system, comprising:

a transceiver; and at least one processor configured to:

transmit, to a terminal, a public land mobile network (PLMN) identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s), and transmit, to the terminal, a PLMN information list including one or more pieces of PLMN information via a third type system information block, wherein each of the one or more pieces of PLMN information includes a New Radio (NR) frequency band list for a corresponding PLMN and the one or more pieces of PLMN information are listed in a same order as the first order for PLMN(s) in which the one or more pieces of PLMN identity information are listed in the PLMN identity list received via the first type system information block, wherein, when a first NR frequency band list for a PLMN selected by the terminal is included in the PLMN information list and the terminal supports to operate in Evolved Universal Terrestrial Radio Access (E-UTRA) NR dual connectivity (EN-DC) by using a serving cell and at least one NR frequency band in the NR frequency band list, a upper layer indication is transmitted to a upper layer of the terminal, and wherein, when the first NR frequency band list for the PLMN selected by the terminal is not included in the PLMN information list or the terminal does not support to operate in the EN-DC by using the serving cell and the at least one NR frequency band in the first NR frequency band list, information indicating absence of the upper layer indication is transmitted to the upper layer of the terminal.

7. The base station of claim 6, wherein the at least one processor is further configured to transmit, to the terminal, the upper layer indication via a second type system information block, and wherein, when the first NR frequency band list for the PLMN selected by the terminal is included in the PLMN information list and the terminal supports to operate in the EN-DC by using the serving cell and the at least one NR frequency in the first NR frequency band list, the upper layer indication is received by the upper layer of the terminal regardless of the transmitted upper layer indication, and wherein the upper layer indication is an indication to the upper layer that a cell for the PLMN selected by the terminal offers NR capabilities.

8. The base station of claim 6, wherein the at least one processor is further configured to transmit, to the terminal, a radio resource control (RRC) connection reconfiguration message including information associated with NR configuration, wherein, when the terminal is configured to operate in the EN-DC based on the information associated with NR configuration, the upper layer indication is transmitted to the upper layer of the terminal, and wherein, when the terminal is not configured to operate in the EN-DC based on the information associated with NR configuration, the information indicating absence of the upper layer indicator is transmitted to the upper layer of the terminal.

9. The base station of claim 8, wherein the information associated with NR configuration is transmitted to the terminal in a connected mode within the RRC connection reconfiguration message when at least one NR frequency band for the selected PLMN is supported.

10. The base station of claim 8, wherein the at least one processor is further configured to receive, from the terminal, capability information comprising at least one of information indicating whether the terminal supports the EN-DC or information including NR bands supported by the terminal in the EN-DC.

11. A method, performed by a terminal, for cell reselection in a wireless communication system, the method comprising:

selecting a public land mobile network (PLMN) in an idle mode or an inactive mode;

receiving, from a base station, a PLMN identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s);

receiving, from the base station, a PLMN information list including one or more pieces of PLMN information via a third type system information block, wherein each of the one or more pieces of PLMN information includes a New Radio (NR) frequency band list for a corresponding PLMN and the one or more pieces of PLMN information is listed in a same order as the first order for PLMN(s) in which the one or more pieces of PLMN identity information are listed in the PLMN identity list received via the first type system information block;

determining whether a first NR frequency band list for the selected PLMN is included in the PLMN information list and whether the terminal supports to operate in Evolved Universal Terrestrial Radio Access (E-UTRA)-NR dual connectivity (EN-DC) by using a serving cell and at least one NR frequency band in the first NR frequency band list;

when the first NR frequency band list for the selected PLMN is included in the PLMN information list and the terminal supports to operate in the EN-DC by using a serving cell and the at least one NR frequency band in the first NR frequency band list, transmitting, to a upper layer, a upper layer indication; and when the first NR frequency band list for the selected PLMN is not included in the PLMN information list or the terminal does not support to operate in the EN-DC by using the serving cell and the at least one NR frequency band for the selected PLMN, transmitting, to the upper layer, information indicating absence of the upper layer indication.

12. The method of claim 11, further comprising receiving, from the base station, the upper layer indication via a second type system information block, wherein the transmitting the upper layer indication comprises, when the first NR frequency band list for the selected PLMN is included in the PLMN information list and the terminal supports to operate in the EN-DC by using the serving cell and the at least one NR frequency band for the selected PLMN, transmitting, to the upper layer, the upper layer indication regardless of the received the upper layer indication, and wherein the upper layer indication is an indication to the upper layer that a cell for the selected PLMN offers NR capabilities.

13. The method of claim 11, further comprising:

receiving, from the base station, a radio resource control (RRC) connection reconfiguration message including information associated with NR configuration;

determining whether the terminal is configured to operate in the EN-DC based on the RRC connection reconfiguration message;

transmitting, to the upper layer, the upper layer indication when the terminal is configured to operate in the EN-DC; and transmitting, to the upper layer, information indicating absence of the upper layer indicator when the terminal is not configured to operate in the EN-DC.

14. The method of claim 13, wherein the information associated with NR configuration is transmitted to the terminal in a connected mode within the RRC connection reconfiguration message when at least one NR frequency band for the selected PLMN is supported.

15. The method of claim 13, further comprising transmitting, to the base station, capability information comprising at least one of information indicating whether the terminal supports the EN-DC or information including NR bands supported by the terminal in the EN-DC.

16. A method, performed by a base station, for cell reselection in a wireless communication system, the method comprising:

transmitting, to a terminal, a public land mobile network (PLMN) identity list including one or more pieces of PLMN identity information via a first type system information block, wherein each of the one or more pieces of PLMN identity information includes a PLMN identity for a corresponding PLMN, and the one or more pieces of PLMN identity information are listed in a first order for PLMN(s); and transmitting, to the terminal, a PLMN information list including one or more pieces of PLMN information via a third type system information block, wherein each of the one or more pieces of PLMN information includes a New Radio (NR) frequency band list for a corresponding PLMN and the one or more pieces of PLMN information are listed in a same order as the first order for PLMN(s) in which the one or more pieces of PLMN identity information are listed in the PLMN identity list received via the first type system information block, wherein, when a first NR frequency band list for a PLMN selected by the terminal is included in the PLMN information list and the terminal supports to operate in Evolved Universal Terrestrial Radio Access (E-UTRA)-NR dual connectivity (EN-DC) by using a serving cell and at least one NR frequency band in the first NR frequency band list, a upper layer indication is transmitted to a upper layer of the terminal, and wherein, when the first NR frequency band list for the PLMN selected by the terminal is not included in the PLMN information list or the terminal does not support to operate in the EN-DC by using the serving cell and the at least one NR frequency band in the first NR frequency band list, information indicating absence of the upper layer indication is transmitted to the upper layer of the terminal.

17. The method of claim 16, further comprising transmitting, to the terminal, the upper layer indication via a second type system information block, wherein, when the first NR frequency band list for the PLMN selected by the terminal is included in the PLMN information list and the terminal supports to operate in the EN-DC by using the serving cell and the at least one NR frequency in the first NR frequency band list, the upper layer indication is received by the upper layer of the terminal regardless of the transmitted upper layer indication, and wherein the upper layer indication is an indication to the upper layer that a cell for the PLMN selected by the terminal offers NR capabilities.

18. The method of claim 16, further comprising transmitting, to the terminal, a radio resource control (RRC) connection reconfiguration message including information associated with NR configuration, wherein, when the terminal is configured to operate in the EN-DC based on the information associated with NR configuration, the upper layer indication is transmitted to the upper layer of the terminal, and wherein, when the terminal is not configured to operate in the EN-DC based on the information associated with NR configuration, the information indicating absence of the upper layer indicator is transmitted to the upper layer of the terminal.

19. The method of claim 18, wherein the information associated with NR configuration is transmitted to the terminal in a connected mode within the RRC connection reconfiguration message when at least one NR frequency band for the selected PLMN is supported.

20. The method of claim 18, further comprising receiving, from the terminal, capability information comprising at least one of information indicating whether the terminal supports the EN-DC or information including NR bands supported by the terminal in the EN-DC.

* * * * *